(12) United States Patent
Rodriguez Barros

(10) Patent No.: US 10,351,054 B2
(45) Date of Patent: Jul. 16, 2019

(54) MULTIFUNCTIONAL ASSEMBLY COMPRISING A LASER EMITTER FOR THE DOOR OF A MOTOR VEHICLE

(71) Applicant: Alejandro Rodriguez Barros, Mataro (ES)

(72) Inventor: Alejandro Rodriguez Barros, Mataro (ES)

( * ) Notice: Subject to any disclaimer, the term of this patent is extended or adjusted under 35 U.S.C. 154(b) by 149 days.

(21) Appl. No.: 15/328,041

(22) PCT Filed: Jul. 24, 2015

(86) PCT No.: PCT/ES2015/070575
§ 371 (c)(1),
(2) Date: Jan. 22, 2017

(87) PCT Pub. No.: WO2016/012651
PCT Pub. Date: Jan. 28, 2016

(65) Prior Publication Data
US 2017/0210282 A1    Jul. 27, 2017

(30) Foreign Application Priority Data

Jul. 24, 2014    (ES) ................... 201431111

(51) Int. Cl.
*B60Q 1/22*    (2006.01)
*B60Q 1/24*    (2006.01)
(Continued)

(52) U.S. Cl.
CPC ............. *B60Q 1/323* (2013.01); *B60Q 1/22* (2013.01); *B60Q 1/24* (2013.01); *B60Q 1/2665* (2013.01);
(Continued)

(58) Field of Classification Search
CPC .......... B60Q 1/323; B60Q 1/34; B60Q 9/002; B60Q 1/22; B60Q 1/24; B60Q 1/2665;
(Continued)

(56) References Cited

U.S. PATENT DOCUMENTS 6,926,431 B1    9/2005  Foote et al.
8,683,722 B1 *  4/2014  Cowan ................. G09F 21/04
                                                        40/543
(Continued)

FOREIGN PATENT DOCUMENTS

WO    2024086992 A1    12/2014

OTHER PUBLICATIONS

International Search Report of the PCT dated Nov. 30, 2015.

*Primary Examiner* — Karabi Guharay
*Assistant Examiner* — Nathaniel J Lee
(74) *Attorney, Agent, or Firm* — Patshegen IP LLC; Moshe Pinchas

(57) ABSTRACT

Multifunction assembly comprised of: an outer surface structure (CAR) containing a side door (D) that supports at least one exterior mirror assembly (RVM), an exterior door handle assembly (HE) of said door, and an exterior laser emitter (LE1) which emits a fixed and direct line of laser light (LL1) downwards on said ground adjacent to the vehicle, indicating an area (DA) where the doors open and combines functions associated with other indicator signal devices (BL), sensors and open door commands, and an ultraviolet light emitter device (EUV).

34 Claims, 27 Drawing Sheets

(51) Int. Cl.

| | | |
|---|---|---|
| *B60Q 1/32* | (2006.01) | |
| *B60Q 1/34* | (2006.01) | |
| *B60Q 9/00* | (2006.01) | |
| *B60R 1/06* | (2006.01) | |
| *B60R 1/12* | (2006.01) | |
| *B60Q 1/26* | (2006.01) | |
| *B60Q 1/48* | (2006.01) | |
| *B60Q 1/52* | (2006.01) | |
| *G03B 17/54* | (2006.01) | |
| *G03B 21/00* | (2006.01) | |
| *B60Q 1/38* | (2006.01) | |

(52) U.S. Cl.
CPC ............. *B60Q 1/2669* (2013.01); *B60Q 1/34* (2013.01); *B60Q 1/484* (2013.01); *B60Q 1/525* (2013.01); *B60Q 9/002* (2013.01); *B60R 1/06* (2013.01); *B60R 1/1207* (2013.01); *G03B 17/54* (2013.01); *G03B 21/00* (2013.01); *B60Q 1/38* (2013.01); *B60Q 2400/40* (2013.01); *B60Q 2400/50* (2013.01); *B60R 2001/1253* (2013.01); *B60R 2001/1284* (2013.01)

(58) Field of Classification Search
CPC ...... B60Q 1/2669; B60Q 1/484; B60Q 1/525; B60R 1/1207; G03B 17/54; G03B 21/00
See application file for complete search history.

(56) References Cited

U.S. PATENT DOCUMENTS

| | | |
|---|---|---|
| 2005/0117364 A1 | 2/2005 | Rennick et al. |
| 2007/0053195 A1* | 3/2007 | Alberti .................. B60Q 1/2665 362/494 |
| 2012/0020101 A1 | 1/2012 | Pastrick et al. |

* cited by examiner

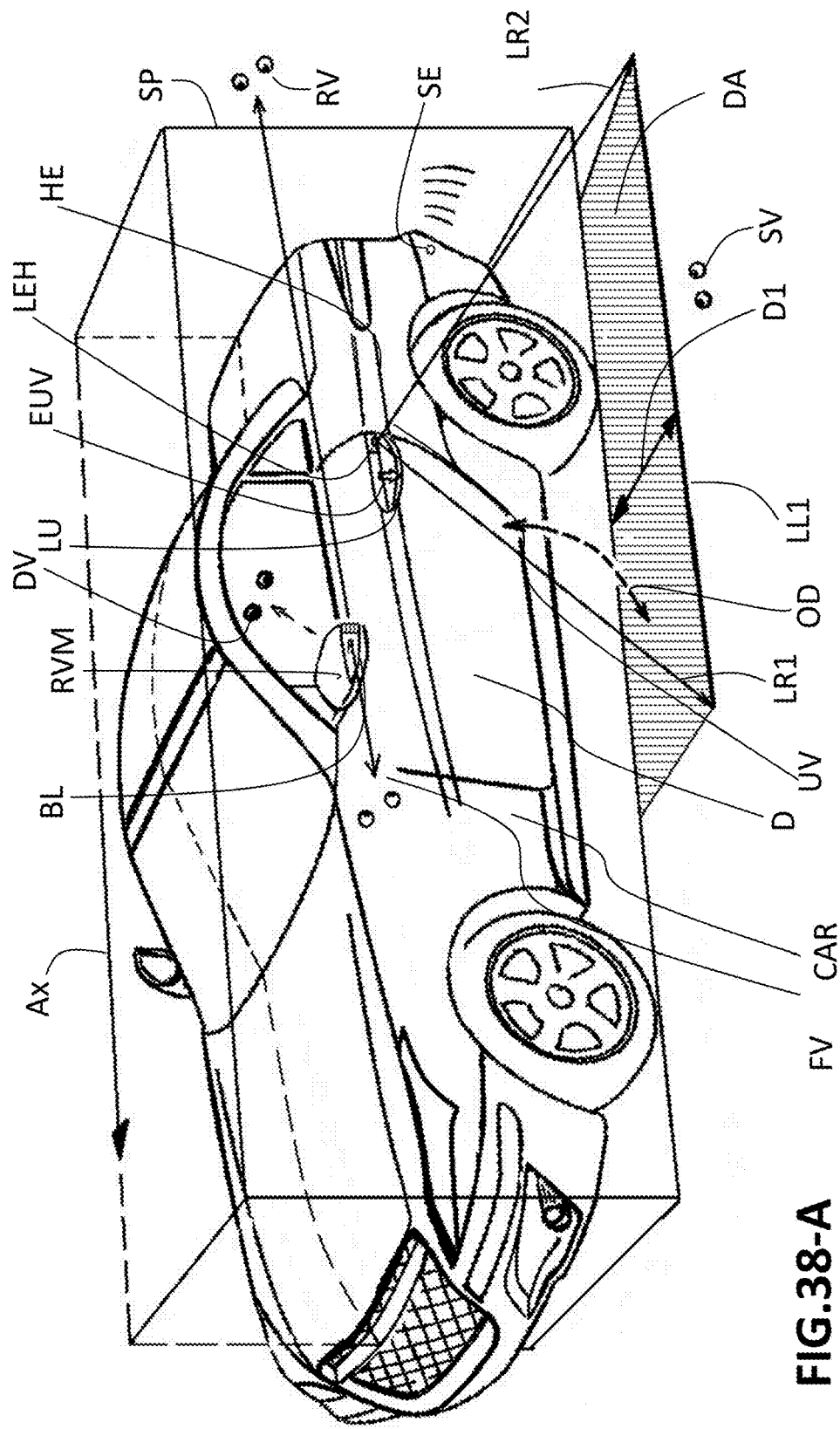
FIG.38-A

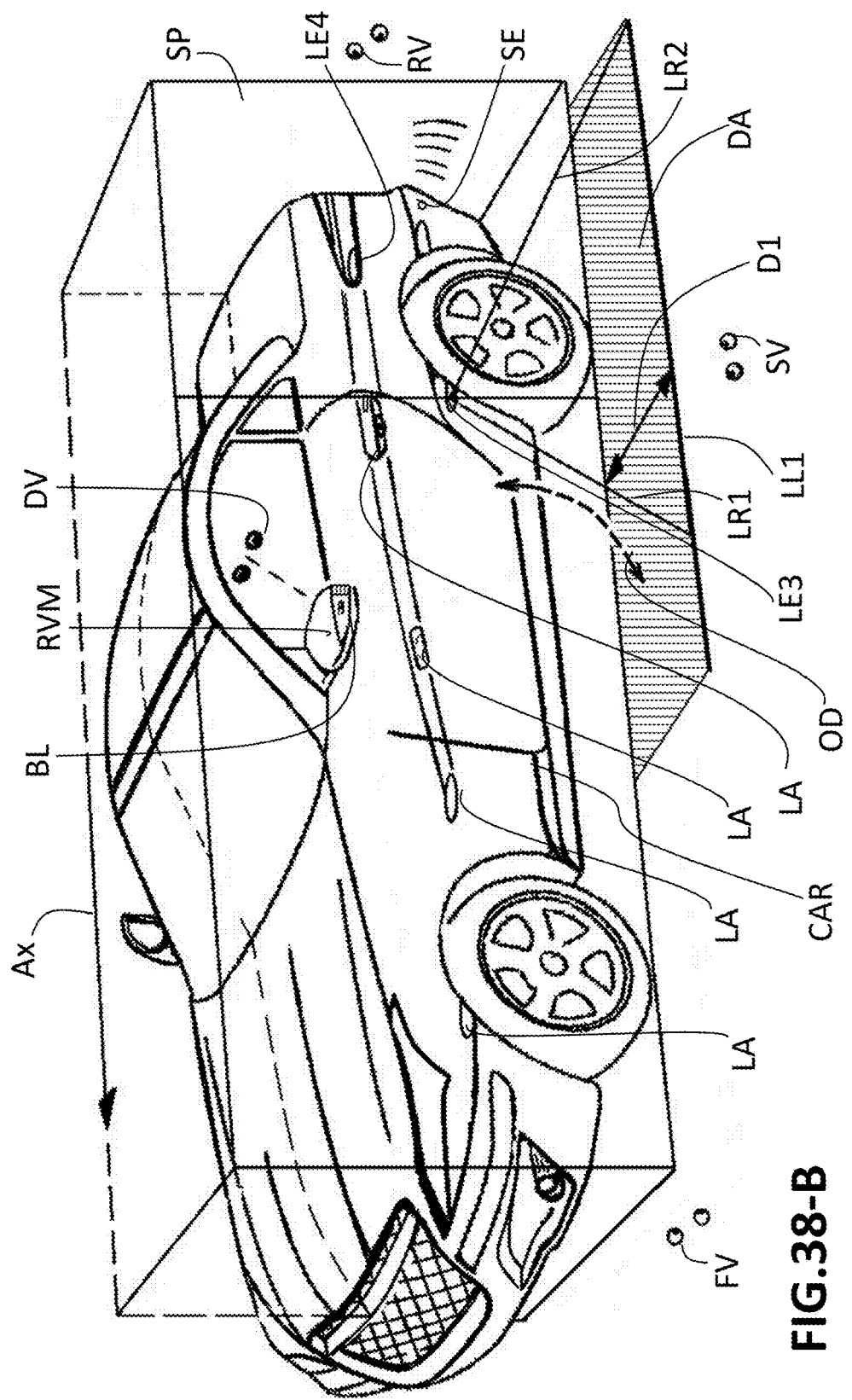
FIG.38-B

MULTIFUNCTIONAL ASSEMBLY COMPRISING A LASER EMITTER FOR THE DOOR OF A MOTOR VEHICLE

FIELD OF THE ART

The present invention relates to a multifunction assembly located in the side door of a motor vehicle with external laser emitter and external ultraviolet light comprising: an exterior surface structure which forms a part of the body that is the side door, and which supports at least one exterior rear-view mirror assembly and an exterior door handle assembly of said door, comprising:

At least one laser diode light source located in a fixed and invariable position that emits at least one laser light beam directly downwards and towards the rear onto the ground adjacent to the vehicle, having optic means that generate from said beam, at least one line of laser light reflected on said adjacent ground and combines functions with another ultraviolet light emitter that emits an activation beam on a luminescent material associated with said vehicle door; which concerns in particular a multifunction exterior rear-view mirror assembly of a motor vehicle having: a housing with an opening towards the rear in relation to the axis of movement of the vehicle which houses one viewing element, which is at least a mirror, a camera, or combination thereof, and a base fixing it to the body, comprising;

a laser light emitter located in a fixed and invariable operating position in relation to its housing assembly and its respective vehicle door, having at least one laser light diode source that directly emits at least one laser light beam from the rear-view mirror partially downward and towards the rear; having optic means that generate from said beam, at least one first line of laser light reflected on the ground adjacent to the vehicle, in a direction preferably parallel to the axis of movement thereof, to produce a mark on the ground indicating the limits of an area of conflict and danger extending from said line of laser light to the vehicle body, corresponding to an area similar to that occupied by the open doors of the vehicle;

an ultraviolet light emitter illuminating from said rear-view mirror a portion of said door that is partially covered in a luminescent material that reacts by emitting luminosity to the dark lateral side of the vehicle.

Said luminescent mark is capable of being operated in different functions; independently in response to sensors and commands, or preferably associated with other devices from the door assembly, rear-view mirror or inner or outer door handles and its commands, or as a complement to produce new security and comfort features, combined with existing functions with which to generate said laser emitters and associated ultraviolet emitters.

The assembly with respect to the vehicle for said laser emitter device, when associated and included in other devices, is an operation of fixing and connecting cables at zero cost because they are included in a multifunction rear-view mirror assembly or multifunction door handle that alone are involved in the same assembly operation with or without the presented device.

PRIOR STATE OF THE ART

There are various patents whose prior art refer to devices located in the side doors of a vehicle or near these areas, especially located in the side rear-view mirrors that emit lights and signals, comprising: turn signal devices or ("blinker", general English term for a turn signal in a rear-view mirror), warning lights to indicate the open door of a vehicle, warning devices to detect a presence in the lane next to the vehicle, blind spot detectors, light projectors for logos, courtesy lights or welcome lights, extended field of view mirror subassemblies, ("spot mirror", general English term), or a normal field of vision with light signals emitted from below the mirror glass or in its perimeter, also applied to normal or electrochromic mirrors.

These devices, especially those included in the rear-view mirrors and some in the outer door handles of said doors, carry out a warning function or light signal from an illuminating surface from the device itself, or from under a mirror that emits light or perceived signals by the driver or the periphery; or illuminate the side to see the ground, or the door.

There are patents relating to projected lines emitted by a laser diode as an auxiliary construction device for calculating levels or measurements.

U.S. Pat. Nos. 5,879,074, 6,099,155, filed Feb. 1, 1993 by Donnelly, already in public domain, is a security or courtesy light that illuminates an area below the mirror, but does not define said area with boundaries, it is not used as an advance warning to indicate an open door, and it does not indicate to where the doors will open, emitting a white light in order to illuminate an area of courtesy when the occupants get in and out of the vehicle, not indicating a warning as a sign of an open door. It combines with turn signals as a multifunction device in a series derived from the patents "continuation in part".

U.S. Ser. No. 12/672,722, filed Aug. 9, 2007 (ES200702246) by Alejandro Rodriguez Barros uses the turn signal in the rear-view mirror to carry out a door open warning as a second function of said turn signal, simultaneously warning the environment and the driver of the vehicle to look in the mirror before opening the doors of a vehicle and has a second signal in the interior frame of the door that emits a signal once said door is open.

U.S. Pat. No. 6,926,432, Priority Jul. 12, 2000, ES 200001834 by A. Rodriguez Barros, is a mirror with a series of multifunction light signals, basically an indicator that emits a signal in three directions, towards the front, the side and the rear from the remote end of the body and includes various light emitting techniques.

US2004/0070857 A1, filed Nov. 6, 2003 by Gentex, is an electrochromic mirror that emits signals behind a mirror where the emitted light passes through etchings in the metallic glass with the following functions; directly indicates the driver from the rear-view mirror the detection of a vehicle in the blind spot, also is a turn signal facing the rear, and also illuminates the door handle in an imprecise manner because said mirror is movable. The blind spot warning has had only partial success.

U.S. Pat. No. 7,008,089, filed Feb. 1, 2000 by Mc Cloy, is a blind spot detector attached to the rear-view mirror.

U.S. Pat. No. 7,876,203 filed Jan. 30, 2007 by Steven Tyler, is an indicator that detects lateral vehicle presence when approaching or overtaking by a direct light to the driver.

U.S. Pat. No. 7,674,025 filed, Oct. 5, 2007 by Alf Liesener, is a side mirror that has a turn signal located in different parts of its structure such that the illuminating surface is visible from the front and rear of the vehicle; concept anticipated by patents from A. Rodriguez Barros U.S. Pat. No. 6,099,153 priority Feb. 18, 1997 by Bernd Waldmann (Reitter & Schefenacker & Co.) is a mirror with an exterior light guide that produces the emission of a turn signal.

DE 10 2005 038181 A1 filed Feb. 22, 2007 by Audi A G., is a signal in the inner frame of the mirror that indicates the driver of the presence of an object in the blind spot detected by a sensor or radar in another part of the vehicle. TWM353236-U expired and DE 102004062918 A1 by Schefenacker whose inventor is Henry Muller, are outer door handles with light acting as locators of said door handle.

Laser devices such as a line of projected laser light used for measurements and levels applied, in general, to construction located in movable adjustment positions for such measurements, as U.S. Ser. No. 29/201,635 priority Jan. 13, 2005 corresponding derivative ES 2302293 T3 filed Jan. 10, 2006 by Black and Becker.

In the cited mirror or external handle assemblies, the prior art states that:

None use a line of laser light projected onto the ground as a reflected visual warning.

None use the projection of at least one line of laser light from a fixed unchanged position when in use, transmitted downwards, in order to be perceived by the periphery when reflected on the ground near to the motor vehicle as a warning to signal as to how far the doors open, or until where they will open (in a preventative manner in order to avoid collision accidents against the door before they open).

None define an area of exposure to danger with lines or a dot matrix of emitted laser light, as a warning to an object of the danger when passing near the vehicle.

None use a line of emitted laser light as a reference for parking.

None use an emitted laser line combined with other devices such as a welcome light, or an indicator of a connected alarm, or an indicator that indicates if the doors are correctly closed or opened and operable.

None utilize a line or more lines of emitted laser light on the ground to indicate to an external object of a progressive dangerous approach to the vehicle when driving or turning said vehicle.

None use a line of emitted laser light combined with other devices such as warning light to the driver or the occupants of the vehicle to externally and internally notify the occupants of the vehicle and environment a warning call in relation to the action of opening the doors of said vehicle.

None use a luminescent material activated by ultraviolet light to make the dark side of the vehicle visible from the side.

There are also devices that are located in different parts of the vehicle body, functioning together to obtain as an objective some kind of warning, (side turn signal, side position lights especially for long vehicles, trucks or buses) and therefore, need special wiring, several recesses or holes in the body and several assembly and fastening operations (one for each device); work that makes the assembly of the vehicle in the production chain become more costly and time consuming and requires the vehicle manufacturer to have several suppliers for various devices.

And it is also noted that providing a line of laser light generated from the side mirror on the ground adjacent the vehicle is a way to generate a warning or a non-limiting complement to a warning or signal that is very useful in different situations and for different functions, capable of combining its function with devices of; signs, warnings, alarms, direction, tracking, radio frequencies, communication, emergency calls, shifters, open door devices, manoeuvers, to improve functions thereof as reciprocal complements, or to produce new security and comfort features.

Therefore, it is necessary to consider this new multifunction mirror with an embedded multifunction laser emitter device that generates a line reflected on the ground adjacent to the vehicle as a contribution to innovative solutions to the exposed problems not covered by the state of the art.

SUMMARY OF THE INVENTION

Multifunction assembly with a fixed laser and ultraviolet light emitter located in the side door of a motor vehicle having optic means for generating a laser line on the ground near the vehicle, preferably associated with elements of said door, assemblies or subassemblies that operate in a fixed and invariable position when in use as an exterior mirror or an exterior door handle of said door, comprising; a location, device techniques, functions, construction method, assembly method, associations with other devices, an activation of functions with such associations in different circumstances, being the features to achieve objectives and solutions, which are explained below:

SOLUTIONS. The problems posed by the prior art are solved achieving the following objectives:

Prevent accidents by creating an area from a line of a defined laser light as a warning of exposure to conflicts, visible by the environment to the side of a vehicle, Generate complementary warnings in different situations by associating with other functional devices of the mirror itself, especially to warn the parties involved in possible accidents (passengers, driver and environment at the same time).

Provide the side mirror an innovative feature that consists in marking the ground adjacent to the vehicle with luminous lines reflected on said ground.

Provide the manufacturers of vehicles a product that facilitates industrial application in the assembly line, such that in a single operation devices are installed to provide solutions to the two exposed problems, and that includes mounting the proposed laser emitting device at a cost and assembly time in the vehicle equal to zero.

The present invention provides solutions to all these problems, which concerns in particular;

an exterior multifunction side mirror assembly of a motor vehicle comprising; a housing with an opening towards the rear, which houses at least one viewing element that can be a mirror, a camera, or a combination thereof, and a base that holds and connects it from one end to the body of said vehicle, wherein associated;

at least one laser light emitting device that has a laser light diode source, an opening for the emitted light, normally occupied by an optic means, optic means that dissociate the emitted laser beam into multiple beams to generate a line of laser light reflected on the ground adjacent to the vehicle, an orientation of said line of laser light substantially parallel to the axis of circulation of the vehicle, generated from a fixed and invariable position when in use in relation to the rest of the vehicle in order to generate a visual luminous warning by the line of laser light emitted to indicate to the periphery, a luminous mark that is the limit of an area of conflict, equivalent to a side passage capable of being occupied circumstantially with the close passing of vehicles or objects of the periphery. It extends widthwise from said line of laser light on the ground to the vehicle body by an approximate length from the projection of the mirror towards the ground until the rear bumper of the vehicle, similar to the area which coincides with the projection upon the ground of the open doors of the vehicle.

It is capable of functioning independently, or associated, combined and coordinated with other devices, preferably an exterior multifunction mirror assembly or external door handle of said door, capable of forming subassemblies which in turn are complemented with functions of said mirror as a reciprocal, solidary and/or added compliment to produce new security and comfort features, or enhance existing features that produce said associated devices with the emission of said laser line, added to prevent accidents, crashes, accidents with doors, people, objects and vehicles that transit or find themselves within said area of conflict of said vehicle in risk situations; or generate comfort lights in situations outside of risk; or produce at least a second function thereof.

The assembly in the vehicle has an extra advantage for said emitter which is a device that is preferable independent, but can be included in mirror subassemblies or the exterior door handle that is firmly attached to the same in that it has a cost of zero, as a result of assembling in the vehicle said multifunction mirror assembly or said exterior door handle by a required fixing and cable connecting operation that is the same as mounting the same mirror or door handle without said incorporated laser emitter. It requires a similar fixing operation and a similar operation to connect the main electrical connector to the vehicle network.

Among other applications, associated with a detector switch in the inner door handles, it warns the periphery of the vehicle until to where said doors will open by the new function which consists of is the laser line emitted and reflected on the ground adjacent to the vehicle, and it is capable of being associated with devices of the same mirror or inside the vehicle, with the object, without limitation, to extend the warning and remind passengers of the vehicle to look in the rear-view mirror as a precaution before getting out by using the turn signal device of the mirror with a warning to the driver of its operation and at the same time inform the environment that the doors will open by means of said turn signal, and from the same emitted laser line. Actions that produce a warning in all directions and aspects involved in the accidental door opening.

The laser emitting device has a flexible configuration to associate itself with the mirror assembly; as an independent module or integrated in structural parts, or integrated in other devices such as turn signals, comfort lights, projection lights, ultraviolet lights, sensors, radars and cameras of said mirror that form exterior and interior subassemblies compatible in shapes and forms, such that they can be interchanged with each other, and flexibly form different multifunction devices.

Said flexible configuration is not limitative and allows it to function individually or associated with said rear-view mirror devices as a reciprocal complement and by a controller of functions that are based on a programmable chip, or network of controllers and nodes that the vehicles have and allow multiple devices to be activated and function interrelated, coordinated, and to produce new safety and comfort functions or enhance the existing ones.

LOCATION. It concerns in particular a side exterior mirror with a warning light device generated by a laser diode emitter that is housed, integrated, fitted, adhered to or associated with a part of the said side mirrors, preferably located in the lower part that comprises the lower exterior surface of the mirror assembly, (lower housing cover, lower cover subassembly incorporated with lights and signals, or base of the body.)

These mirrors with their feature of a projected body from the body towards the sides of the vehicle allows the associated laser device to transmit from a point without interference at least two beams in non-parallel lines that pass through said point (that represent the emission of extreme beams from the opening or FAN angle necessary to define scope and length of said laser line generated and projected on the ground) and to achieve the following objectives:

Transmits a projected line of laser light, a laser light dot matrix, a figure or logo of laser light, or a combination thereof, directly and without interference towards the ground adjacent to the vehicle, establishing a visible contrast with respect to the rest of the NOT illuminated ground in the periphery of the vehicle, such emissions of laser light are projected towards the ground, and at least in part towards the rear with respect to the vehicle.

Defines, marks and makes visible a distance and area of exposure to risk extending widthwise from said line of laser light to the vehicle body (similar to the projection on the ground of the open doors), by an approximate length from the projection of the mirror towards the ground to the rear bumper of the vehicle.

Indicates in different situations how far the doors will open, or until where it is dangerous to approach the vehicle when transiting near it, and complements other functions.

It has, for one of its versions, depending on the degree of danger, more than one line of projected laser light to define the various levels of distance; (Ex. when turning at low speed when pedestrians are near, when passengers open the doors to get in or out, before the doors open upon manipulating the commands or handles of said doors, or when transiting near a smaller vehicle such as a bicycle or motorcycle, or when in reverse upon looking in the mirror and noting obstacles that interfere with said projected line of light).

Functions with the vehicle running or detained, with the doors, hood or trunk open or closed.

It may, alternatively, include the laser emitting device in different subassemblies of said rear-view mirrors as; mirrors, camera for vision or detection, "spot mirror" (spherical mirror with extended field of view), electrochromic mirrors; structural parts on an outer level, protruding, or depressed surface, housing, frames, housing bracket, fenders with shock protection; light or luminous signal subassemblies, combined mirror subassemblies and mirrors with or without luminous signals, sensors, radars, antennas, tracking devices (GPS or FM) causing the same effect.

Alternatively, it is possible to have a multifunction device with a laser emitter that can generate similar functions located outside the mirrors, on some point on the side of the body that includes said laser emitting diode in a luminous signal device (turn signal or side position light) or on the exterior door handles, and obtains a multifunction device that is located, integrated, fitted, adhered to or associated with body parts comprising at least one point of the vehicle represented geometrically on a lateral plane of the vehicle, capable of emitting from any point on said plane (representing the laser devices installed on the level, protruding or depressed side of the body). The generated beams project the laser line on the ground adjacent to the vehicle. In this variant, the device may have some complication in industrial assembly line of the vehicle because it is more expensive, needs more cables and is mounted in several operations, but it is a positive, viable solution as an alternative in the free market, said parts are selectable between;

a lower side skirt, floor o subfloor panels, intermediate side panels, cargo boxes, fenders or fender subassemblies (front or rear fender), sideboard, fixed or movable access step, ramp or access step, seat, panel, shield or side trim of the body; spoilers, rear spoiler that includes the third brake light, spoiler and front or rear bumper (especially in the wraparound part towards the sides of the body of the vehicle or side fenders);

a side air intake, a side decal or insignia, antennas;

spoiler or rear spoiler with third brake light, front or rear vehicle lights, especially located in the wraparound part of the body of said signal devices towards the sides of the body, rear license plate lights, synchronized with the brake or fog light to produce alternative complementary functions.

side doors, tailgate or trunk lid (subassemblies that include external and internal panels of said doors or tailgates, whose internal frame structure or continent body frame of said door or tailgate subassemblies that can be seen externally when said doors or tailgates are open: its handles, studs, internal or exterior coating panels, window frames, reinforcements or accessories);

DEVICE. The laser emitter device typically comprises at least;

a bigger capsule including a laser diode light source (light emitter of any wavelength), preferably of metal (brass, aluminum or stainless steel or similar) to dissipate heat and has a shape or guides to facilitate a mounting position.

intermediate optic means between the light source and the projection surface, said optic means are close to the laser light source and dissociate the laser beam into fan-shaped beams that produce on the ground near to the vehicle a projected line of laser light of any wavelength or visible light color, or of a wavelength of invisible light type infrared (IR) or ultraviolet (UV), which in the latter case is for a function as a complement to a thrubeam sensor.

a receptacle, housing, or container positioner assembly (independent, modular, or part of the structure or subassembly of the mirror that contains it, for example: the housing cover, or part of a mirror light device) that provides a position to direct in a combinable manner, and at least, in part, the projection of said light beams from top to bottom, to the side and to the rear with respect to the vehicle of said projected line of laser light. Said container is capable of having an adjustment mechanism which allows a specific orientation to be obtained to direct the projection of laser light and to vary the orientation if it is in the left- or right-hand mirror or if the vehicle is right- or left-hand drive.

In an alternative design the device is included in the inside of the mirror assembly, and is therefore an internally housed, integrated or embedded device.

In another alternative design the device is outside the mirror assembly, and is therefore an external device attached to a part of the mirror itself or to a part adjacent to the mirror of the side door or the side of the vehicle body.

a sufficient opening for the outlet of laser light, said opening is normally occupied by a transparent surface for all versions of the device that can be optic means or part of a transparent surface of a signal or light subassembly that contain said laser emitter, such that said opening allows the laser emitter to pass in the desired direction.

a current circuit controller that aids the laser light source or associated protective circuit. Said circuit can be separated from the capsule to enhance heat dissipation and reduce volume of said capsule or prevent the capsule from being robbed or vandalized because without the controller it would not work.

an operating interface circuit, or node, or chip controller, interconnecting elements of the general electrical circuit of the vehicle, elements or materials coupled to the laser light source or adequate chip controller in order to dissipate the heat generated by it (in some cases, dissipating fins) in order to ensure the service life of the device, a focal length between the optic and light source or focus to define the projection of the line of light projected according to the distance to the ground or projection plane, capable of having an adjustment mechanism which is preferably based on a fine pitch thread and a spring that allows to adjust the focal distance between optics and the source to vary the shape and clarity generated by the emitted laser light.

Said projection originates from an emission point in a part of the body, (preferably belonging to the rear-view mirror), theoretically represented by a longitudinal vertical plane parallel to the axis of circulation which represents the side of the vehicle and is oriented from said emission point, preferably downwards, toward the side and the rear; such that it produces diffuse reflection on the ground, at least partly towards the rear, especially when such reflected light is red.

FUNCTIONS. The laser emitting device associated with the rear-view mirror or the side handle, produces new assistance functions for safety and comfort.

It is activated in different ways depending upon the case, independently, directly by itself, or indirectly associated by means of a controller or circuit node of the vehicle which interrelates with the operation of other devices and interacts with each as needed; with the vehicle running or detained, with the emission of blinking or continuous light, automatic or voluntary activation, interconnected in an external or internal network, by cable, radio frequency or infrared rays (IR).

The new features are produced by emitting at least one line of projected laser light onto the ground adjacent to the vehicle, said line is at a distance from the body and is defined as the limits of an area of exposure to danger, NOT as an image; it is capable of associating and reciprocally complementing itself with light emitting devices preferably located in the rear-view mirror which makes the creation of new functions possible.

The new features provide solutions that are based upon on communication to the environment; by a visual warning, which consists of a laser line projected on the ground that marks a limiting distance of an area of exposure to danger and conflicts. It indicates various situations of danger or preventive danger;

to where the doors can open, to where it is safe or dangerous when approaching the vehicle when circulating with the doors still closed, to where a vehicle has to swerve when transiting near the main vehicle giving off the warning, It has at least a line of projected illuminated laser, and according to the problem is capable of complementing other elements of luminous warnings of direct perception by an illuminating surface of said complementary devices, such as a turn signal in the rear-view mirror that at least emits towards the rear and is visible by the environment at least from a rear position relative to the vehicle, or a projected warning light producing a bright visual effect preferably located between said first line of projected illuminated laser and the vehicle body, and can be:
- more than a projected luminous line to indicate various levels of approximation,
- a dot matrix of projected laser light to highlight the area,
- a projected luminous figure, icon, or logo to reinforce the warning,
- or a luminescent warning located on the body illuminated by ultraviolet light,
- or a welcome light that illuminated the outer handles,
- or a courtesy light that illuminates the ground adjacent to the vehicle, or a combination thereof, and that is complemented with an interior or external warning sound, as appropriate,
- or a reverse side light emitted from the mirror toward the side passage of the vehicle approximately to a range equal to the length of the vehicle.

OBJECTIVES. Avoid accidents or provide lights for security and comfort such as;
- gain an interval of time before opening the door from the inside of the vehicle to assimilate and react to visual light and sound warnings,
- colliding against the doors when being opened,
- the slamming of a door towards the outside by the passengers of the vehicle, of the English "doored"
- colliding of passengers when getting in or out of the vehicle,
- the tangential collision or the closing in on of passengers when turning the vehicle at low speed,
- the crash or colliding of objects near the vehicle when loading or unloading or when getting children, babies and their strollers in or out of the vehicle,
- collisions when changing a tire,
- collisions and marking of an area of protection when opening the trunk or the engine hood,
- preventively avoid colliding against the doors with an advance warning of their opening, warning at the same time, the parties involved in such accidents (passengers and environment); warns in a systematic and correlative manner activating various devices mounted on one subassembly (the mirror) by first warning and reminding the passengers to look in the mirror before opening the doors by using the same signal which also serves as a turn signal, but with a light output indicator oriented towards said passengers, and in turn the same turn signal warns as second function (plus that of a turn signal), the environment, especially the passage towards the rear—the side, that the doors will open and in turn the laser emitter indicates the environment to where the doors will open.
- avoid collisions against columns or obstacles and have references to park
- indicates visible references (NOT virtually) when associated with the reverse gear,
- see the curb, see if the vehicle is properly aligned to the curb when parking,
- avoid a collision to the side of the vehicle at crossings, as a result that said side is its dark side (the main lights are at the front and rear thereof)
- welcome light marking the ground when getting into the vehicle and indicating that it is accessible when in service,
- warns that the doors of the vehicle are closed and secured,
- warns that the doors are correctly or incorrectly closed,
- emergency warning,
- indicates that the vehicle is in gear and will move, (negative indication, it switches off when put in said gear)
- indicates that a footboard, ramp or step access is available,
- externally indicates as a sign that the seat belt is NOT put on, on that side of the vehicle when it is circulating,
- indicates as a sign the connection of an alarm,
- two-way warning, A) warns that it is circulating very close to the vehicle having said laser device, upon being detected by a side presence sensor (aimed at motorcycles circulating between lanes); B) notifies with a function test in the mirror to the driver that a motorcycle is circulating very near the vehicle (even when seen in the rear-view mirror),
- visual alarm call to avoid distractions upon operating the interior handles of the vehicle before getting out and operating the door latches,
- alarm call with sound to create a conditioned behaviour and indicate to look in the mirror from inside the vehicle before opening the door,
- avoid collisions, obstructions when putting in and taking out stretchers to emergency vehicle personnel, such as ambulances, by marking an area and distance of protection,
- for special vehicles like taxis to indicate their status, free of occupants and close to being free of occupants,
- warns some sort of forgetfulness with subsequent negative consequences, such as leaving the lights on, not using turn signals when turning at a given speed, leaving the wheels turned when parking.

Associated Devices.

The laser emitter device is associated with at least two types of devices, not limited, selectable and combinable between devices of:

1—Activation of functions (sensors, detectors, switches, radar, controllers, nodes, interior handles of the vehicle with double movement or with devices necessarily operable prior to movement to activate the laser emitter and warnings in advance).

2—Action (luminous devices, in general, preferably located in the rear-view mirror, that generate an action that is at least the emission of a luminous signal, a light, a projection or a sound signal), selectable between:
- other laser emitters
- other luminous signal devices
- repetitive or sequential blinking side turn signal (especially the turn signal incorporated somewhere in the rear-view mirror) and that is at least emitted towards the rear and is visible directly from the illuminating surface by the environment, and in turn generates a function test signal of said turn signal which is visible by the occupants of the vehicle, which preferably uses the same light source (for these two functions, warning the driver and signal to the environment), deviated by optic means that guide it to a light output in the frame of the mirror, like a small window, visible by the driver and passengers, and therefore operates simultaneously with said turn signal);
- projection of figures, icons, or logos, preferably projected and visible between said laser line and the body, inside the area of conflict,
- complementary side light, or side position light,
- courtesy light or welcome light (lights that are activated especially by a remote control or some detector and illuminates the door or exterior handle to indicate that the vehicle is available to be boarded), an exterior open door indicator light,
an internal open door light indicator, located in the frame or inside thereof in an opening phase,
a courtesy light or ambient lighting in the inside of the vehicle,
a device that emits ultraviolet light (UV) from the mirror towards the body in order to activate luminescent material that responds to ultraviolet light, housed in the body itself and represents different forms, a signal, logo, figure, or luminescent mark; or helps to house elements like exterior handles or an opening system having said material or paint,
warning light to focus the attention on the mirror subassembly, especially the extended field of view or spotter mirrors,
warning lights to the driver from the mirror, (warning that detect object in the blind spot of the mirror, or anti-stress light warnings function test of the turn signal, said lights emit light, warning or signal from a part of the mirror assembly towards the eyes of the driver or passengers.
sensors or external peripheral radars, internal sensors, command buttons or switches, steering system sensors that detect turns of the steering wheel or lane changes, gearshift system sensors, reverse gear system sensors, opening of doors and trunk doors system sensors, location systems, alarm systems, changes of vehicle speed systems, Interaction with such devices permits the production of various functions based on the wavelength of the projected light (visible light of a different color or invisible), program the operation based on software programs that operate vehicle devices regulated by a function controllers or microchips (ex. type CAN bus to indicate time, form and situations of activation or deactivation), or the combination with other luminous function devices preferably those included in rear-view systems; and especially those that project images or logos in the area from at least one line of light projected to the vehicle body inclusive, or to the luminescent anagrams, or indications or luminescent logos on the body activated by ultraviolet light, so that these images or anagrams related to the function reinforce the message or warning (ex. with words or warning symbols or danger symbols universally known as, STOP, DANGER, WARNING, ATTENTION, DANGER or the like); consequently some associated devices go on to develop at least one new second function.

In order to activate the new functions, elements of the vehicle or said devices associated, non-limiting and combinable with others devices are directly or indirectly involved; sensors, commands, buttons, emergency light button, automatic emergency brake light, sound or light signals, "spotter mirror" or additional mirrors of extended field of view, indicator lights, comfort or courtesy lights, image projectors, logos or a projected figure, cameras, radar, short-range (wifi) or long-range radio frequency devices, open or close door, trunk, hood, or interior or exterior door handle devices, constraints that must be operated in advance to enable the action of said interior and exterior handles to generate early warnings when opening the door, sensors in the buckles of seat belts, external and internal temperature sensors, passenger presence or occupied seat sensors, remote controls, opening of other doors separate to the vehicle, a "dimmer" or timer, a controller, photo sensors that optimize their operation so that they activate in the dark conditions necessary for said projected illuminated line is perceived by the environment, alarm systems, gearshift changing systems, changing of direction systems, multimedia devices, augmented reality devices (complement goggles used by passengers of the vehicle or internal projection screens in the vehicle), telephones, radio, tracking devices type GPS or by radio frequency, computers, speedometer, emergency call devices, accelerometers or vehicle motion detectors, and/or computerized command network of the vehicle type CAN bus or similar. Access devices or the opening of door, hood or trunk by key, keys, capacitive, or radio frequency recognition type (RFID, radio frequency identification), image, codes, by approach, by contact, approach or presence detectors, including those foot-powered, or a combination thereof; areas, logos, images or luminescent material signals of the body, or a curtain sensor when the emission of the projected illuminated line is of a not visible wave length, ex. infrared (IR), a speedometer and a certain speed.

Activation Functions.

Functions are divided into two classes, for safety and comfort; they are activated in two ways:

1—Directly, when the laser emitting device is associated with activating elements (sensors, detectors, switches).

2—Associated, when the laser emitting device is associated as a reciprocal complement to at least another signal device or comfort light, especially those that emit light or a signal from the same side mirror, which are also previously activated with at least one activating element.

In both forms the activation is capable of following a characteristic order of the associated devices in a systematic way and in coordinated sequences by a circuit controller that forms part of the network of controllers and vehicle systems.

Present vehicles are equipped with a network of controllers type CAN BUS, or similar; CAN (acronym for Controller Area Network) is a communications protocol based on a topology bus for the transmission of messages between devices and nodes. It also offers a solution to manage communication between multiple CPUs (central processing units), controllers and nodes.

The CAN communication protocol provides the following benefits:

It is a standard communication protocol, it adapts to any device.

Flexible configuration.

It is a multiplexed network, that significantly reduces wiring and eliminates point-to-point connections; (uses the same cable for various uses) all those above-cited elements; said controllers are programmable in time, form and time of activation, permitting them to coordinate and combine in a systematic way;

activation by detector handles, switches, sensors, radar.

action by devices of (lights and sounds) supplemental warnings, double warnings or warning with different objectives (towards passengers and environment), obtain defined objectives and new non-limiting functions according to the program made by the vehicle manufacturer.

From this feature stems the advantage of assembling in one operation the multifunction rear-view mirror including the laser emitter, and with a wiring harness multiple devices work in solidarity like the proposed multifunction rear-view mirror, unlike the assembling of several devices in different places of the vehicle in several assembly operations.

The following features activate at least one visual warning comprising a line of laser light projected on the floor adjacent to the vehicle, or "basic visual warning".

Safety Features:

Security regarding the opening of the door is based on gaining a time interval between the intention to open the door and the action to open it.

The laser emitter device associated with other devices to achieve the objective of producing an effective warning to the driver or the occupants of the vehicle, its assimilation, reflection and reaction using two actions to gain time intervals are selectable and combinable between:

a first required anticipated action, before;

a second action of opening the locks on the side door.

In said interval of time internal and external warning signals, acoustic, visual or luminous signals, or friendly warnings connect to the occupants of the vehicle to guide them to look in the mirror in advance to said second action of the handle on the latches of the lock of the door in order to open it. With this assistance, the occupants are guided to look in the mirror, observe and reason through a voluntary and subjective action the opening of the door, and avoid opening the door by an automatic involuntary conduct of one impulsive movement capable of being produced in a state of distraction.

Said first action is selectable between;

1—Performing a double action or repeated movement to the internal door handle; the first movement connects warnings, the second and repeated movement opens the door.

2—Activating an advanced trigger or a superimposed cover on the handle which directly or indirectly functions as a sensor detector switch that connects warnings and allows the access to said inner door handle for a second action which is to open the door.

3—Operating a prior access, enabling, concealing or locking device, before contacting or being able to operate the internal handle of the door.

4—Connecting the warnings by a sensor, capacitor, contact, thrubeam or approximation switch that stands in the way of the hand towards the inner door handle.

5—Activating a prior sensor—contact switch that acts on the path of the Bowden cable traction that operates the internal door handle or in the locking mechanism.

6—Operating at least one detector sensor switch device housed anywhere in the compartment of the vehicle that connects warnings and also enables the inner door handle in order to open the door.

7—Touching at least one associated sensor detector switch device simultaneously with the inner door handle that actuates the warnings, before enabling the service of said internal handle.

The warning actions are combined in any of the following ways, among others:

a)—Warning with a generated line of laser light directed to the periphery before opening a door of the vehicle. It is activated from the outside upon opening the doors: with remote control, or key, or external handle; it is activated from the inside upon operating or touching the internal handles to open the door by a passenger, when said handles and/or the door has a sensor—switch that closes the contact preferably before operating the latches and during the opening. It is also capable to be achieved by some other qualifying action that indicates that the passenger will get out of the vehicle, like how to involve the sensor buckle to unfasten the seat belt and/or to put the gear in neutral, and/or stop the gear.

b)—Warning with a generated line of laser light, plus an external warning directed to the periphery and to the driver, consisting of; before opening a door, in combination with the turn signal of the mirror (which emits at least towards the rear in relation to the vehicle, visible by the periphery and uses a flashing frequency different than that of the turn signal, directed to the environment of the vehicle and in part also to the driver and passengers by one end of the illuminating surface or by an extra light output operation warning directed to the driver, (preferably with the light source of said turn signal carries out a warning with two goals, periphery and passengers).

c)—Warning with generated line of laser light, plus an external warning and acoustic sound warning directed to the periphery and the driver, consisting of; before opening a door, in combination with the turn signal mirror (which is emitted at least towards the rear in relation to the vehicle) which runs on a different frequency than the turn signal, directed to the periphery of the vehicle and, also partly to the driver and passengers from one end of the illuminating surface or from an extra light output operation warning directed to the driver; plus an acoustic warning to create a conditioned behaviour for the driver or passenger to help and remind them to look in the mirror before opening the door.

Said functions a, b, c, occur at low speed, or when stopping the vehicle or when the vehicle is detained, and are based on following an order of synchronization and achievement to coordinate the operation of associated action and activation devices that provide a circuit controller of the vehicle to which the involved devices are associated;

1—a first initial action to touch or move commands, or handles for opening car doors or to carry out a double movement to said handles (the first, activating the warnings and light and laser emitters, and the second, activating the opening of the door), or activate a prior device, lock, sensor or switch that enables the second subsequent action of the handle on the locks, in order to gain a time interval, react to warnings and help look in the mirror or to the rear before opening the door, so that the objective of closing a circuit and activating the warning system before or during the activation of the latches and locks can then be enabled and activated;

2—a first initial action, of warning to the environment through a line of generated laser light, perceived by the environment on the ground adjacent to the vehicle floor as a line of projected laser light or its variants to indicate to where the doors will opens before they open.

3—a first initial action associated with activating the turn signal of the mirror directed at least towards the rear and used at a different frequency from that used to indicate the turn; action representing a second use of said turn signal.

4—a first simultaneous action associated with luminous visual warning directed to the driver (in order to see part of the turn signal by its corresponding complementary light output, or through a small window in the frame of the mirror that functions as an output for the light emitted by said turn signal (thus, using the same light source of said turn signal), or using another warning in another part of the mirror, closer or further away from the vehicle body, or its periphery visible by the driver in driving position, or by a light output located in the mirror assembly (for any type of normal or electrochromic mirror still below the glass taking advantage of its dichroic properties, by a grid of laser machining on metallized glass or by reflective means permitting the emission of a signal from below it, in the spotter or its periphery), or using optic means, light guides or elements visible to the driver or passengers, located inside the vehicle (in the periphery of the window or in the inner lining of panel of the door affected by the door opening action.

5—plus a first associated action accompanying the others, at least at the beginning of a warning generated by an acoustic device, of a friendly sound for the passengers of said vehicle in order to produce a wake-up call or reminder and create a conditioned behavior that helps to look in the mirror before opening the door in said produced time interval;

6—plus a complementary action of a mirror device (courtesy light, ultraviolet light, other laser emitter, or a emitter of a figure or icon).

d)—Warning by two-way peripheral sensor. Warning with a line of generated laser light affecting the external object and environment simultaneously, activated by an external object when transiting near said security area or it is very close to the vehicle, and at the same time activates a luminous warning directed to passengers or the driver of the vehicle (preferably located in the rear-view mirror or its periphery). It activates when detecting any type of peripheral sensor or radar from the vehicle, the presence of said external object approaching before opening any door from inside said vehicle, or when the vehicle is detained but occupied with people and a sensor detects that occupancy, or when the vehicle is traveling below a certain speed and intends to change direction or simply when the vehicle is being overtaken dangerously close. Ex. motorcycles when moving between lanes in traffic or at red traffic lights passing by nearly skimming the vehicles. Said warning is capable of adding a visual two-way warning, an external and internal acoustic warning.

e)—basic visual warning plus an external or internal acoustic warning device that detects the presence of someone approaching from the rear according to the bi-zone sensor and indicates the side where the approximation and overtaking is taking place in case of having sensors for each side of the vehicle.

f)—Warning with the line of generated laser light, plus welcome light before boarding the vehicle when unlocking the door with the remote control or the key.

g)—warning with line of generated laser light when an emergency stop is performed. Ex. When changing a tire or carrying out repairs, or when stopping or braking dramatically in the middle of the street or highway, and when there is a notable decrease in speed.

h)—Warning with line of generated laser light and acoustic device when opening the trunk or hood.

i)—Warning with line of laser light and internal and external acoustic device when put in reverse.

j)—warning with line of laser light, plus simultaneous operation with a complementary reverse light or a in reverse side light that emits towards the rear a short-range in reverse light preferably to the rear wheel of the vehicle.

k)—Warning with line of laser light and acoustic warning when detecting an object or vehicle in the blind spot of the mirror.

l)—Warning with line of laser light as a visual reference when near a side object or column.

ll)—Warning with line of laser light when turning on the turn signal on the same side, at low speed, to warn pedestrians of a possible tangential collision or enclosure.

m)—Warning with line of laser light and sound when turning the steering wheel and stopping the vehicle.

n)—Warning with line of laser light when turning the steering wheel and not using the turn signal.

o)—Warning with line of laser light, plus multiple visual warnings by approximation levels of more than a line projected laser light.

A first or second line of laser light of the same or different color is emitted, ex. a green line, the furthest, red line, the closest, as a proximity warning of growing danger; or on public transportation in this order; a) red linen when the vehicle stops but the door is not operable, b) green line, when the stopped vehicle has an operable door, c) red line again, when the vehicle starts up and its door is no longer operable.

p)—Warning with line of laser light when connecting an alarm, or when put in operation.

q)—Warning with line of laser light to indicate free or about to be free taxi. Ex. taxi; a) red line, taxi stops to drop off passengers, b) green line, taxi is free or about to be free or standing free of occupants.

r)—Warning with line of laser light that disconnects or connects when the rear-view mirror folds or unfolds.

s)—Warning with line of laser light with light dimmer or shutoff in relation to a photo sensor.

t)—Warning with line of laser light activated like a light to the dark side of the car especially in low-visibility conditions (fog, darkness or dust).

u)—Curtain sensor based on a line of projected light of non-visible wavelength (IR), infrared at a wavelength of more than 800 nm, which function as a curtain sensor.

v)—Warning with line of laser light to mark an area and distance of protection in emergency vehicles, such as ambulances, when operating, loading or unloading stretchers.

w)—Warning with line of laser light, plus a simultaneous warning to the environment and to the driver before opening a door from an additional signal, located in the mirror base designed specifically as an early warning sign of a door opening (it is not a turn signal) and is emitted at least towards the rear in relation to the vehicle, activated at a different frequency than the turn signal directed to the environment of the vehicle, and in part also to the driver by one end of its illuminating surface or by an extra light output function warning directed to the driver; plus an internal acoustic warning to create a conditioned behaviour for the driver or passenger as help and a precursor to look in the mirror before opening the door.

x)—Disconnection of the warning with line of generated laser light or basic visual warning when opening the door gives way to activate a second visible warning signal by the environment at least towards the rear located in the frame or inner panel of said door.

Comfort Functions:

a)—line of projected laser light as a welcome that is activated when releasing the safety catches of the door opening with a remote control or any other type of opening system.

b)—line of projected laser light indicating the closing of the doors.

c)—line of projected laser light indicating if the door is correctly or incorrectly closed.

d)—Line of projected laser light together with another close projection, preferably between said line of laser light and the body that is a figure, matrix, logo, message, image or illuminated area which is simultaneously or sequentially activated.

e)—Line of projected laser light combined with the emission of UV light directed from the mirror assembly towards the vehicle body and produces luminosity of a logo, mark or image of luminescent material activated by light energy received from said UV light, located in the vehicle body, side door, or handle of said door in order to improve its perception and complement the action.

f)—line of projected laser light operated voluntarily by a switch from inside the vehicle.

As an alternative to the action of an associated mirror device emitting light or signal between said line of laser light and the vehicle; the mirror assembly for its condition of being a projecting element from body can emit for said condition an additional light or light to the dark side of the car that is not a direct light, and is emitted to note the presence of the vehicle, using a luminescent material located on a part of the side of the body (preferably the door) activated by backlit ultraviolet light emitted from the rear-view mirror towards the body with the intention of highlighting said luminescent material in a circumstance associated with the basic laser emitter, but in another circumstance is capable of functioning independently.

BRIEF DESCRIPTION OF THE DRAWINGS

The attached figures and examples are illustrative, NOT limited, a skilled expert in the material based on the same, relating similar elements or varying the design, can obtain at least in part a product, functions and similar effects without departing from the technology and concept of the present invention.

(WL4); located next to the window of a side door, preferably in the front angle of said window (WL5); from the siding panel of the door, preferably with some optic diffuser means or light guide.

(WL7); from the interior handle assembly of the side door (31).

Figure 22:
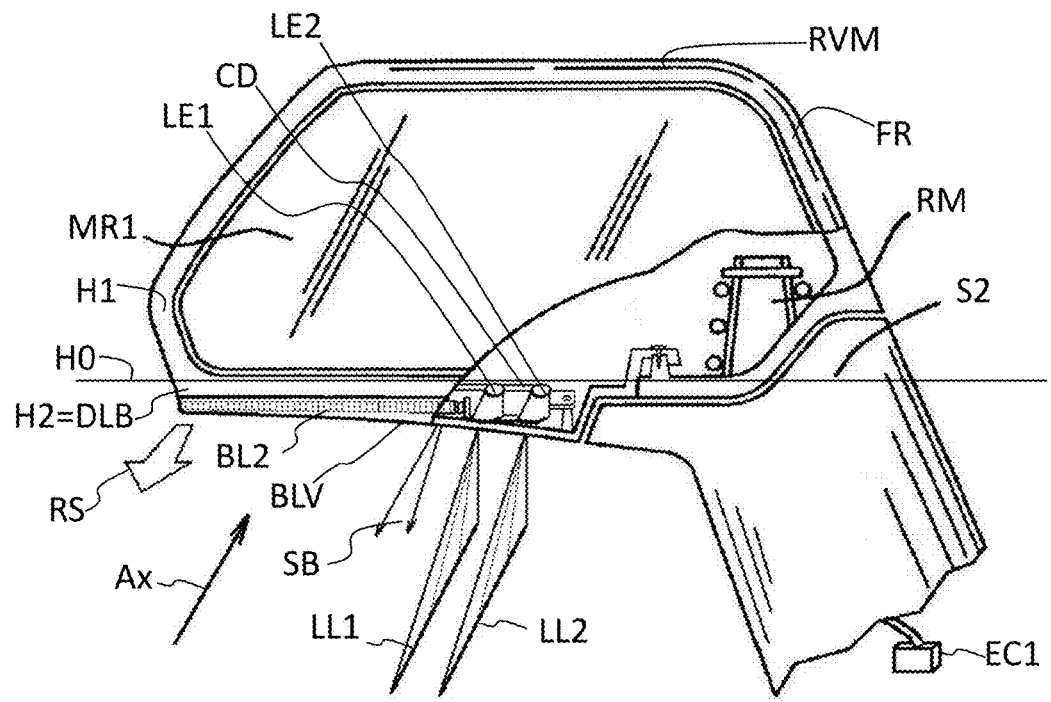
FIG. 22 is a previous view of the mirror of FIG. 20, where the "blinker" device (BL2) has its light output towards the rear (RS) and part of its volume (BLV) is below a level of a horizontal plane (H0), lower than the mirror level (MR1) and outside the volume of movement of the mirror (MR1) position allowing it to emit signals toward the rear all along the bottom cover (H2) from a position lower than the housing (H1), or said light output towards the rear is included in the lower frame (FR) of the mirror assembly.
Figure 34:
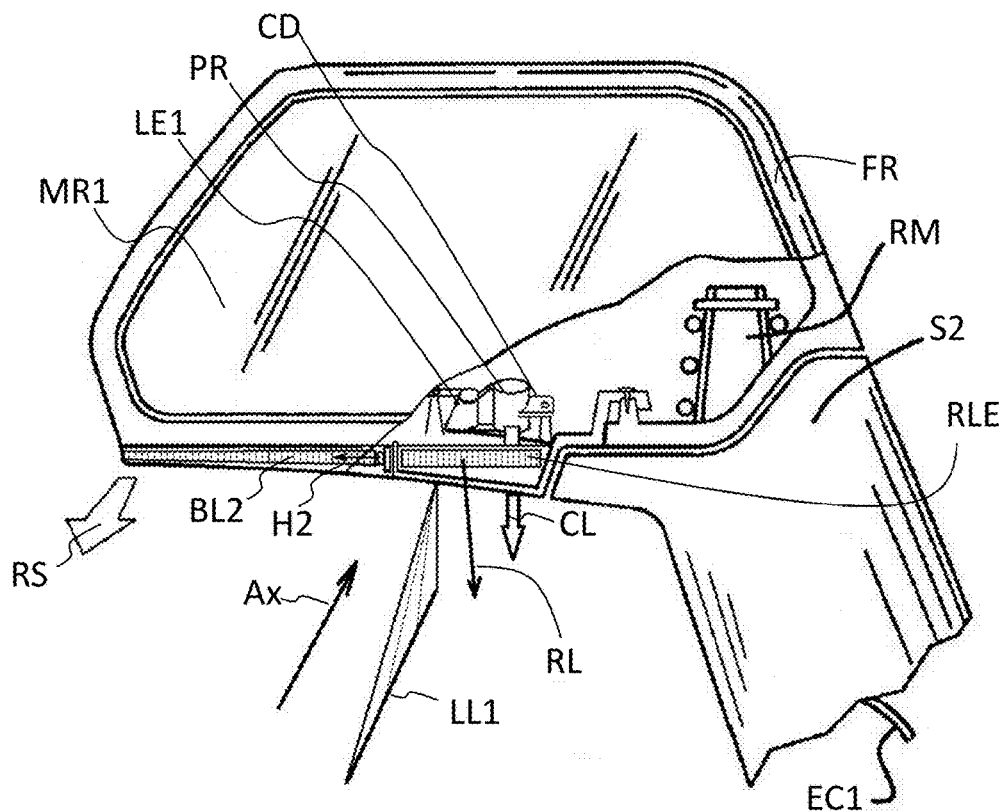

FIG. 34 is a previous view of a rear-view mirror like in FIG. 22, showing rear-view mirror with "blinker" (BL2) in a lower housing cover (H2) emitting a signal towards the rear (RS) and has an associated reverse light emitter (REL); and also a laser emitter device (LE1) and mini projector or courtesy light (PR) integrated in said lower housing cover (H2).

Figure 23:
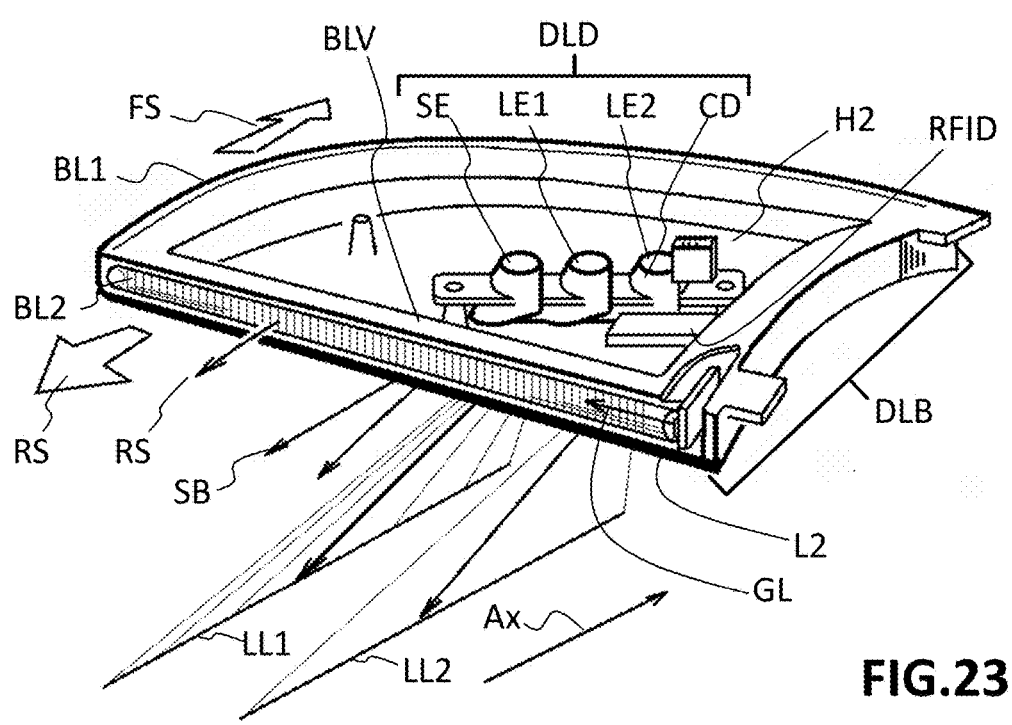
FIG. 23 details the multifunction signal and non-limited light emitter device from FIGS. 20, 21, 22 which integrates in a subassembly, "laser-blinker" device (DBL) that is similar in shape to a lower cover (H2); structural, not functional, or a device with fewer features, can be replaced or interchanged for having the same fitting; composed of a "blinker" device and a laser emitter, in turn the "blinker" forms a subassembly with the bottom cover (H2) and consists of two parts, front "blinker" (BL1) and rear "blinker" (BL2) using a light emission technique for light guide (GL) of internal reflection, plus the integration into a container (DLD) or two laser emitter device, a first main laser (LE1) associated with a second laser emitter (LE2) and a thrubeam sensor (SE) that emits the sensitive barrier (SB), and an inductive recognition device by radio frequency identification (RFID); all positioned in said cover (H2) by a mounting container positioner (CD) or inner housing subassembly of the laser emitter device (DLD), which is tightly integrated by welding, clips or screws to said cover.
Figure 35:
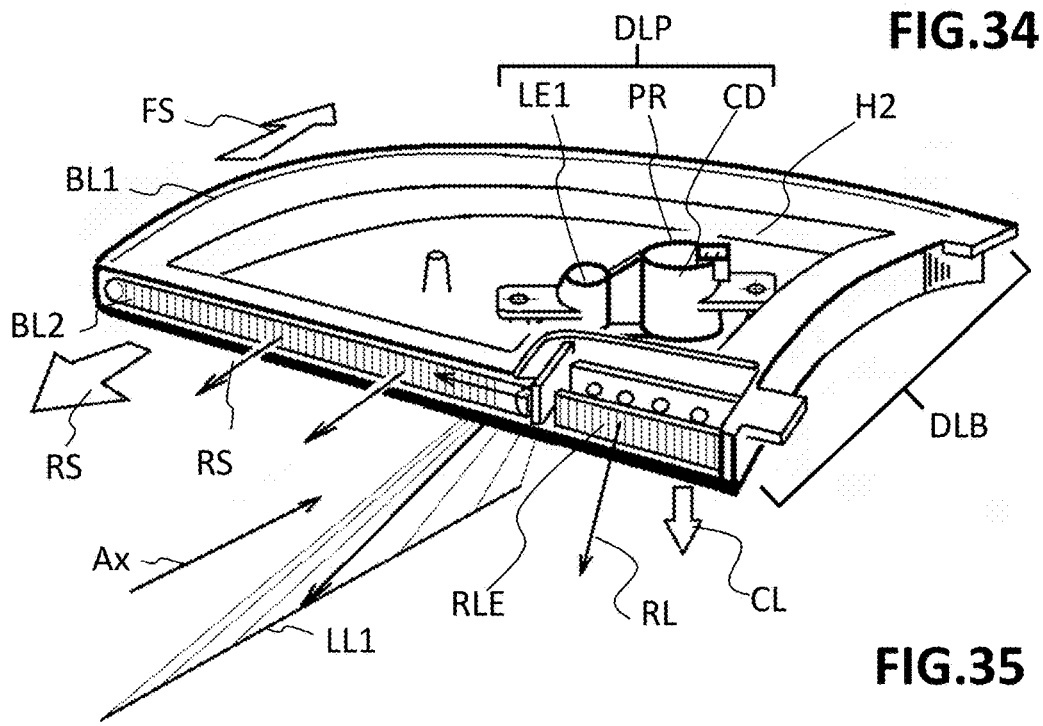

FIG. 35 is a detail of a similar device as that in FIG. 23 which includes a subassembly with a blinker-laser device (DBL), the front signal "blinker" (BL1), the rear signal "blinker" (BL2) emitting a signal towards the rear (RS) and front (FS) using the light transmission technique by an internal reflection guide, plus the integration into a container (DLP) that integrates a laser emitter device (LE1) associated with a projector or courtesy light (PR) that emits zenithal light (CL) and integrates a reverse light emitter device (RLE) that emits on the side of the vehicle, light towards the rear and downwards (RD).

Figure 8:
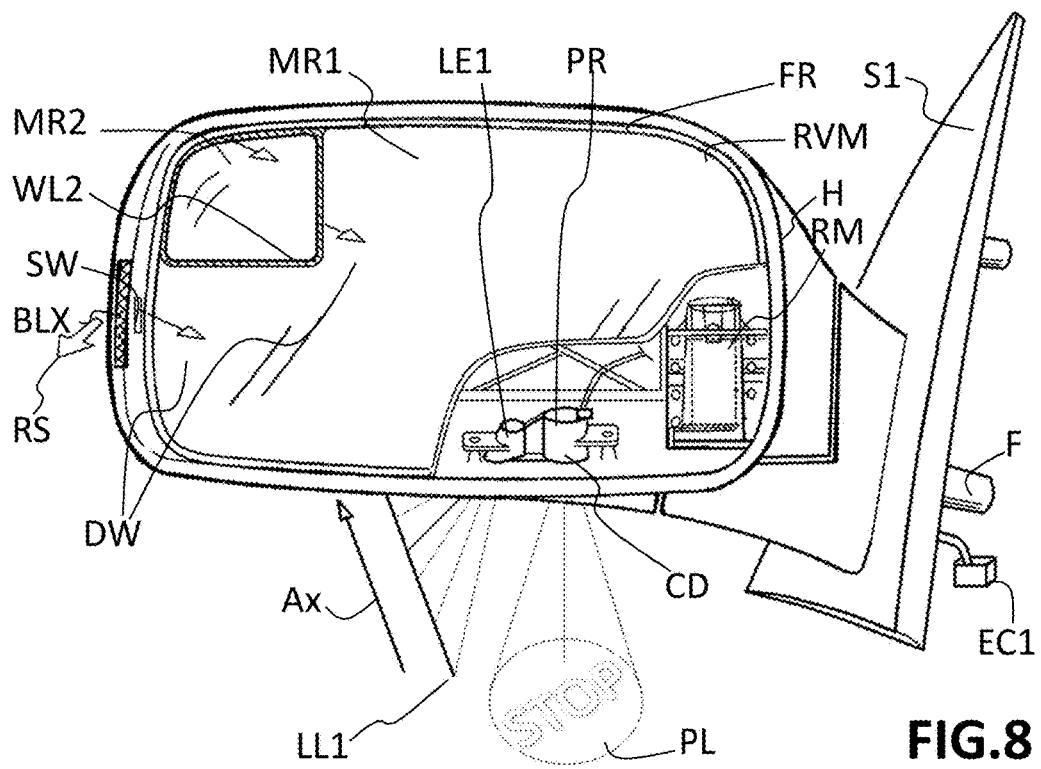
FIG. 8 is a previous view of a rear-view mirror with "blinker" (BLX) similar to FIG. 7, but with the mirror (MR1) associated with a spherical wide-angle mirror "spotter" (MR2) by a luminous peripheral warning signal (WL2) that generates a warning to the driver (DW).
Figure 36:
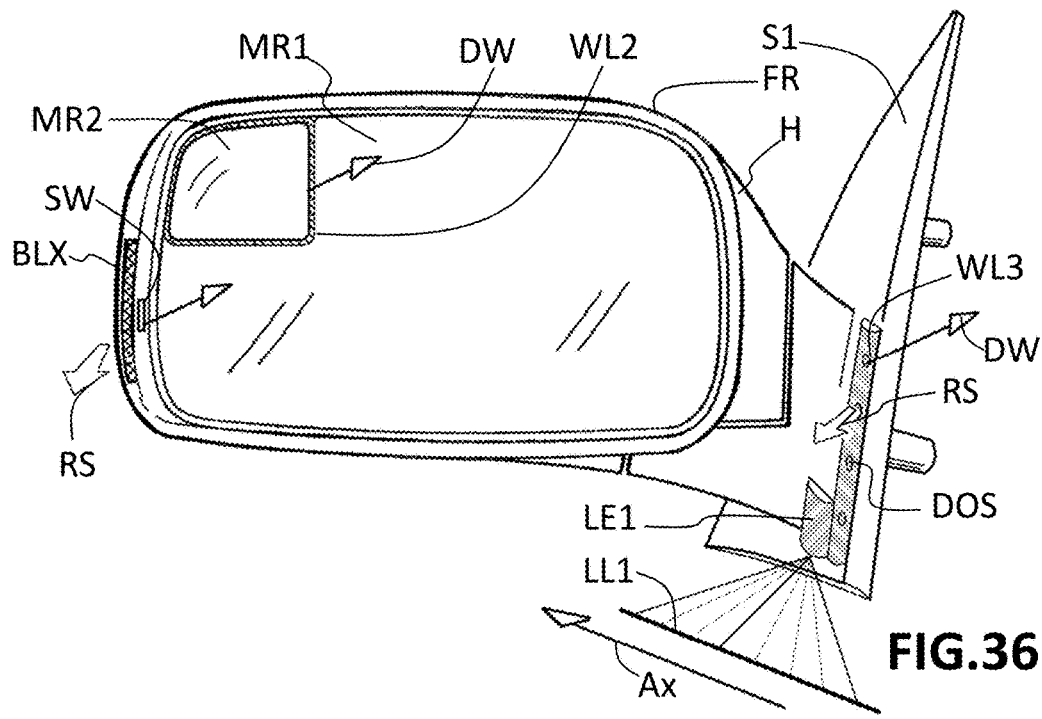

FIG. 36 is a previous view of a mirror with "blinker" similar to FIG. 8, but with a laser emitter device (LE1) (DOS) and door opening signal associated with the door-window base (S1) of the mirror, which emits towards the rear (RS) and is partly visible by the driver as a function warning (WL3) to capture the attention of the driver's eyes (DW) so as to remember to look in the mirror (MR1), (MR2).

Figure 37:
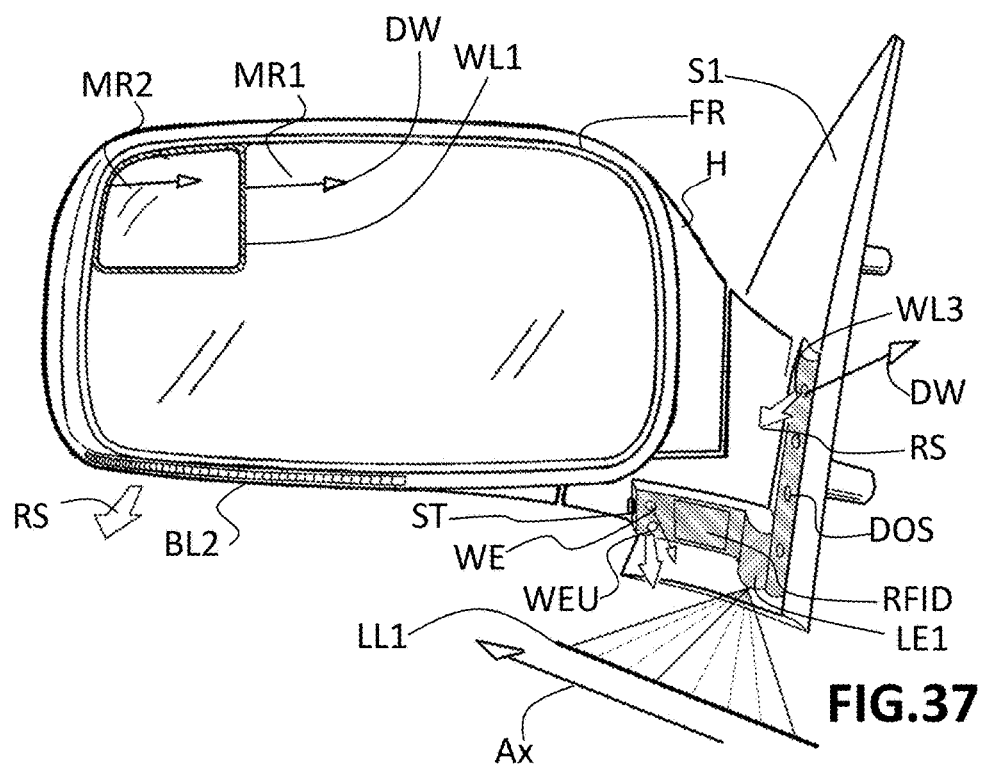

FIG. 37 is a previous view of a mirror similar to that in FIG. 36, but with a "blinker" emitting towards the rear (BL2) located in the lower frame of the mirror (FR), and a warning to the driver (WL1) that is emitted from the periphery of the auxiliary extended field of view mirror or "spot mirror" (MR2).

Figure 1:
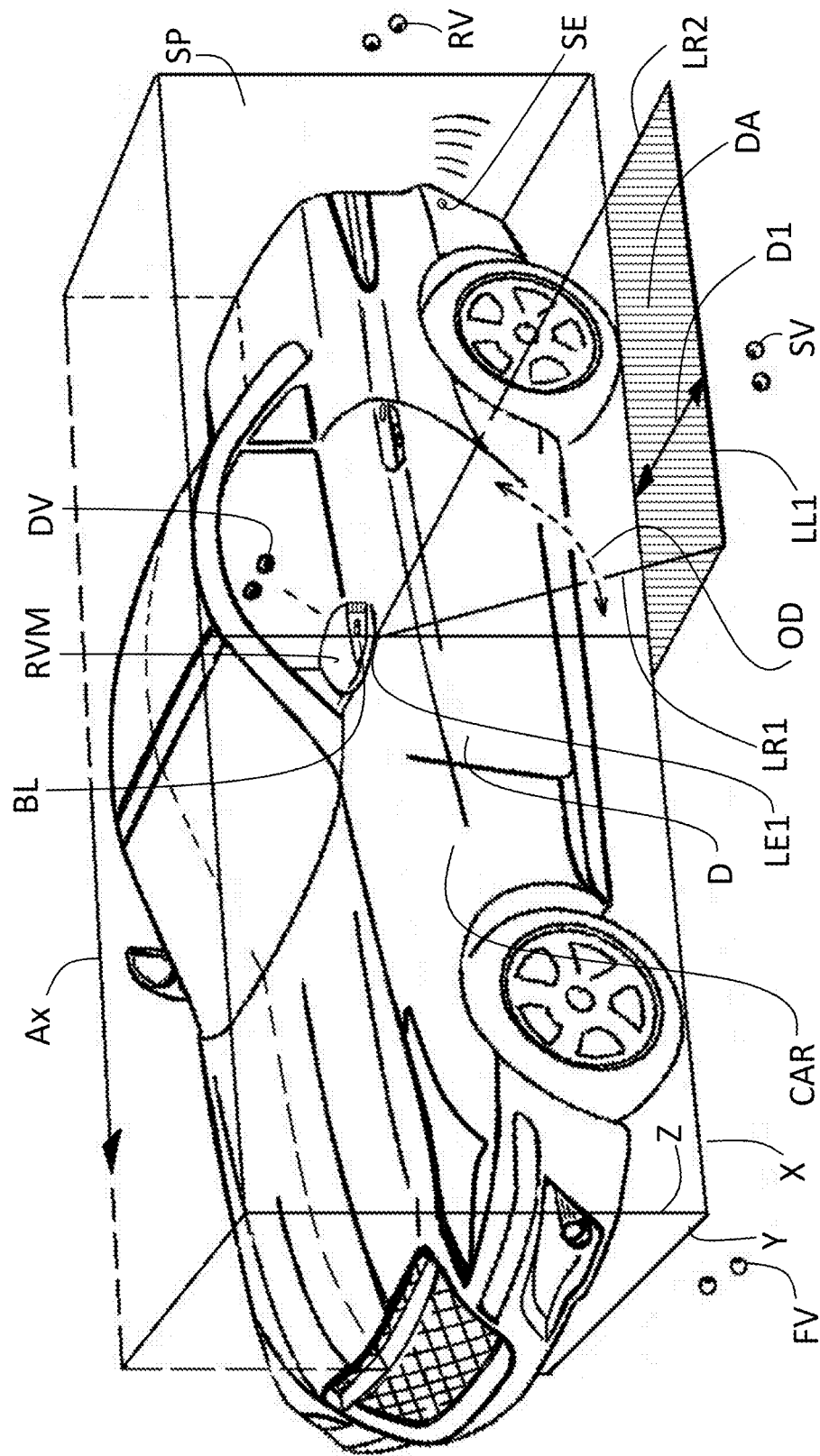
FIG. 1 is a perspective view of the front side of a vehicle where the laser line (LL1) generated by a laser diode device (LE1) located in the side mirror assembly (RVM) emitted towards the ground to the side of the vehicle and parallel to the axis (Ax) thereof, at a distance (D1) indicating to where the door (OD) will open to define said area of exposure to danger (DA). The axis and lateral plane (PS) reference, vertical axis (Z), longitudinal axis (X) and transverse axis (Y) of the vehicle body (CAR) are shown.

FIG. 38-A perspective view of the front side of a vehicle similar to that in FIG. 1, shown as an example of an alternative application to locate a laser emitter (LEH) in an element of the side door (D) integrated in the outer side handle (HE) on the side of the body of the vehicle (CAR), capable of forming an assembly and to combine its function with the turn signal of the mirror (RVM) or "blinker" (BL) and integrate into said outer handle an ultraviolet light emitter (EUV) that emits ultraviolet light downwards, preferably in the housing cavity or depression (DD) of the handle which has a luminescent material (LU) that activates its luminosity in response to said ultraviolet light (UV).

FIG. 38-B is a perspective view of the front side of a vehicle similar to that in FIG. 1, showing alternative points to locate a laser emitter (LA) on the side of the body (CAR) of a vehicle, capable of combining its function with the turn signal of the mirror (RVM) or "blinker" (BL). This configuration DOES NOT fulfill the goal of mounting in an operation or with a same wiring harness multiple devices as when they are integrated into the mirror assembly, therefore it DOES NOT offer advantages to the manufacturer of the vehicle in the assembly line. There are alternative examples of locating the laser emitter from the door towards the rear, (LE3), integrated in a side position signal, or in the rear light (LE4) or rear bumper in the wraparound part on the side. Alternatively, a laser emitter (LE3) on the side of the body, located from the door towards the rear of the vehicle which generates a laser line (LL1) is shown. Alternative locations are shown to locate the laser emitter (LE 4) in rear bumper or fender; and (LE5) rear pilot light, that can generate a similar effect and create an area of exposure to danger (DA); Other alternative locations (LA), especially from the door towards the front are not applicable: fenders, front bumpers, headlights, fins, doors and external door handle.

Figure 39:
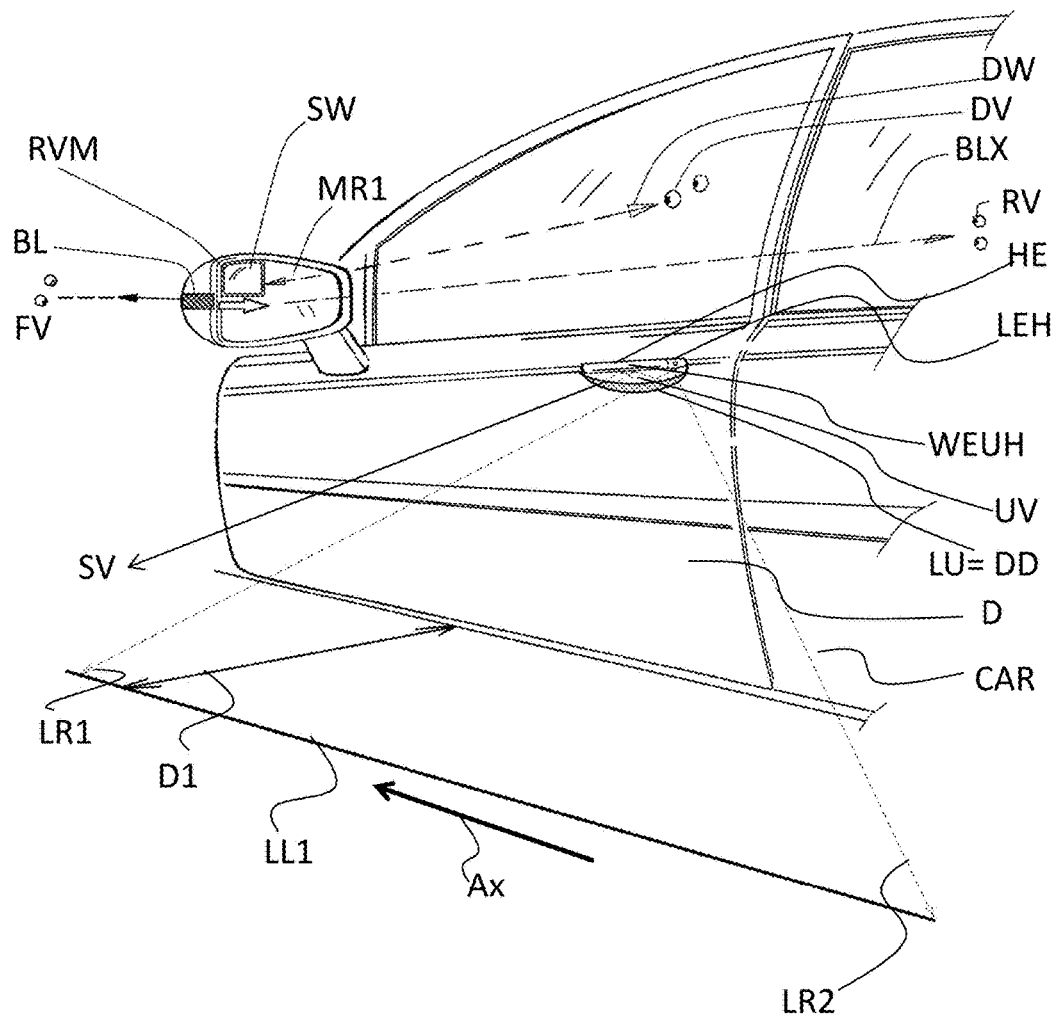

FIG. 39 is a back side view of a part of a vehicle, showing in detail the door (D) and rear-view mirror (RVM), but as an alternative application of the laser emitter (LEH) integrated in an assembly in the outer side handle (HE) with lights associated with an ultraviolet light emitter (WEUH) that especially illuminates the housing cavity of said handle that is a depression in the door (DD), and in turn coincides having partly luminescent surface material (LU) that produces luminosity with said ultraviolet light (UV) when opening the doors with a welcome action when operating, for example with a remote control door opening, an action makes said cavity (DD) remarkably visible (DD) and facilitates the location of the handle (HE) from a side point of view (SV).

Figure 40:
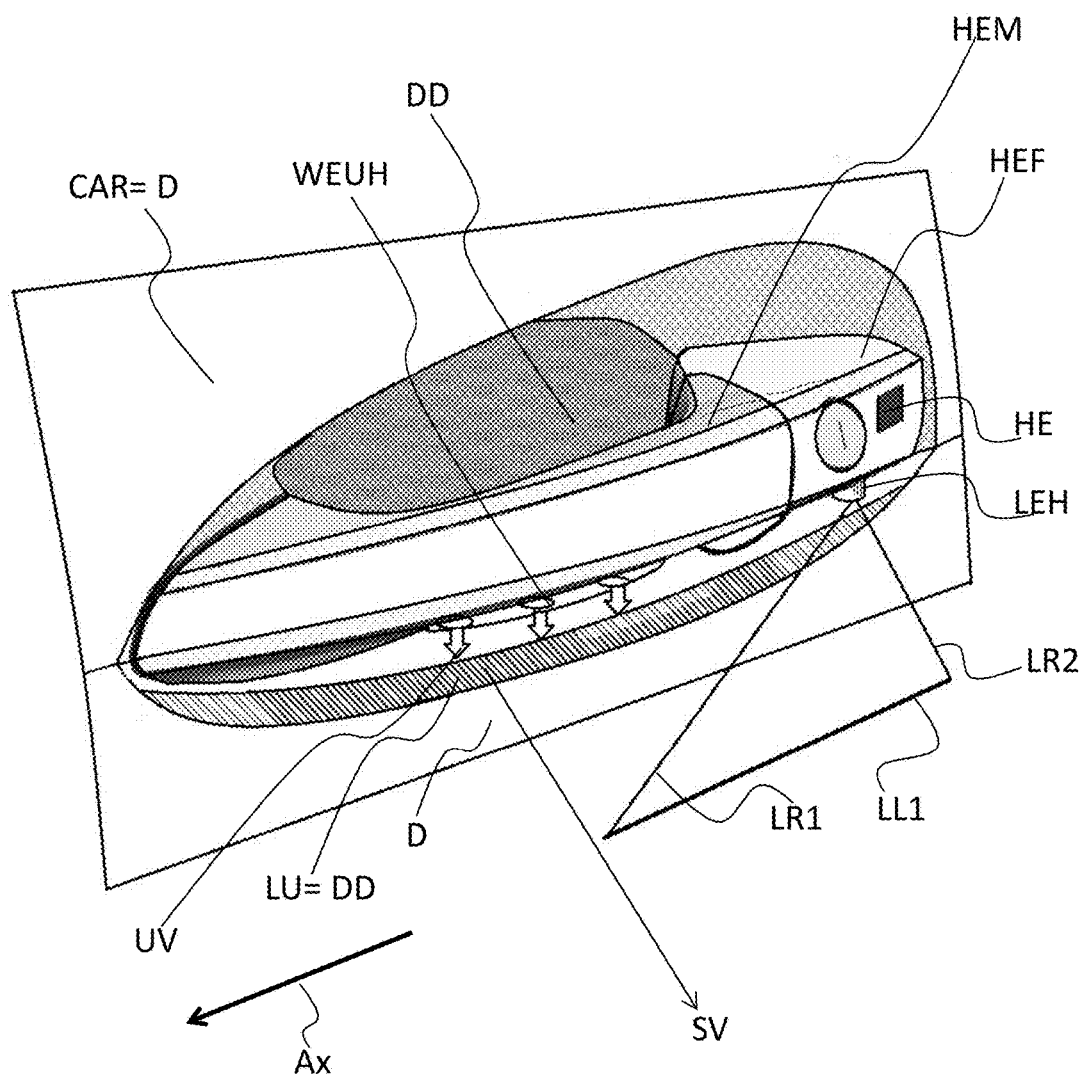

FIG. 40 is a detailed view of a part of the door (D) with an external handle (HE) including a laser emitter (LHE) on the fixed part of said lever (HEF) and an ultraviolet emitter (WEUH) in the movable or traction part for opening the door (HEM), showing the laser line (LL1) generated between the beams (LR1) and (LR2) aligned substantially parallel to the axis of circulation (Ax) of the vehicle, and the associated ultraviolet welcome light emitter (WEUH) that generates beams (UV) that activate the luminosity of a luminous material (LU) that occupies part of the cavity or depression of the door (DD), generating a luminous element visible from a side point of view of the vehicle (SV).

Figure 41:
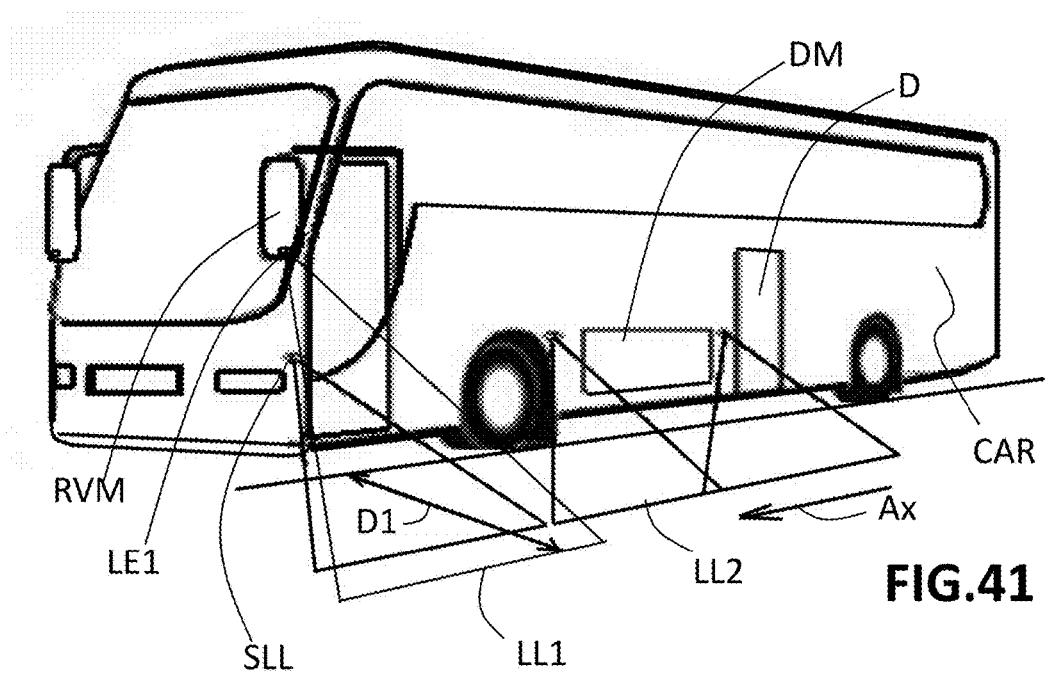

FIG. 41 is an alternative example of a perspective view of the front side of a vehicle of more than 6 meters, of a long bus or truck, showing the projected laser line (LL2) by a multifunction laser diode device (SLL) located on the side of the body, which is integrated with a side position light and is associated with a first laser emitter device (LE1) that generates a laser line (LL1) located in the mirror assembly (RVM). Such laser transmitters complement each other.

Figure 42:
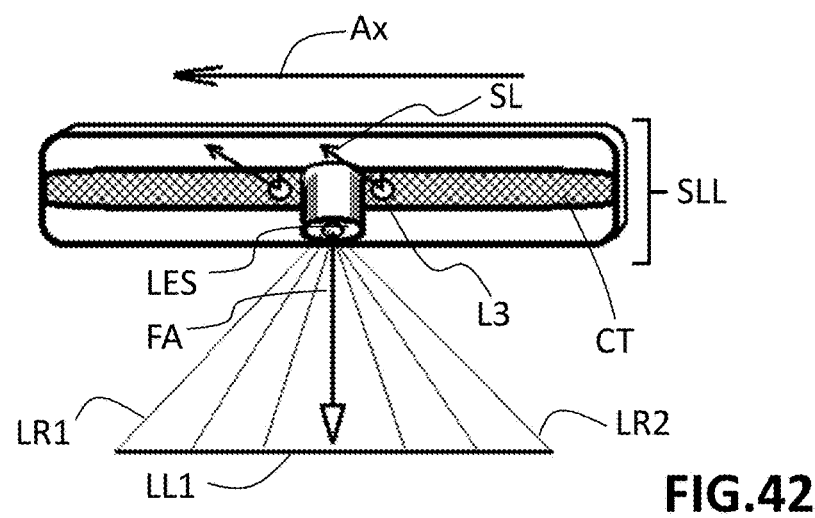

FIG. 42 is a detail of a side light device (SLL) like the example applied in FIG. 41, with side position light emission in the direction (L3) perpendicular to the axis of the vehicle (Ax) associated with a laser emitter (LES) which produces projected laser line (LL2) and also integrates a catadioptric reflective surface (CT).

Figure 43:
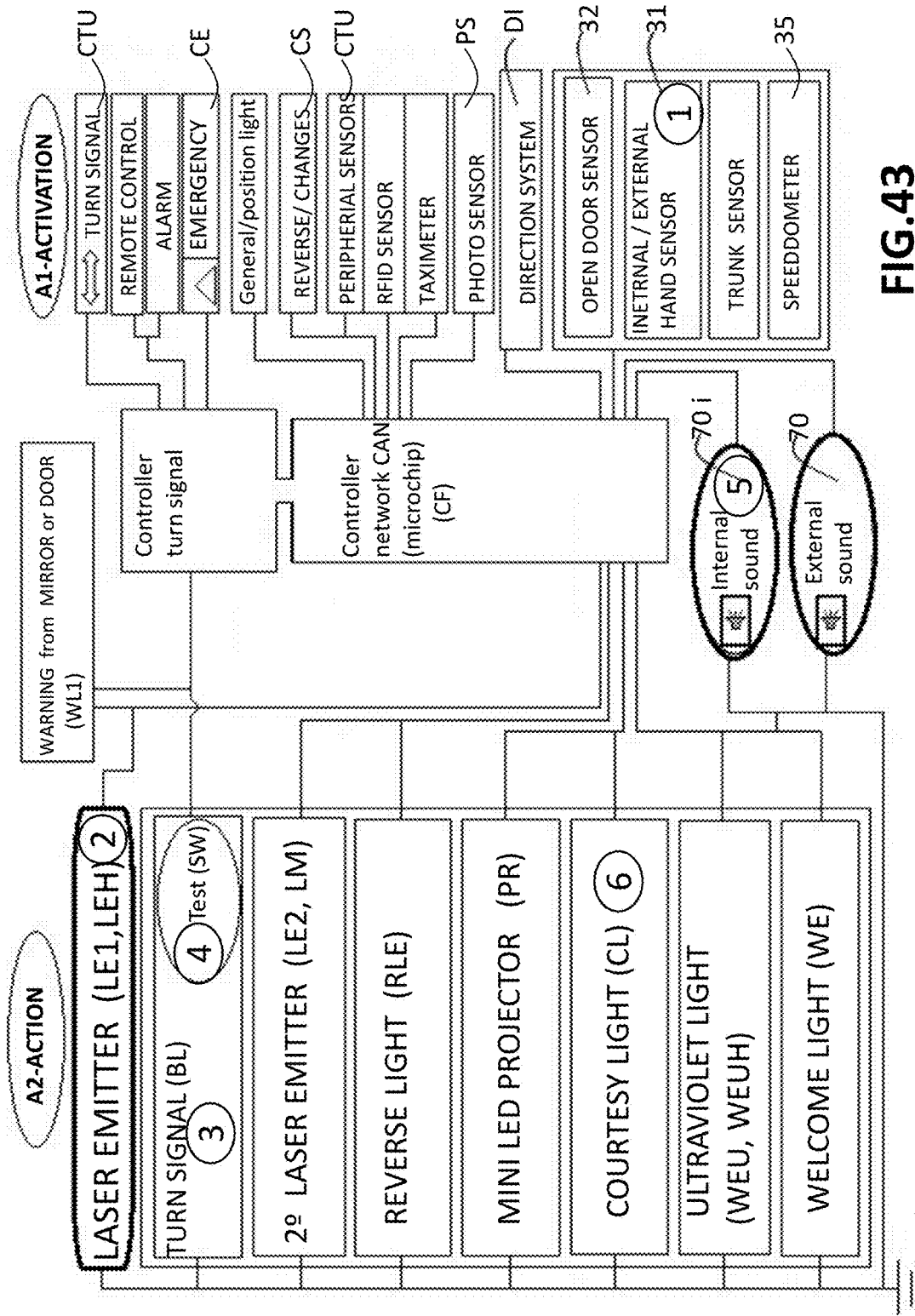

FIG. 43 is a scheme of operation of devices associated with the laser emitter (LE1, LEH) capable of actions in different configurations; Devices in row A1-ACTIVATION are shown; Row A2—ACTION devices are controlled by a CAN network controller (CF) that interconnect the devices and regulate ignition time, synchronization, coordination, order, dimmer on/off, frequency and form. A sequence for open door warning that warns the driver and the periphery at the same time is represented by circles numbered 1, 2, 3, 4, 5, and 6.

DETAILED DESCRIPTION OF SEVERAL EMBODIMENTS

In order to understand the best way to carry out the present invention, the following examples of application are illustrated and explained. First, the laser emitter and the characteristics of its location which are the basic reference for achieving the functions to be produced are explained.

Figure 9:
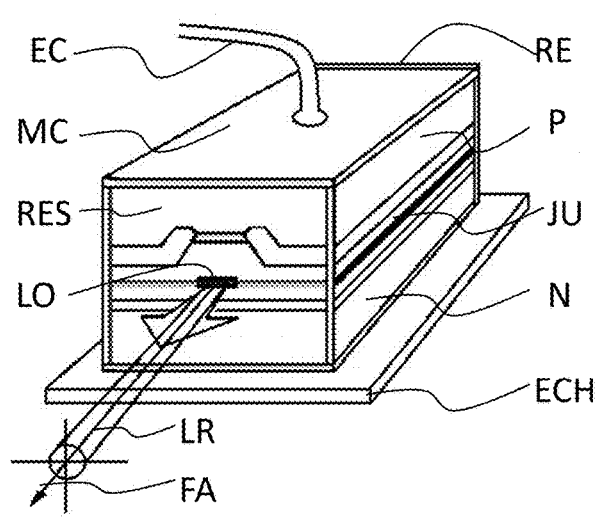
FIG. 9 is a detail of a chip of a laser diode.
Figure 10:
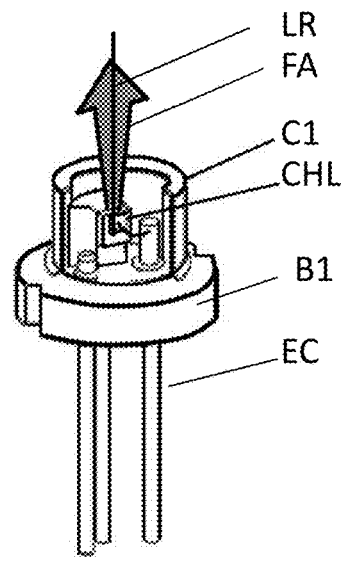
FIG. 10 is a detail and section of a laser diode.
Figure 11:
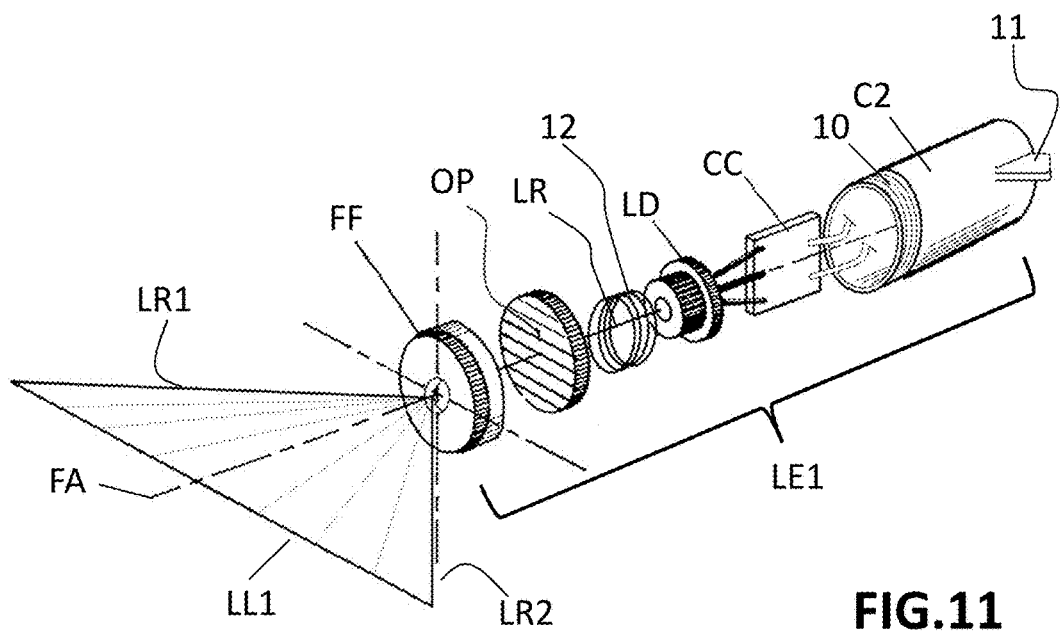
FIG. 11 is an exploded detail of a line laser emitting device (LE1).

The device is presented as a module or capsule (LE1) and is characterized by generating a projection of laser line onto the ground from a low-cost, energy efficient, lightweight, low-volume, long-life and standard laser emitter for the left and right side of the vehicle as shown in FIGS. 9, 10 and 11.

Said laser emitter capsule or module (LE1), (LEH) having:

A bigger capsule (C2), which includes a laser diode (LD), a circuit controller (CC) interface that regulates the current of the laser diode, said laser diode emitter emits at least one beam with a wavelength between 15 and 1100 nanometers, including a wavelength between 380 and 680 nanometers of color of visible light (and even of color of invisible infrared (IR) or ultraviolet (UV) for sensor or luminous activation functions). Interposed to the focal axis (FA) of the emitted beam is an optic with at least a prism that is an optic type Powell (OP) that dissociates a laser beam (LR) that passes through it in beams that generate at least a FAN angle between two end beams (LR1 and LR2) that projected on the ground is at least one laser line (LL1) having a cover (FF) on one end, with a system to adjust la focal length of the laser projection that is normally a fine pitch thread and can include a spring (12) to maintain said optic in an optimum focal position as shown in FIG. 11.

The location of the laser diode emitter device (LE1), (LEH) allows to generate a projected laser line (LL1) on the ground adjacent to the vehicle, where said line is substantially straight, not limiting to be curved, regular or irregular, continuous, discontinuous, or a geometric figure ex. a circle or ellipse. Said projection originates from a point of emission, in a part of the body represented by a parallel longitudinal vertical plane (SP) to the axis of circulation (Ax), and formed by the vertical (Z) and horizontal (X) axes that represents the lateral side of the vehicle; said laser light emission (LR1) is directed from said point of emission downwards, relative to the axis (Z), to the side relative to axis (Y) and at least in part towards the rear relative to the axis (X) as shown in FIGS. 1 to 5.

Figure 6:
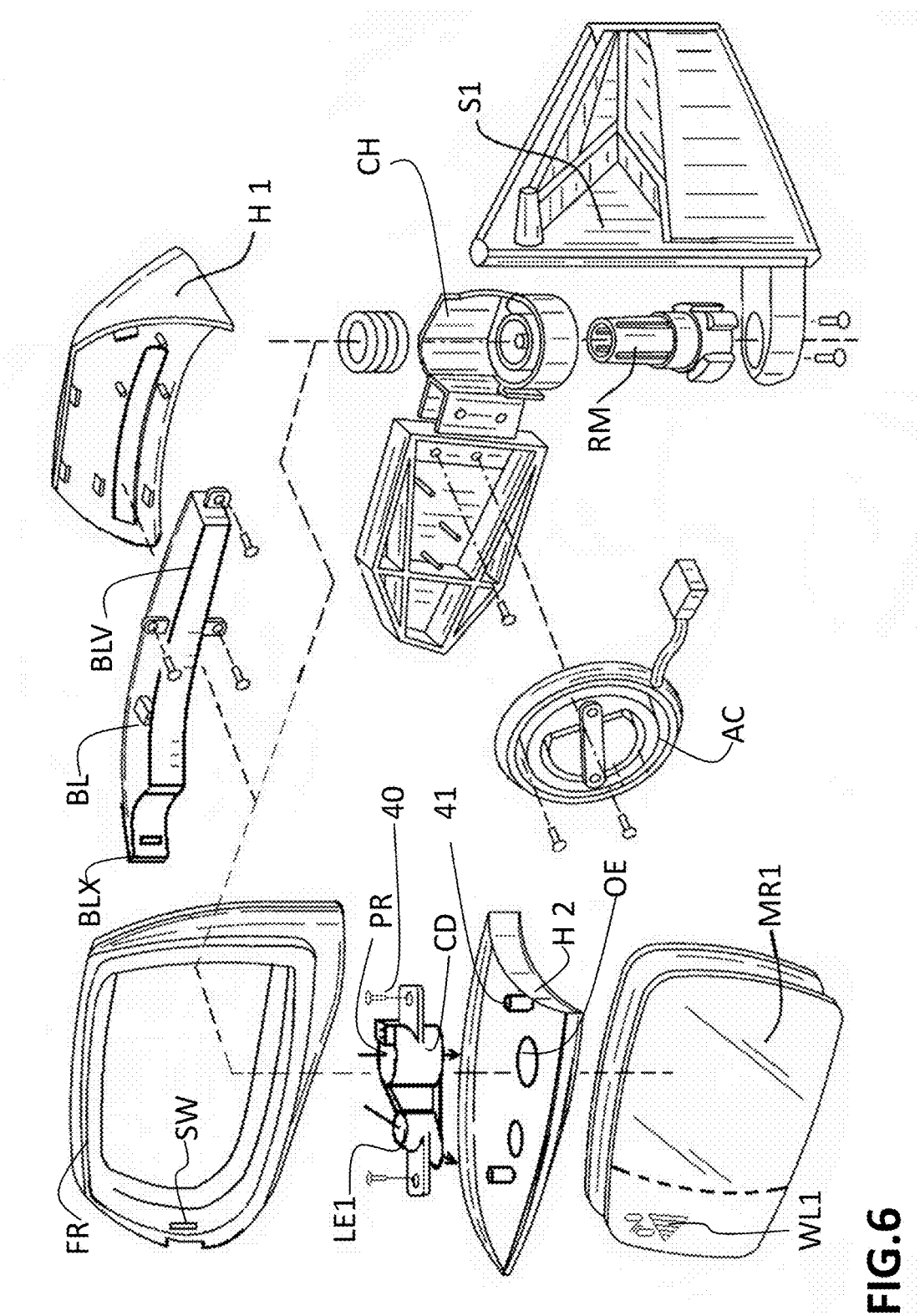
FIG. 6 is a perspective exploded view of a side mirror assembly, showing the lower housing cover (H2) subassembly where a laser emitter (LE1) and a mini projector (PR) are integrated and included in an inner housing container and mounting positioner (CD) having a lower outlet of emitted laser light (OE), and the turn signal device "blinker" (BL) has the light output towards the rear from the end (BLX) and the volume of its body (BLV) is behind the mirror (MR1).
Figure 7:
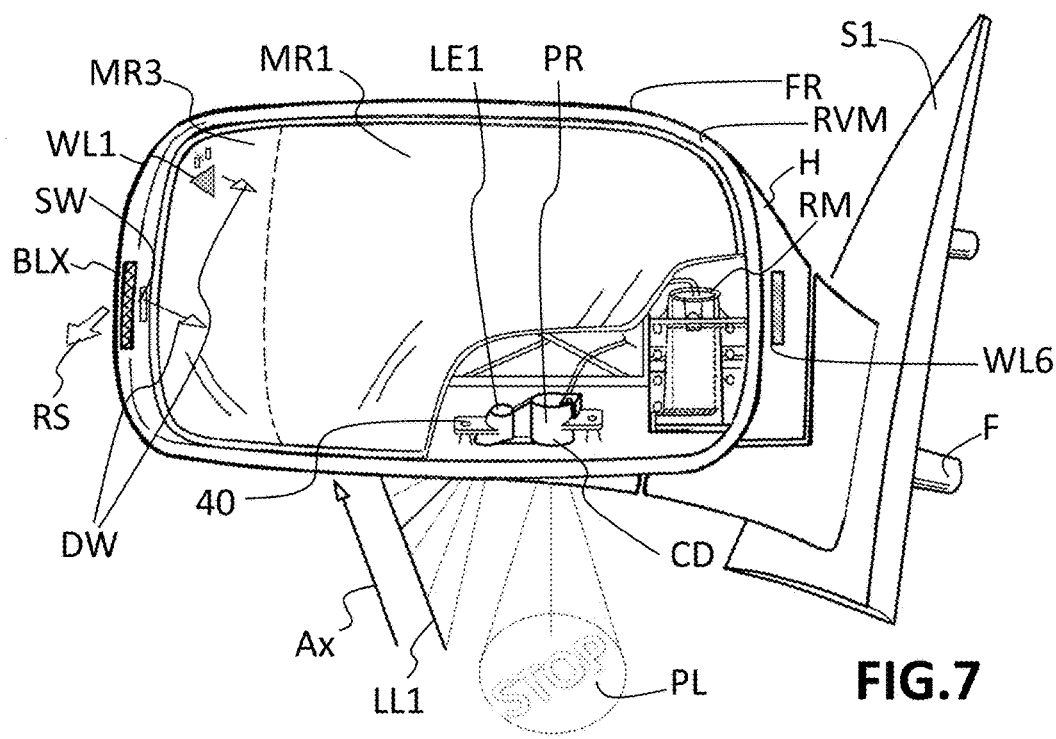
FIG. 7 is a previous view of a rear-view mirror with a "blinker" device that has much of its volume within the volume of the mirror assembly body (RVM) and in turn behind the mirror (MR1) and emits a signal towards the rear (RS) from the remote end of the body (BLX) with a signal outlet function test and warning (SW), and warning signal (WL1) under the mirror glass (MR1, MR3), these two signals direct their beams as a warning to the driver (DW); and transparency, where we see an assembly (CD) integrated by a laser emitter (LE1) and a mini projector (PR) and three variants of luminous warnings are observed by the driver: (SW) from the frame (FR) of the housing (H) of the mirror assembly, furthest from the vehicle body,
(WL1) from the mirror subassembly (MR1, MR3),
(WL6) from the frame (FR) or the housing (H) of the mirror assembly, closest to the vehicle body.
Figure 32:
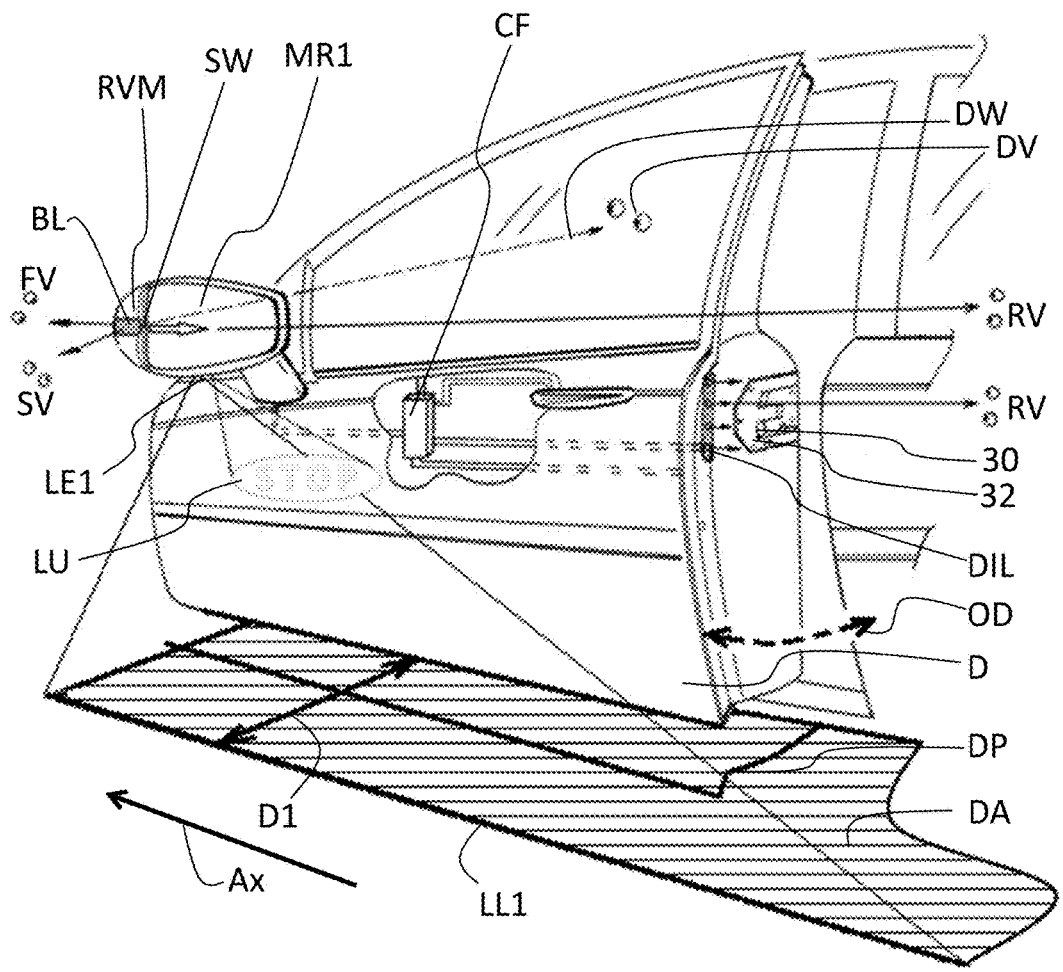
FIG. 32 is a back side view of a part of a vehicle, showing in detail the situation "open door" (OD), and mirror (RVM) with laser emitter (LE1) and associated lights, turn signal or "blinker" (BL), which emits at least towards the rear and is visible from behind the vehicle (RV), and also has a small window light output (SW) visible to the driver's eyes (DV), an ultraviolet light emitter that illuminates the image of luminescent material (LU); it highlights an area of exposure to danger (DA) representing up to where the doors open (D) and the action of the door opening (OD) and the projection from the door to the ground (DP). A node or chip door function controller is shown (CF).

The best way to carry out the invention is to apply it to a basic example of execution according to FIGS. 1, 6, and 7 which relates to a laser diode emitter device (LE1) preferably located in the lower housing cover (H2) of a side mirror (RVM) of a vehicle (in this case said lower cover is a "blinker" or turn signal device (BL)); a position that allows to emit without interference downwards, towards the side, and at least partially towards the rear a series of beams of laser light that generate at least one first line of laser light projected (LL1) on the ground adjacent to the vehicle, substantially directed parallel to the vehicle and at a distance (D1) and a length similar to the length from the mirror represented on the ground to the end of the vehicle from behind. It defines an area of conflict or exposure to danger (DA), and also a comfort zone when the action of the signal is informative (ex. as a welcome to unlock the doors); this area is similar to the projection on the ground (DP) of its open door (OD), FIG. 32, in order to avoid accidents, crashes, and collisions with doors, people, objects and vehicles that are passing or are within said distance and conflict area (DA). The basic points of view of the periphery of the vehicle are shown, frontal view (FV), side (SV), and rear (RV), where it is clearly perceived that said projected laser line (LL1) is clearly visible through these points of the periphery, and we see the marked area of conflict (DA), allowing for the producing of visual warnings to the periphery to generate functions comprising said reflected visual warnings on the ground.

According to exemplary embodiments and to produce new functions, in addition to the first line of projected laser light (LL1), the device is associated with some other action devices that generate a visible light emission or signal and corresponds to; other laser emitters, courtesy lights, welcome lights, icon projectors produced by different non-limiting methods, which emit a signal or complementary luminous figure, preferably between said first laser line and the body.

Examples of devices that provide;

A second or third laser emitter with optics (OP3 and OP4) treated with nanometric etchings as shown in FIGS. 2, 3, 4, 7, 8, 14 and 15, to generate without limitation; icons, images, lines or dot matrix laser light; lines that intersect at one point and/or parallel lines that apparently do not cross in nature and scope approximately the length of the vehicle, curved lines.

Figure 31:
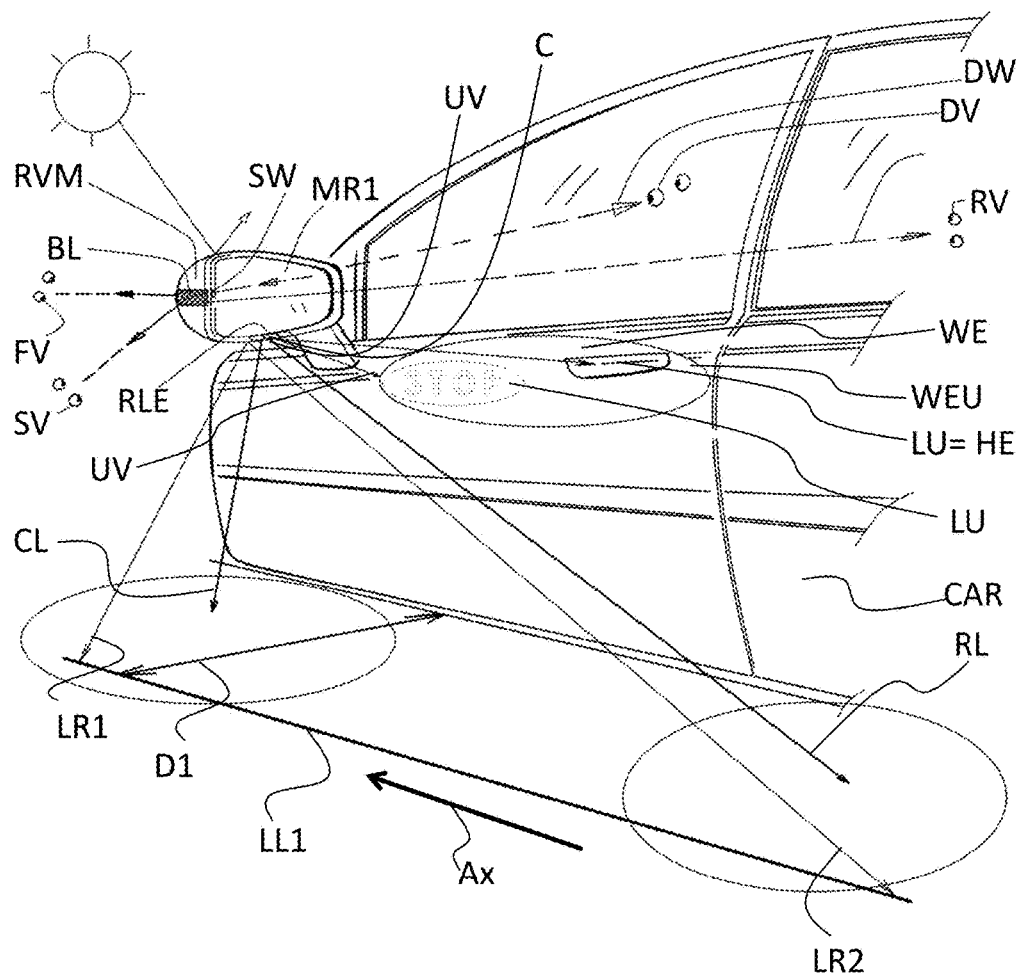
FIG. 31 is a back side view of a part of a vehicle, showing in detail the door and mirror with laser emitter and lights associated with an ultraviolet light emitter that especially illuminates the door and the handle which in turn have a part of luminescent material (LU) that produces luminosity with said ultraviolet light (UV) when opening the doors with a remote control like the welcome light (WEU); associated alternative functions like the side reverse light (RL) emitted from the mirror (RLE) that illuminates the side of vehicle towards the rear-down (RD) until the rear wheel approximately, and the courtesy light (C) or (PR) that illuminates in a zenith form (CL) downwards to the ground near the door like a welcome light before boarding the vehicle and is preferably operated by a remote control to open or close the doors, open the trunk, or stop the vehicle.

Or a mini projector with LED source as shown in FIGS. 6, 7, 17, 18 projecting a figure by transparency of a film interposed between the light source and the optical means;

Or a courtesy light (CL); or a light welcome (WE) as shown in FIG. 31;

Or a signal of a luminescent material (LU) applied on the body, activated by an emitter (EUV) of ultraviolet (UV) light that is emitted from the same mirror in the direction of the body affecting the lighting on the door, the external handle, as shown in FIGS. 26, 27, 28, 29 and 31;

Or a side ground light or complementary reverse light (RLE) on the side passage—to the rear (RL) of the vehicle as shown in FIGS. 24, 25, 30, 31, 34 and 35.

Figure 2:
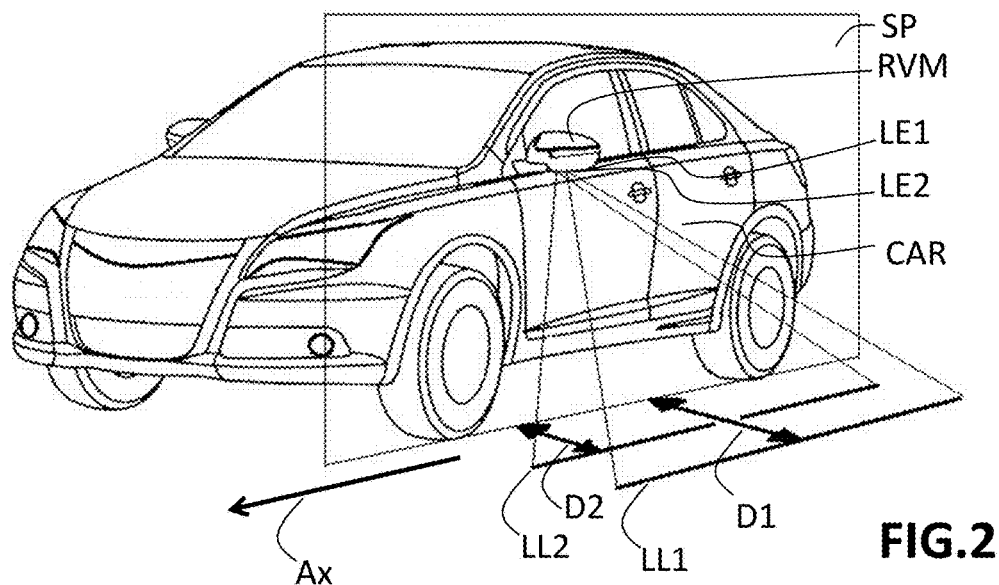
FIG. 2 is a perspective view of the front side of a vehicle, showing a first line of generated laser (LL1) by a laser diode device (LE1) located in the side mirror (RVM) and a second line of generated laser (LL2) by a second laser emitter (LE2) of same or different color defining a distance (D2) to the vehicle, which involves another level of risk, different to the distance (D1) of the first projected laser line (LL1).

Referring now to FIG. 2, it has a second associated laser emitter (LE2) that generates a second laser line projected (LL2) on the ground adjacent the vehicle but of the same or different color, at a different distance (D2), substantially directed parallel to said first emitted laser line, such that they apparently do not cross each other, and that they respond to another activation system supposedly a sensor or peripheral or thrubeam radar, an example applicable as a warning on two levels when driving at low speed and the vehicle activates the flashing indicator in order to turn in the presence of pedestrians or obstacles and warns of danger by proximity to avoid crashing into, stepping on or enclosing of the same, as shown in FIGS. 2, 19, 20, 21, 22 and 23.

Figure 3:
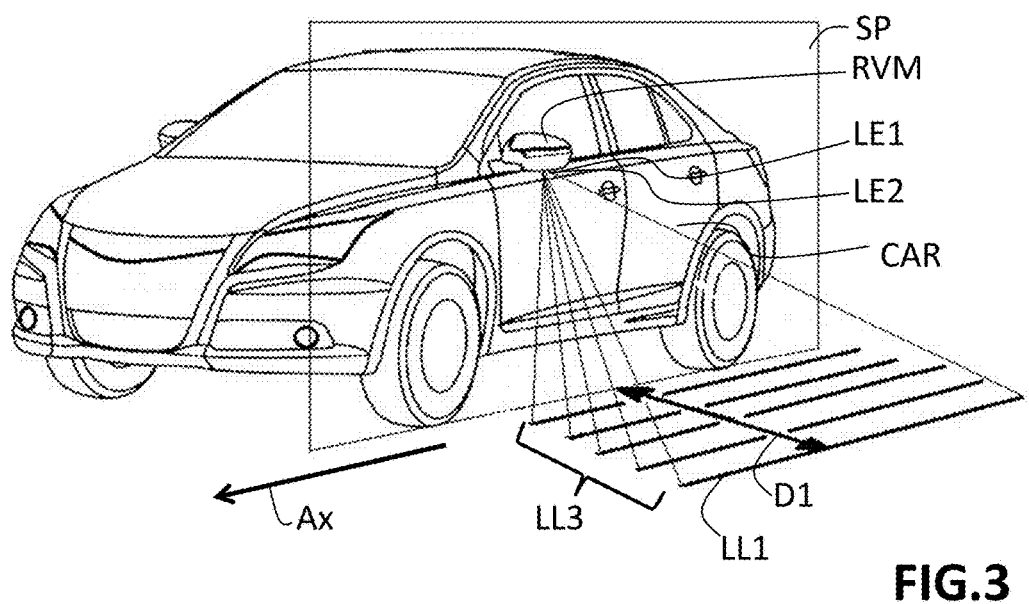
FIG. 3 is a perspective view of the front side of a vehicle, showing a set of projected laser lines (LL1, LL3) from two associated laser devices (LE1, LE2) located in the rear-view mirror (RVM).

As shown in FIG. 3, it has a second associated laser emitter (LE2) that generates a series of laser lines projected (LL3) on the ground adjacent the vehicle having the same or different color as the main line (LL1). It could also be generated with a single laser emitter in monochrome by the action of at least one nanometric optic or a combination of two optics (OP 3, OP4), FIGS. 14, 15, which have an engraved surface and smooth areas that allow the laser light to pass through consistently and reproduce a deliberately designed figure or icon.

Figure 4:
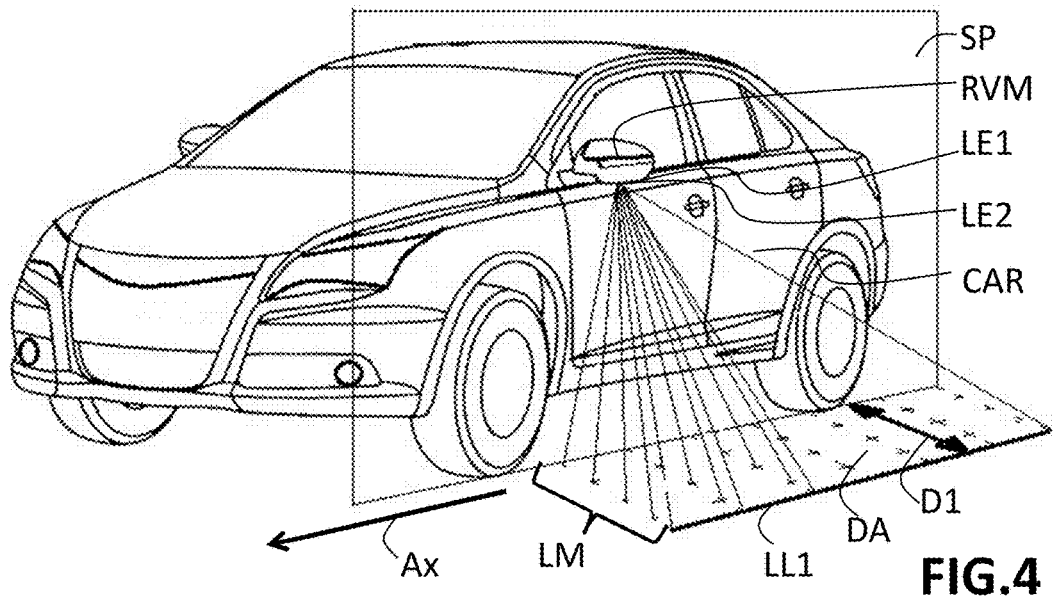
FIG. 4 is a perspective view of the front view side of a vehicle, showing a projected dot matrix of laser light (LM) associated with the projected laser line (LL1) from two associated laser devices (LE1, LE2) located in the rear-view mirror (RVM), to indicate an area of exposure to danger (DA).

Referring now to FIG. 4, it has a second associated laser emitter (LE2) that generates a laser dot matrix projected (LL3) on the ground adjacent the vehicle with the same or different color as the main line (LL1).

Figure 5:
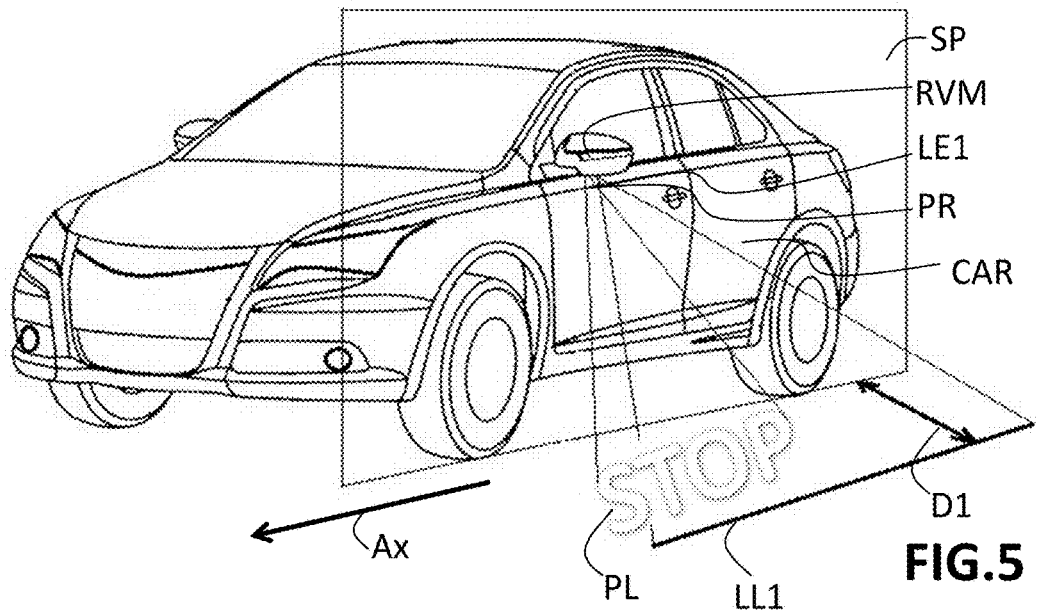
FIG. 5 is a perspective view if the front side of a vehicle, showing a generated laser line (LL1), and a projected figure (PL), complementing and reinforcing the visual warning, from an associated mini LED projector (PR) to the laser emitting device (LE1) located in the mirror assembly (RVM).
Figure 17:
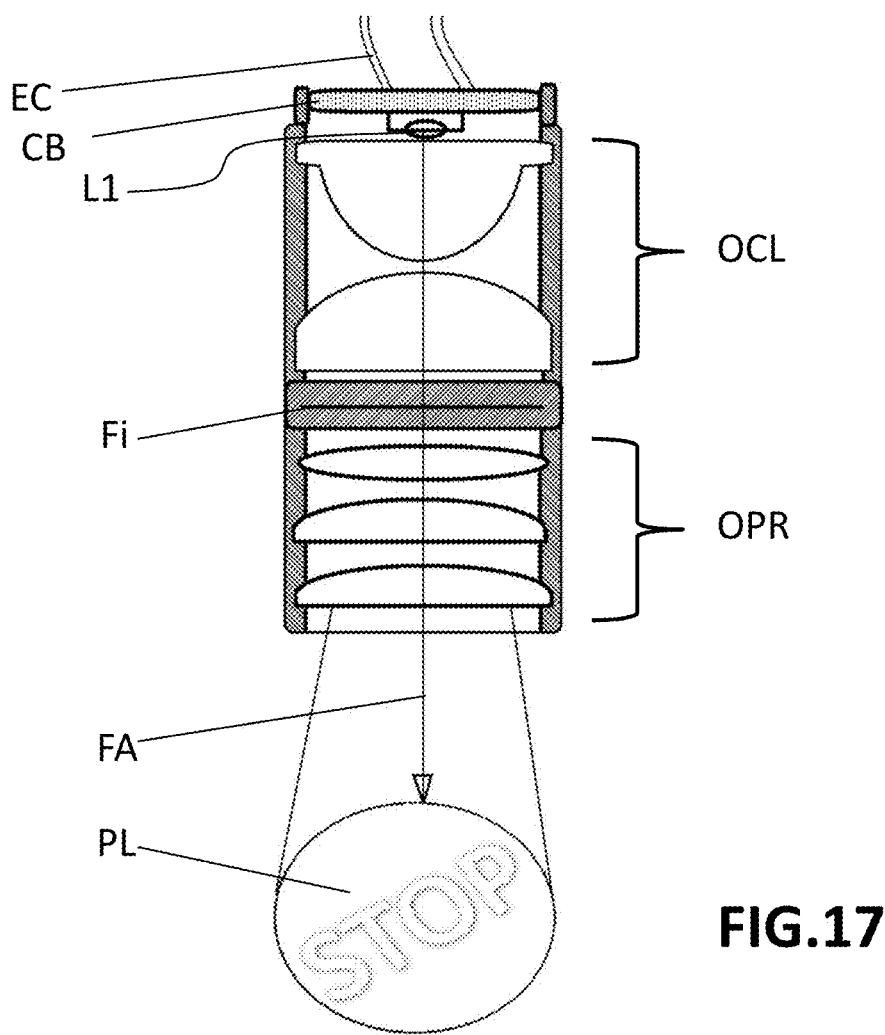
FIG. 17 is a section of a mini projector image with a LED light source.

According to an exemplary embodiment in FIG. 5, it has an associated second emitter and a mini projector (PR) as shown in FIG. 17, that generate a figure, icon, logo, or signal projected (PL) on the ground adjacent to the vehicle preferably located between the main line (LL1) and body. A similar effect could be produced by a laser emitter with a treated nanometric optic, such that it generates the projection of a figure on the ground adjacent the vehicle, in the same way and vice versa, said mini projector with LED source could project a luminous line substituting the first main laser emitter (LE1), but it would be a more expensive and bulky alternative method.

The laser device has:
A laser light diode source (LD laser light emitter, laser-diode in English, diodo laser in Spanish), is a semiconductor device similar to a LED but under the right conditions emits laser light.
LASER (English acronym meaning light amplification by stimulated emission of radiation, in Spanish amplificación de luz por emisión por radiación). The laser diode has a structure that works in the following way:
The "laser diode" (LD) generates light stimulating photons between layers of semiconductors (P) and (N), for example Al, In, Gal (aluminum, indium, gallium) on a germanium or silicon glass core which is a junction (JU), then the photons emitted in the right direction are repeatedly reflected on the reflecting faces of said semi-conductors, and that have a reflective face (RE) on one end of said laser chip (CHL) and another on the other end partly reflective (RES) because it has a part by where the light comes out (LO), and these internal reflections help, in turn the emission of more stimulated photons within the semiconductor material and therefore help it amplify the light. Part of these photons leave the laser diode through the partially transparent face on the side (LO). This process results in that the diode emits consistent light or laser beam (LR) of the same wavelength, same phase, with a focal axis (FA) and a small emission angle and high light concentration. Due to the stimulated emission, a high spectral purity is obtained. Therefore, the light emitted by these types of diodes is type laser; these diodes are known by name, "LASER DIODE". Said chip to extend its life are constructed preferably on two metal layers of heat dissipation (ECH) and (MC) which in turn are the electrodes or connection points (EC) as shown in FIG. 9.

The laser diode (LD) has the laser chip (CHL) protected in a first smaller capsule formed by a base (B1) and a small capsule (C1) and electrical connectors (EC) that constitute the laser diode (LD), being the base or emission source of our device which can also carry sensors and would be a capsule type photo laser diode as shown in FIG. 10.

An associated circuit controller (CC) which helps maintain a steady flow to not overheat it, and in some cases this circuit could be located outside the larger capsule. NOT for this would it cease to be a module or a capsule, but with a separate electronic interface.

A an optic, multiple Powell lens type, with a traverted tooling facing inward (OP).

These elements are enclosed in a bigger capsule (C2) preferably metal (including fins to dissipate heat and extend the life of the laser chip (CHL)), and form the laser line emitting device (LE1); the closure occurs by placing the intermediate optic (OP) between the laser diode (LD) and focal adjustment cover with internal thread (FF) (sometimes it is necessary to have a pressure spring (12) to maintain the optic in a stable position) that act on the fine pitch thread (10) of said bigger capsule (C2) to provide the focal length that generates the main laser line (LL1) with accurate precision according to the projection distance; in turn it has a shape, fin, guide or positioning mark (11) to facilitate the assembly in a determined position and adapt itself to a container or housing of the device (CD) to which it is associated and in turn to a part of the mirror assembly as shown in FIG. 11 and ex. the lower cover (H2) of a mirror as shown in FIGS. 6, 22 and 23.

Figure 12:
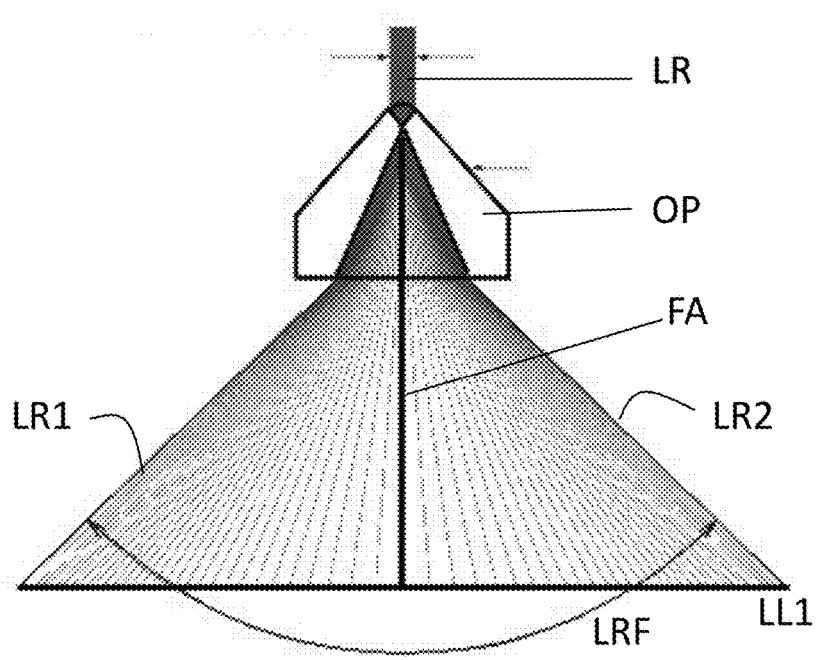
FIG. 12 is a section of a basic Powell optic (OP), generating a laser line (LL1).
Figure 13:
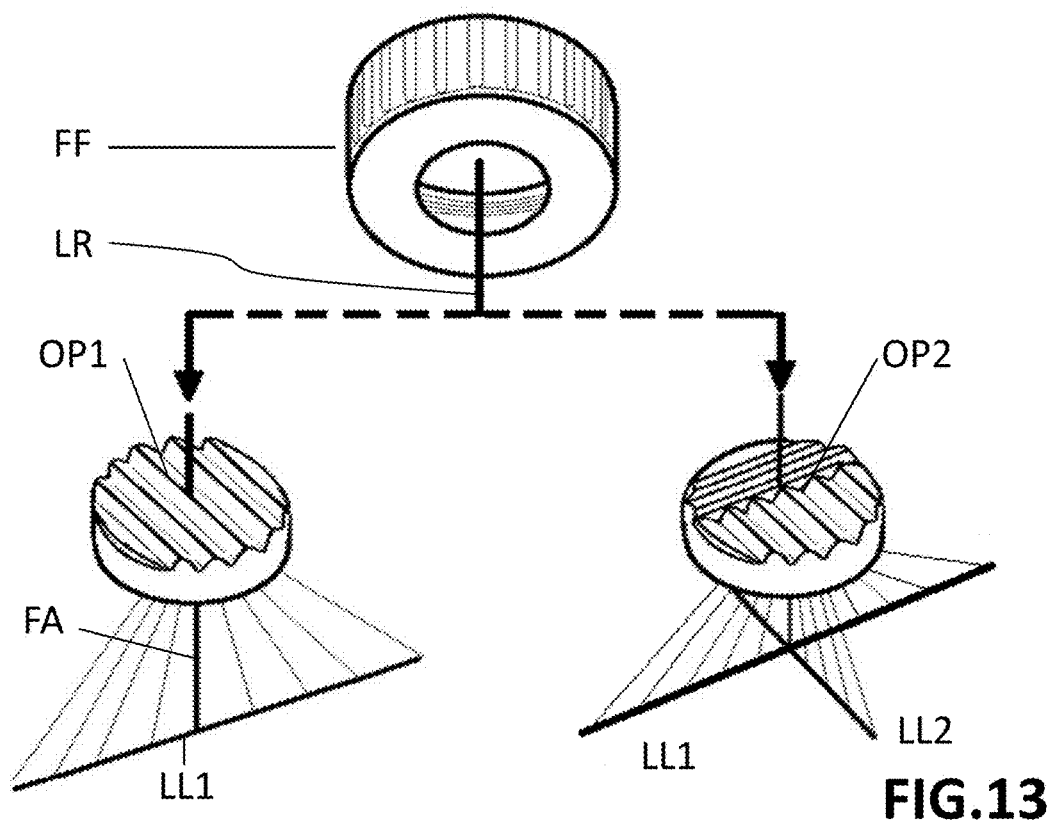
FIG. 13 is an example of collimated Powell optics (divided into facets to reduce volume) traverted (OP1, OP2), which are capable of being interchanged in a laser emitter device and generates a projected laser line (LL1) or two crossed laser lines (LL1, LL2).
Figure 24:
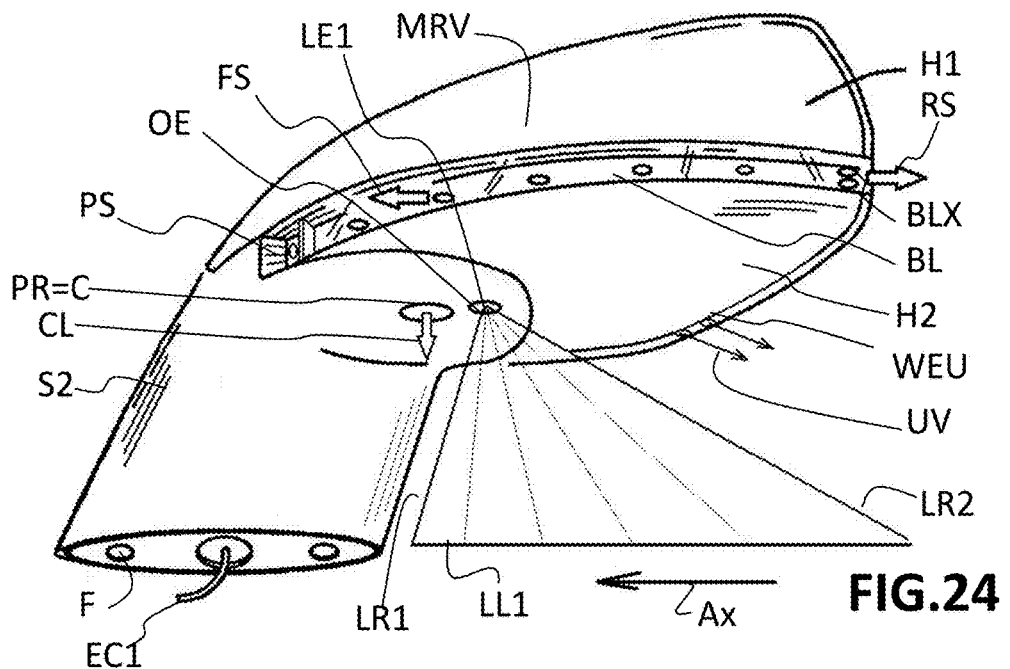
FIG. 24 is a perspective view of the lower front side of a mirror (MRV) with "blinker" (BL) with signal output towards the rear by the end (BLX) and a laser emitting device (LE1) and mini projector or courtesy light (PR) that emits a courtesy light (CL), integrated in the base to the door (S2), detail of a front sensor photo (PS) integrated into the "blinker" (BL) and welcome light emitter (WEU), ultraviolet light emitter (UV) directed towards the body located in the lower cover (H2) ultraviolet (UV) so to become a multifunction mirror of integrated modules in different parts thereof, lower cover (H2) and base (S2).

To produce the projected laser line (LL1) the laser beam (LR) of a consistent light is divided into a fan of beams when passing through an optic (OP) type Powell lens of an inner prism with rounded tip. As shown in FIG. 12, the end rays (LR1 and LR2) of said FAN angle are shown in FIGS. 1, 12, 24; this type of optics used in industrial lasers is very expensive and cumbersome. In our product, as the best solution, we apply an optic collimator of an interior prism (OP1), which generates the same effect but is smaller in volume and is easier and cheaper to produce; and even more it can be exchanged with other optics (OP2) of prisms arranged perpendicular to each other to generate intersecting lines (LL1 and LL2) that allow other examples of application and produce other functions and solutions as shown in FIG. 13.

Figure 14:
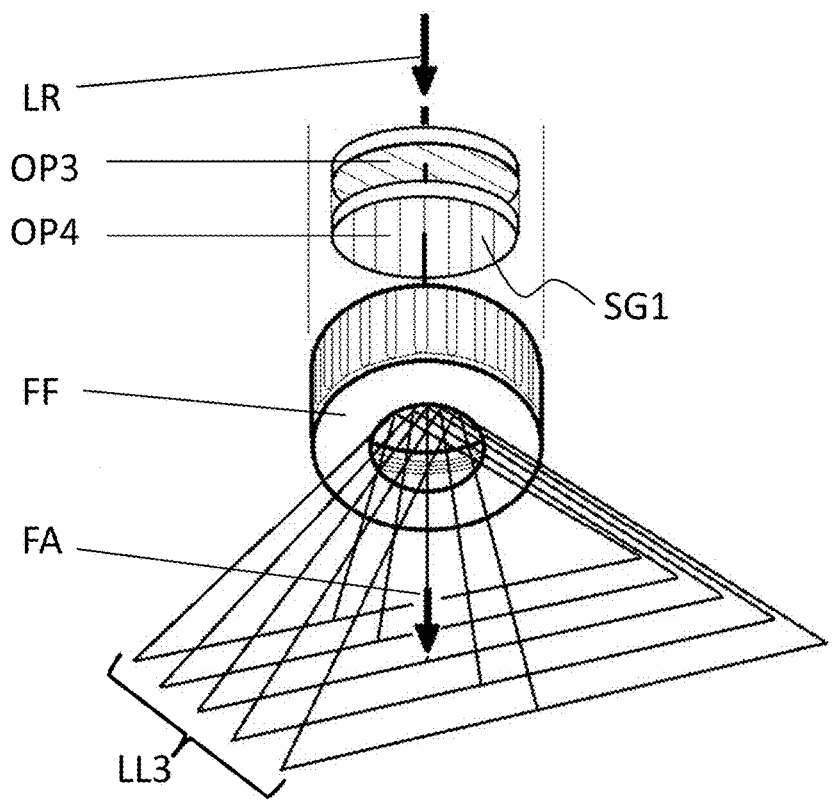
FIG. 14 are optics with associated nanometric treatment (OP3, OP4) that generate images or projected laser lines (LL3).
Figure 15:
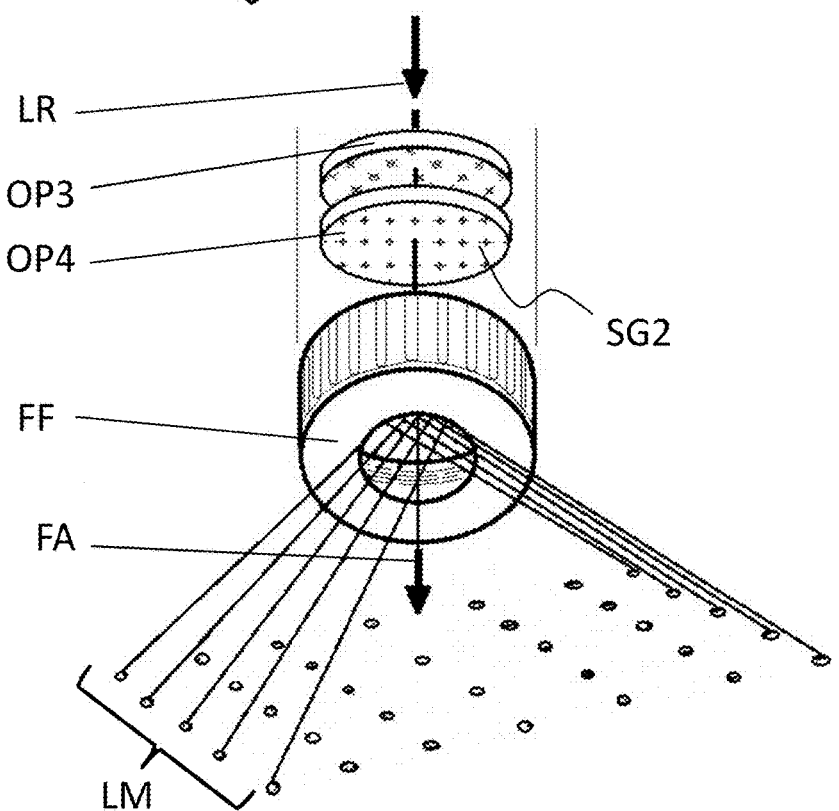
FIG. 15 are optics with associated nanometric treatment (OP3, OP4) that generate images or projected laser light dot matrix (LM).

According to an exemplary embodiment two intermediate associated optics in rotation with each other are used; these optics (OP3, and OP4) are transparent plates with a nanometric surface treatment that provides a diffuse reflection on one part and not on the other designed so as to facilitate the passing of consistent laser beams in a particular order that generates a laser image, figure, logo, lines or dot matrix of projected laser light as shown in FIGS. 14 and 15.

It is emphasized that all optics are of the preferred material methacrylate PMMA with transmittance factor, preferably greater than 0.95; for lasers of a greater power polycarbonate PC or resin.

For these devices a laser diode with low power 5/10 mW approximately (reference type, DL3147-021-645 nm, 5 mW, brand Sanyo Laser Diode), with a wavelength: 650 nm Red, Laser Power: 5 mW, Current: 20 mA; to a length of one wavelength: 650 nm Red, Laser power: 10 mW, current: 30 mA is used. For another color of emitted light, a laser that generates 532 nm of emerald green light is recommended.

The emitted light is attenuated by the optical diffuser that produces a fan of beams generated by the emission of said laser line and at 90 cm. (which is the average distance from a mirror to the ground of a sedan car) is approximately 130 Lux, and at distance of 10 cm. produces at its most intense point 800 Lux, an intensity that is not dangerous when aimed at the eyes, and taking into account the AEL classification, the classification of lasers according to UNE EN 60825-1/A2-2002, the preferred laser to use is that of type Class 2, Class 2M. According to the danger of lasers and depending on the Accessible Emission Limit (AEL) lasers can be classified into the following risk categories:

Class 1: Safe under reasonable conditions of use, ex. CDs, DVDs.

Class 1M: Like in Class 1, but not safe when viewed through optical instruments such as magnifying glasses or binoculars, ex. printers.

Class 2: Visible lasers (400 to 700 nm). Aversion reflexes protect the eye, although they are used with optical instruments, ex. those used in levels.

Class 2M: Idem. Class 2, but not safe when optical instruments are used.

Other more powerful lasers, already used in industrial application, are not applicable and need protection.

The newly created device has features that are big advantages for automotive use. It is UNaffected by vibrations, because it is a solid state; it is very reliable because it foresees to avoid the overheating of the metal capsule (C2) and the circuit controller (DC); both have on average very long life times, are economical, allow the direct modulation of the emitted radiation, and can be modular to tenths of a gigahertz; its volume and weight are small (weighs approximately 7 g.); the current threshold needed to function is very low; its energy consumption is reduced (compared to other light sources); the bandwidth of its emission spectrum is narrow (can be only a few kHz).

In the presented product, we prefer to use a laser projector with a type Powell optic composed of a series of prisms with at least one prism projecting at least one line on the ground near the vehicle. Preferably of the traverted optic type (OP1), meaning the tooling, prisms or optical variant is on the inside toward the light emitting source which is an advantage because the external side is smooth and avoids the accumulation of dirt.

In order to generate said projected laser line, it is possible to interchangeably use two types of optics based on a Powell type lens as shown in FIG. 12 that resembles a circular prism with a curved roof line, said lens is a generator of a laser line and produces an elongation of a narrow laser beam (LR) in a straight line uniformly illuminated, (LL1). The two types are:

A)—A traverted optic of a series or collimator of various Powell lenses or interior undulations, which reduce volume as shown in FIG. 13 (OP1), which are on side of the source, while the side of the emission is smooth, obtaining (depending on the application and distance of projection from the rear-view mirror towards the ground) varying degrees of beamwidth concentrated on initial incident, (FA) usually a FAN emission angle (LRF) ranging from 15° to 120°, the more pronounced and together the undulations the greater the FAN angle obtained.

B)—As an alternative, a unique Powell optic, that employs a single inner prism with the coupling edge of the rounded initial beam as shown in FIG. 12. This optic is bulkier and more expensive and is normally applied in the industry.

The proposed device preferably applies multiple Powell optics (A).

As an alternative to the laser diode, a projected luminous line can be obtained by a mini LED projector as shown in FIG. 17 with an optic group with a first stage (OCL) wherein at least a part of said convex lenses are optical concentrators of the light source (L1) which is a LED and has a Lambertian light distribution, which means it moves away from the radiant point of emission; an intermediate film (Fi) designed specifically to project transparencies of an image, figure or icon (PL), and an optical group projection (OPR) to project a line, icon or a similar figure to a projected laser line that is perceived by contrast in Lux, at least 10% more than if the environment is NOT illuminated, but it would be more cumbersome and costly. This type of mini LED projector is used in an embodiment as a complementary light when emitting an image between the main laser line (LL1) and the vehicle body; this complement does not apply to all traffic situations nor all solutions, as it is basically used when the vehicle is detained. Based on optic means for converting the emitted condensed light into a fan beam resulting in a projection of a line of light similar to the laser light (but said light is not a consistent light, possibly the line being generated is wider), it is a valid option for only emitting a figure.

Alternatively, this mini projector (PR) in a simplified construction (C) emits only one light, a courtesy light (CL) which is usually activated by a remote control and interacts in a similar fashion with the laser line emitter (LE1) generating a complementary illuminated area as a courtesy light (CL) between the laser line projected (LL1) on the ground and the vehicle as shown in FIGS. 24, 25, 31, 34, 35.

Figure 16:
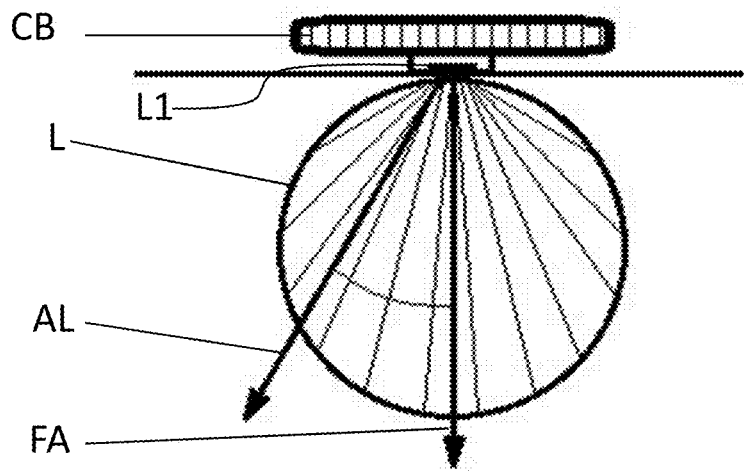
FIG. 16 is a pattern of light emission generated by an LED (L1) according to Lambert.

Some characteristics of perception between the environment and the human eye are defined to understand the luminous laser line projected on the base of the device; it is not the definition of traditional geometry for what is a line, but that it helps us make a difference by contrasting it for what is an illuminated area generated by a Lambertian LED light distribution as shown in FIG. 16 and a line generated by a laser diode of consistent and high concentration light, therefore we can say that the projected luminous line has a length greater than >100 mm and approximately the length of the vehicle, and a width between 1 and 100 mm. and is perceived by a difference in contrast with the rest of the NOT illuminated ground when there is a difference greater than 1%, for example, if a lux meter marks in a NOT illuminated area 400 Lux, and the measurement of the projected laser line increases the measurement to 420 Lux (+5%) the laser line is perceived in contrast, while in broad daylight it might not be perceived by the human eye because the contrast ratio is so low that it cannot be perceived.

The projected luminous line is of any color or wavelength outside the visible spectrum IR or UV which would be used in new features such as thrubeam sensor (SE); or associate itself with more than a projected line so that each line meets a specific function as shown in FIGS. 19, 20, 21, 22 and 23.

In photometry, the luminous intensity is defined as the amount of luminous flux emitted by a source per unit solid angle. Its unit of measurement in the International System of Units is the candela (Cd), said candelas start from a source with an initial luminous flux measured in lumen (lm), but said candelas upon impinging on a surface, and in this case being a concentrated projected luminous line also produces a sharp contrast in the amount of lumen with the adjacent surface projection per square meter, and therefore is considered a signal and it is clearly visible by diffuse reflection on the ground.

The projected laser line is measured in lux (lx), as a unit of illuminance or illuminance emittance, which is equal to lumen obtained per square meter (lm/m2), the unit used to measure the incidence of light on a surface or light emitted by a surface.

For the main luminous laser line projected (LL1) from this device, and as a preventive measure a value greater than 5 lx is used, and ranges from about 50 to 130 lx at a distance of 90 cm, which is the average height of a mirror to the ground on the side of a vehicle (and between 100 and 300 lx at 15 cm), thus the beam that produces said illuminance is not aggressive to one's sight. The point of emission for any of its variant embodiments formed by a part of the mirror assembly or outer side handle assembly, is a point firmly fixed and invariable in its service position, and always emits from top to bottom; the position adjustment possibilities of the laser emitter are precision adjustments when out of service in order to calibrate the generated laser line.

The luminous intensity in the projection of said line is less than what the same source produces if an optic focuses the beam on a point usually used as a light pointer (between 500 and 1000 lx).

Safety margin. The device carries as a security measure, a written warning, visible somewhere in the mirror assembly, saying that said light focused on one's eyes may be harmful, however the recommended intensity is about 130 Lux when projecting at a meter and is not harmful to one's eyesight since the value is lower than many exterior lights of a vehicle. The warning is a preventive measure for possible misuse.

For another embodiment, as a complementary function it is possible to associate the projected laser line (LL1) to a projected image (PL) by a mini projector with a LED light source, where the emission of Lambertian light from a LED (L1) in comparison to the emission of consistent light (LR) as shown in FIG. 9 of the laser diode (LD) is observed.

A high-power LED on a circuit (CB) with metal base emits a Lambert pattern (L) where the beam (FA) has the highest intensity and when moving away from the focal axis beam (AL) has a lower intensity, equal to (FA) the x cosine of the angle (AL) (Lambert Law). But, by applying some optical light condensation (OCL), a film with an image, icon or picture (Fi), that could be interchanged to generate different figures, and some optical projection (OPR) that can even adjust its focal length varying the projection angle, a mini projector that generates a projected figure (PL) that enables a complementary application to the warning or signal to the projected laser line shown in (LL1) FIGS. 16 and 17 is obtained.

Method and Assembly.

The product normally forms a multifunction device having a module where said main laser emitter (LE1) is positioned in an inner housing (CD) or container that allows it to position, associate, and be fixed by screws, clips or welding to a structural part of the rear-view mirror preferably to a lower housing cover as shown in (H2), FIG. 7.

For another embodiment it is associated with another functional device, preferably a lower housing cover (H2), whose preferred position facilitates the projection towards the ground of the laser line without interferences from the body, said lower cover (H2) in turn is a luminous signal device for a turn signal (BL), courtesy light (C), overhead lighting (CL) of the ground near and under the mirror, or a welcome light (WEU) that activates before boarding the vehicle as shown in FIGS. 7, 19, 23, 24 and 32.

For another embodiment referring to FIGS. 7, 8, 18, 24 and 22 the module (CD) replaces said courtesy light (CL) for a mini projector with a LED light source (PR) generating a figure, logo or projected message (PL), an image that comes from a transparency film (Fi) as shown in FIG. 17.

Figure 19:
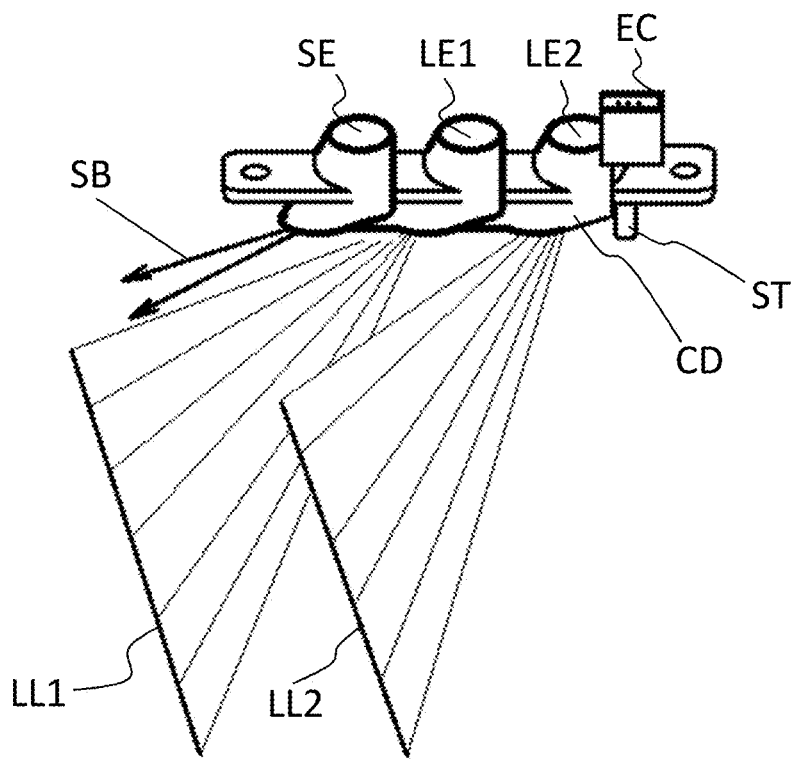
FIG. 19 is a device that integrates two laser emitters (LE1, LE2) which generate two lines or one line and a laser image and a thrubeam sensor (SE), which detect objects from the thrubeam sensor (SB) with the option to activate one or the two laser lines.
Figure 20:
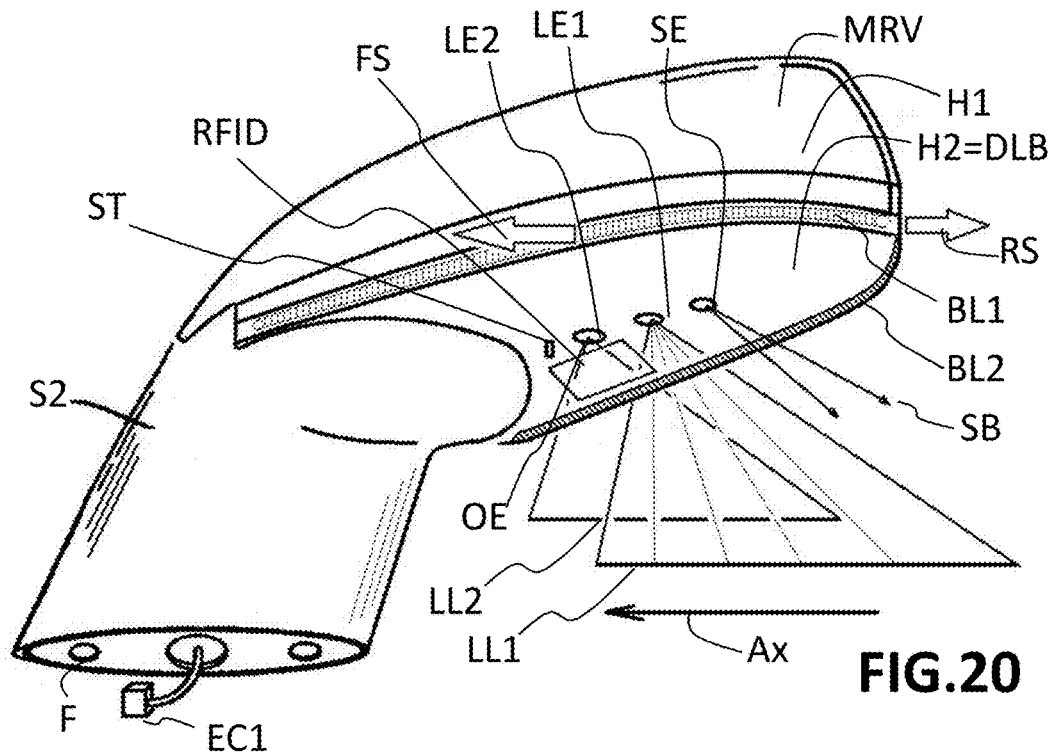
FIG. 20 is a perspective view of the bottom front side of a mirror (MRV) with "blinker" (BL1, BL2) in a lower housing cover (H2) forming a subassembly of signals and lights (DLB) where (BL1) it emits a signal towards the front (FS) and (BL2) towards the rear (RS); with a first laser emitter device (LE1) and a second laser emitter (LE2) integrated in said lower housing cover (H2), associated with a thrubeam sensor (SE), the lower outlet of laser light (OE) which allows the emitted laser beam to be directed at least downwards with respect to the vertical axis (Z) of the vehicle is shown.

For another embodiment referring to FIGS. 19, 20, 21, 22 and 23 is an alternative use of a second laser emitter (LE2) with optics generating a second laser line, figure, or laser matrix; a version that allows to make a more effective warning regarding the safety or combination thereof by using two laser emitters, plus an image projector as shown in FIG. 20 generating a complementary warning reinforcing the message produced by the first said projected laser line (LL1) and a second laser line or figure (LL2) between the first line and the vehicle body that is capable of answering to functions activated by a sensor (SE) associated in the same device.

Figure 26:
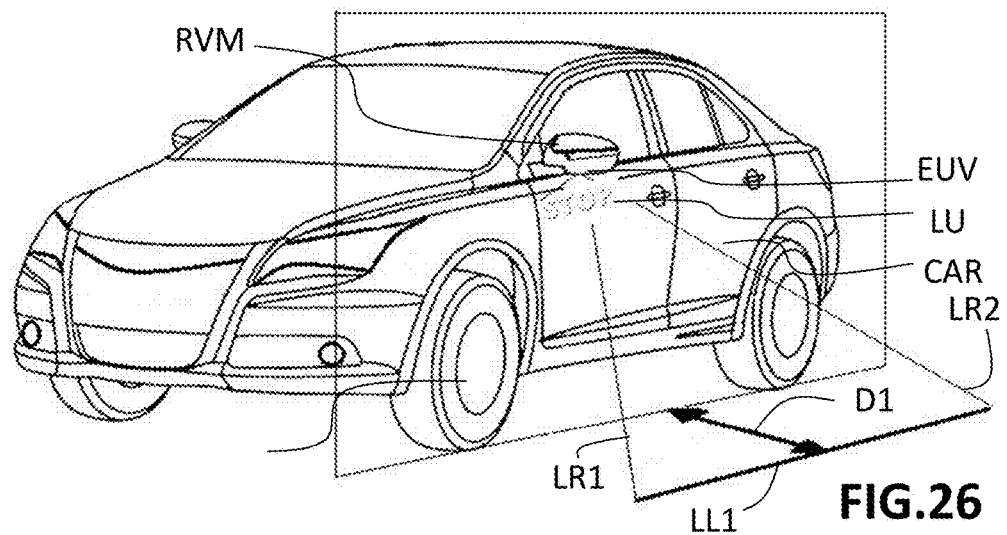
FIG. 26 is a perspective view of the front side a vehicle, with a first laser line projected (LL1) by a laser diode device (LE1) located in the side mirror (RVM), and as a complementary warning signal, a luminescent element to note the luminosity on the dark side of the car similar to a side position light, using a ultraviolet light emitter (UV) located in the mirror (EUV), and consequently of its projecting position relative to the vehicle body, is facing towards the body (CAR) where it has a figure, logo or message associated with the surface of said body of luminescent material (LU) that is illuminated and activated as a result.
Figure 27:
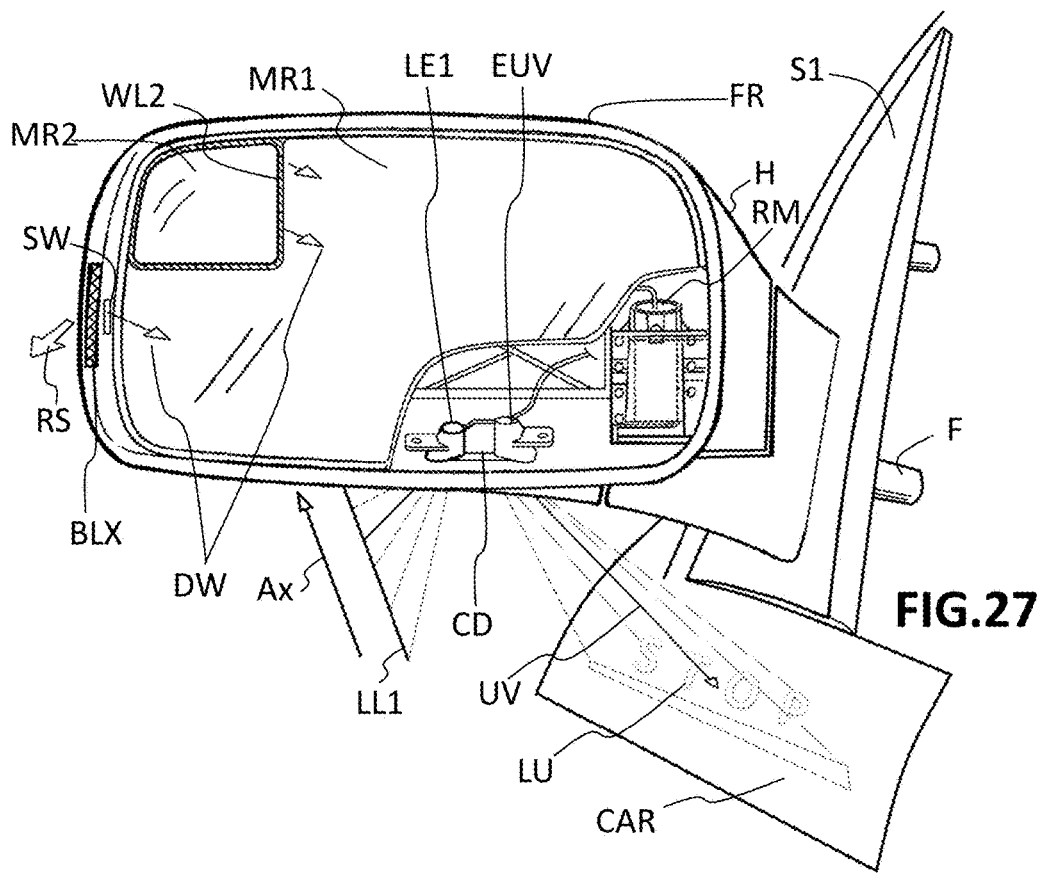
FIG. 27 is a previous view of a rear-view mirror as in FIG. 8 with a "blinker" with a signal output towards the rear by the end (BLX) away from the body (CAR) and light output (SW) from the same "blinker" through the frame (FR) and warning signal (WL2) in the extended field of view mirror (MR2), both visible by the driver; integrating a module (CD) with a laser emitter (LE1) and an emitter (EUV) of ultraviolet light (UV) that generates and is visible by the luminosity of the figure or logo of the door (LU).
Figure 28:
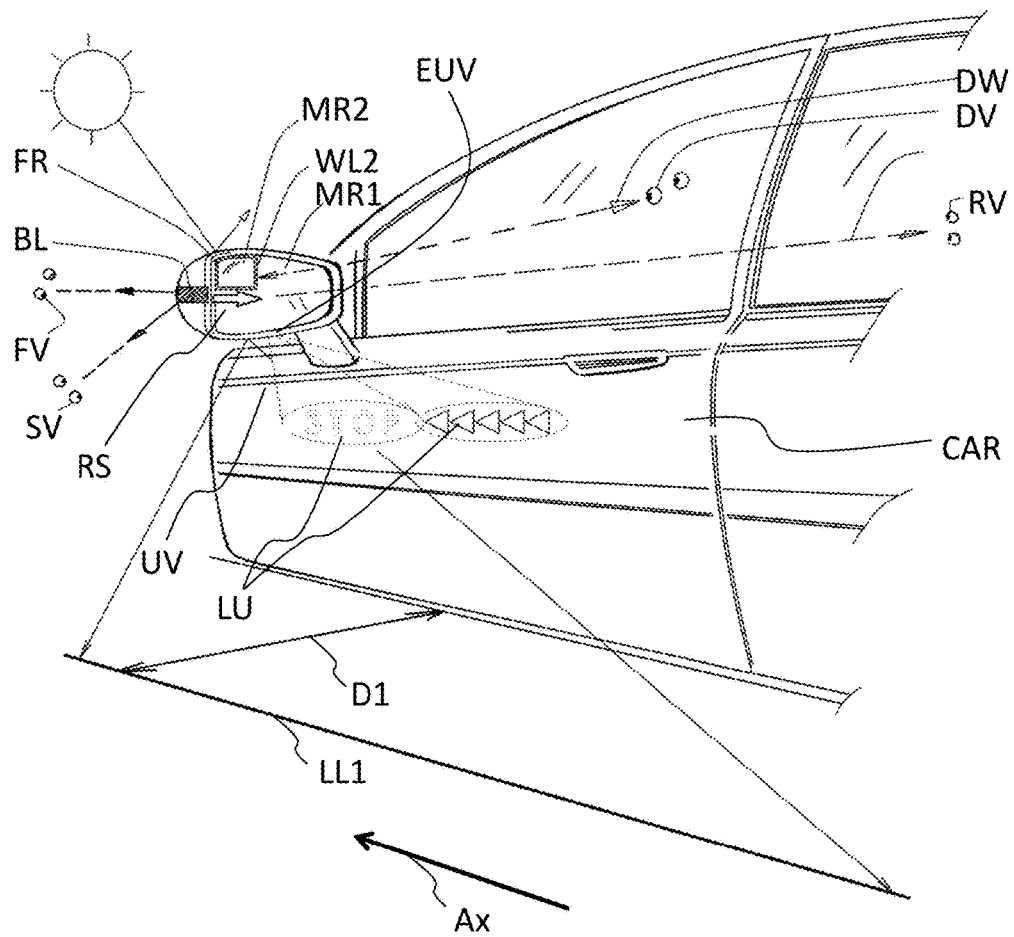
FIG. 28 is a back side view of a part of a vehicle, showing in detail the door and mirror with laser emitter and emitter (EUV) of ultraviolet light (UV) that activates the luminescent material (LU) covering a part of the side of the body (CAR) which is normally part of the door with the word "STOP" or a series of arrows, or occupies a sink, or is surrounded by non-reflective paint, or as an example of an abstract icon to fulfill a function similar to the side position light or to make visible the side or dark side of the car in order to improve the perception of the vehicle and avoid accidents.
Figure 29:
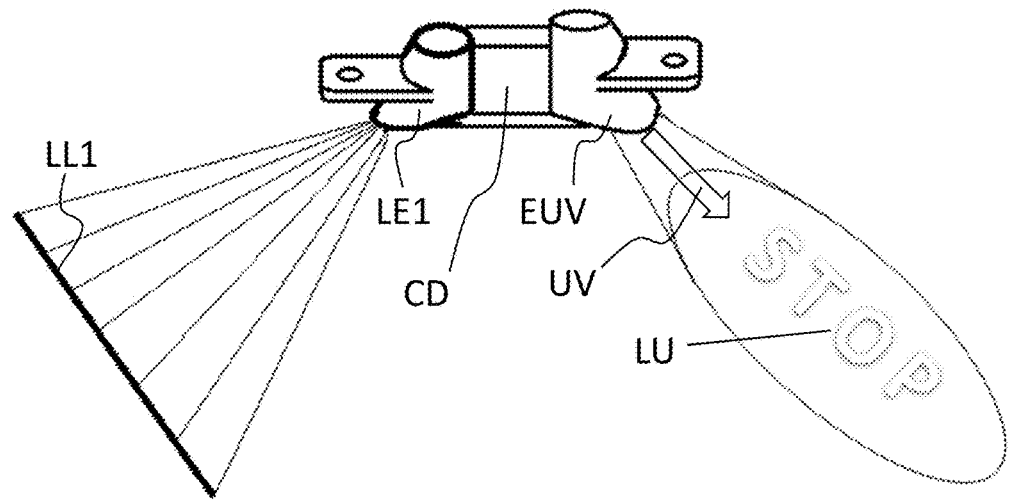
FIG. 29 is a detail of an associated device (CD) with a laser emitter (LE1) and emitter (EUV) of ultraviolet light (UV), whose orientation thereof is tilted towards the body or door of the vehicle to generate luminescence on a material, paint, or luminescent adhesive (LU). In contrast, in the emitter or mini projector in FIGS. 24 and 25 we see the projector (PR) is equal to the courtesy light which (C) faces downwards and to the ground (CL).

For another embodiment, said additional warning is in the same body like shown in FIGS. 26 and 27, and is generated by the luminescent effect produced by an ultraviolet light emitter (EUV) located in the mirror (MR1) or in the outer handle (HE) whose beams (UV) are oriented to the vehicle body or a sink in the door (DD) (that facilitates the anchoring of the handle aerodynamically to the side door and the inclusion of the hand when operating the handle (HE)), where luminescent material has been adhered, painted or attached (LU), taking advantage of the protruding position of mirrors to produce the novel effect of illuminating the side or the dark side of car, similar to side position lights also useful in highlighting the presence of the vehicle at intersections and various traffic situations with poor visibility or darkness, and thus avoiding accidents; or facilitating the location of the outer handles before boarding the vehicle as shown in FIGS. 26, 27, 28, 38-A and 39.

Mounting

For all the embodiments there is a characteristic advantage in mounting the mirror assembly (MR1) to a vehicle in a single fixing operation with fasteners like screws (F) and connecting a main connector (EC1) when housing a new device such as the laser emitter (LE1) that can associate its operation to other devices and generate several new functions at the same cost as mounting a similar mirror assembly without the laser emitter as shown in FIGS. 7, 8, 20, 22.

For its small size, the laser emitting device allows for flexible associated configurations that can be associated, housed, integrated, fitted, or adhered to other devices on the body or the mirror, a feature that allows it to be part of multifunctional devices in order to simplify wiring and connectors, or for interchanges and combinations.

Figure 18:
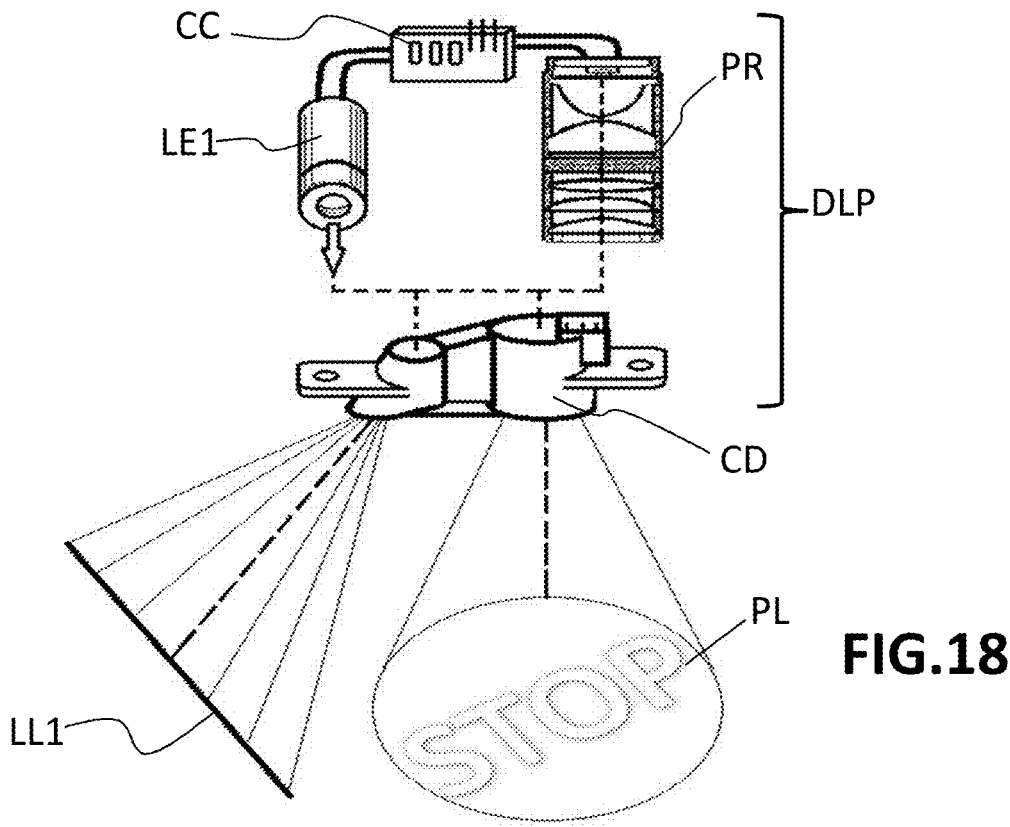
FIG. 18 is a cutting of a laser diode emitter subassembly (LE1) and a mini projector (PR), with a controlled circuit (CC), integrated into a housing device (CD).
Figure 25:
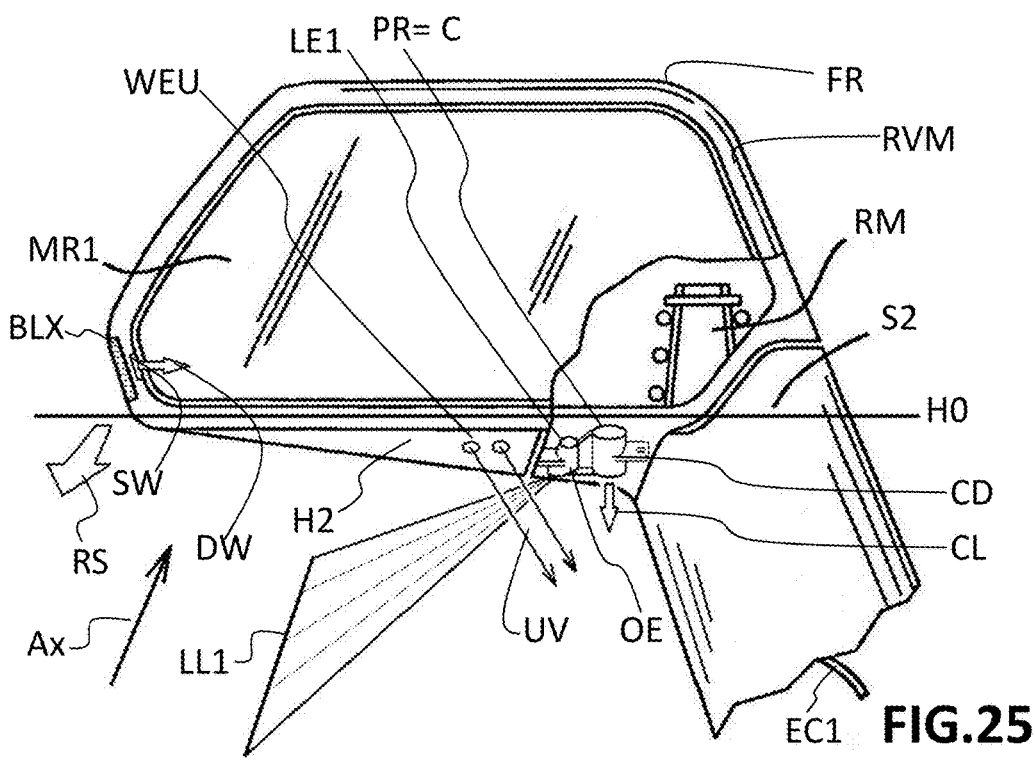
FIG. 25 is a previous view of the mirror in FIG. 24, with "blinker" with signal output towards the rear (RS) by the end (BLX) away from the body and light output (SW) from the same "blinker" by the frame (FR) as a "blinker" function test warning (DW), and transparency to see the location of the device (CD) that integrates the laser emitter (LE1) and the projector or courtesy light (PR) in the base (S2) of said mirror. It is noted that the "blinker" (BLX) and its body is behind the mirror (MR1), hence the light output towards the rear (RS) by the end far from the body and above a horizontal line (H0) which is the lower limit of the mirror (MR1); and a light output as a test function of the "blinker" itself using the same light source as said turn signal or "blinker", facing the driver (DW) through a small window (SW). The welcome light emitter (WEU), ultraviolet light emitter (UV) located in the mirror assembly that emits ultraviolet light towards the body is located in the lower cover (H2), so it becomes a multifunction mirror of integrated modules in different parts thereof, is shown.

It can form modules, subassemblies or be part of another device, or be part of an inner housing with cavities as shown in FIGS. 18 and 19, and in turn the assembly or association of said such module or subassembly in the mirror can be mounted externally or internally; with the possibility of interchanging laser emitter units, such as the courtesy light (CL), ultraviolet welcome light (EUV), (WEUV) mini projector (PR), reverse light (RLE) or a lower housing cover (H2), as shown in FIGS. 28, 31, 33, 34, or the mirror support to the body of the door or window (S1, S2) as shown in FIGS. 24 and 25, or one or more laser emitters (LE1, LE2) which are a module in the minimum expression capable of being used in either the left and right side of the vehicle whereby said container includes a positioning cavity which fits the bigger capsule (C2) and its position guide (11), FIG. 11, using it for the left and right, or using it for mirrors used in countries for left-hand or right-hand drive.

For another embodiment, it has the possibility to interchange said container (CD) with another with the same mounting and fitting points like screws or clips, but has a different way to incorporate other functions such as the warning for ultraviolet light emission (EUV) or welcome light by using normal light or ultraviolet light (UV) that needs to illuminate part of the body or the luminescent material (LU) in order to produce luminescence or illuminate the outer door handle as shown in FIGS. 26, 27, 28, 29.

Figure 30:
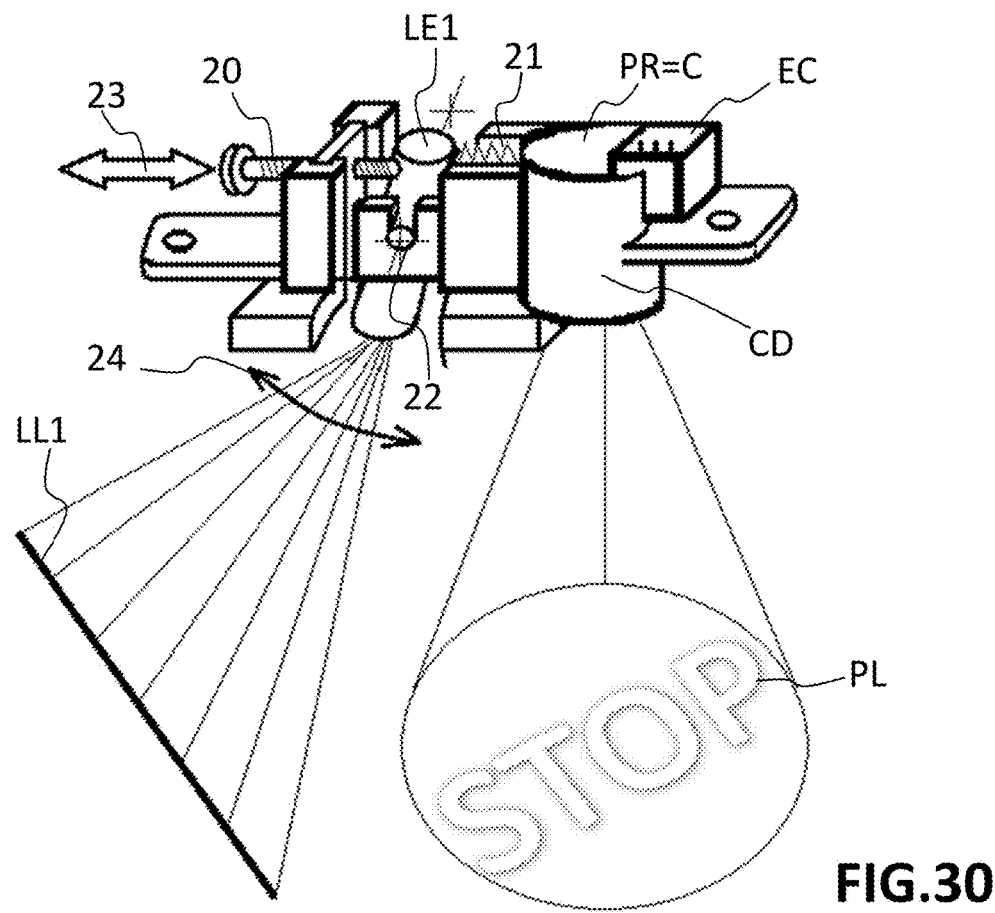
FIG. 30 is a detail of a container (CD) of a laser emitter (LE1) having an adjustment mechanism in its orientation of emission permitting it to zoom in or out (24) the laser line (LL1) generated on the ground with respect to the body; associated with a courtesy light or projector (PR) or (C), which emits light (PL).

For another embodiment, especially for high volume mirrors said inner container (CD) can incorporate an adjustment system for the position and orientation of the laser emitter (LE1) using at least; a shaft (22) in the bigger capsule emitter (LE1) and a set screw (20) (23) against a pressure spring (21), so that in this way the laser line (LL1) generated from the vehicle can zoom in or out at will as shown in FIG. 30.

The laser emitter (LE1) is flexible and can be combined so it can be part of combined subassemblies (DBL), (DLD), (DLU), (DLP) without limitation or of an outer handle (HE) that opens a door side, which has at least one of the associated action and/or activation devices; positioning container, bottom cover (H2), a base to the body (S2), (S1)) or a lever (HE).

Therefore, the subassemblies formed are capable of being interchanged for other subassemblies that share or not; the structure, the shape, and are equipped with more or less functions or none at all, but fit in the same fixing or fitting on the handle, the mirror, the door, or part of the vehicle body.

For almost all embodiments with internal mounting in the rear-view mirror where the subassembly or module fixes an opening or mouth (OE) which facilitates the output of light emission, it has a fixation setting by screws (40), (41), clips or module or container welding (CD) that can be interchanged and replaced by another piece of the same fixation setting that cancels said opening as shown in FIG. 6, 20. In this case, the spare part subassembly is equipped with different functions, including having a different exterior shape externally, because it has to coincide with the same fitting or fixing, being able to change its internal configuration combining and selecting, optic means, circuits, light sources, or antenna, camera, transmitter/receiver and sensor functions. In these applications the devices can be modules or subassemblies of associated devices without being a module; its associated synchronized operation can produce a second use of the signal's light source producing at least two signals or warnings, for example: turn signal plus advance warning when opening the door; advance warning when opening the door plus welcome light; blind spot detection warning light plus proximity warning when turning the vehicle at low speed.

According to another embodiment and new function, the laser transmitter preferably associated with the turn signal of the mirror, "blinker", or to other external visual signal devices, externally warns that a passenger is NOT wearing a seat belt at a certain speed by an operating controller (CF), which produces and combines the following activation sequence: 1, 2, 3, 4, 5, 6, 7, including at least:
  1—system detecting if the buckle (34) of the seat belt has been engaged or not,
  2—an occupancy seat sensor seat (33) corresponding to that seat belt,
  3—a side laser emitter on the ground adjacent the vehicle (LE1), (LE2), (LE3), (LM) related to the passenger side of the vehicle without a safety belt,
  4—a speedometer (35) to determine at which speed this warning is applied,
  5—a warning to the driver (SW) (WL1), (WL2) with a function test light, preferably using the same light source than the indicator by a small window (SW) in the frame of the mirror (FR).
  6—a turn signal device of the mirror or "blinker" (BL), (BLX), (BL1), (BL2) related to the passenger side without a seatbelt and to which said function activates at a frequency different from the turn signal, preferable as a fixed light,
  7—internal acoustic device (70*i*)

Figure 33:
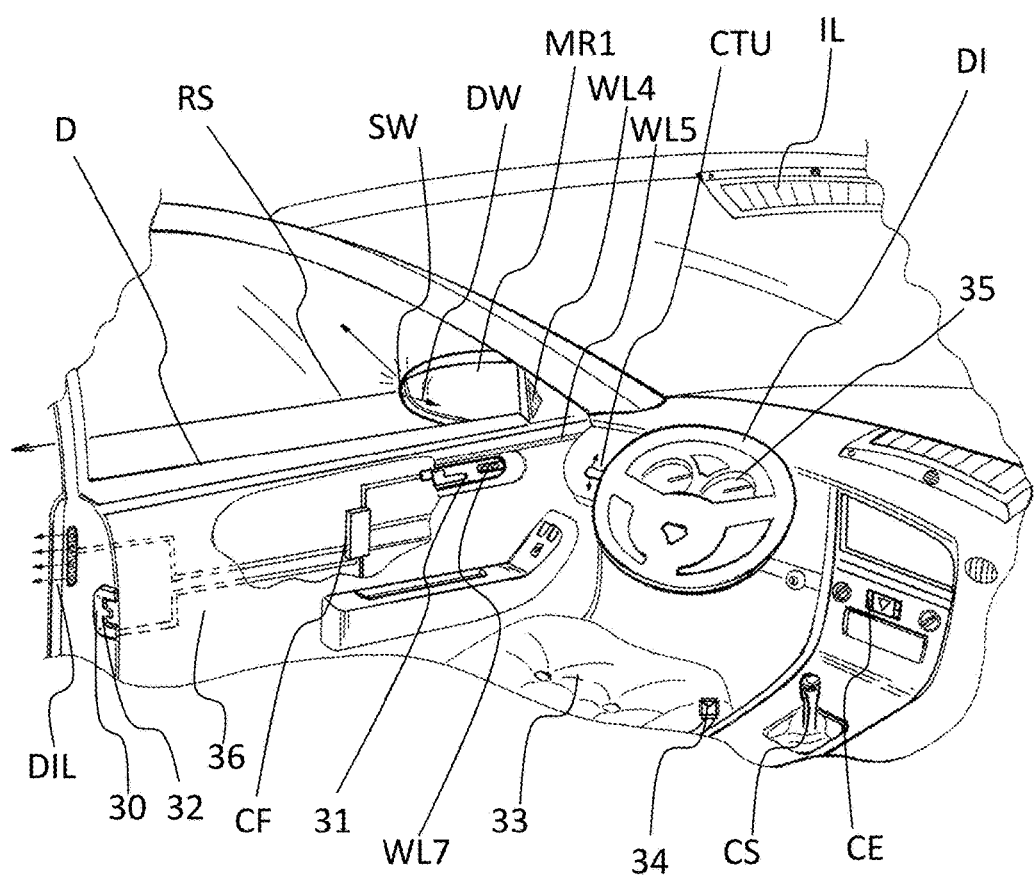
FIG. 33 is a view from inside a vehicle and the transparency of a door (D), showing the light output by a small window in the frame (FR) of the mirror (SW) directed to the driver (which is the point of view of said FIG. 33) in order to help locate, remember and look in the mirror (MR1); the mechanisms with the internal handle operation of the door from inside the vehicle (31) that initiate the sequence in the first phase of warning to the environment (RS) and the driver of the vehicle (DW) before opening the door are shown, and in the second phase, the signal from a device (DIL) in the inner door frame is activated once the door is opened by a second sensor (32) associated with the door locks (30), when the "blinker" signal (RS) towards the rear of the mirror or the laser emitter signal is no longer effective when seen from behind. Activation devices for complementary functions located inside the vehicle, not limited to steering system (DI), interior ambient light (IL), system gearshifts (CS), the node or microchip controller functions part of the CAN network of the vehicle (CF), and emergency lights (CE) are shown. There are different ways of generating visible luminous warnings by the driver or passengers from inside the vehicle, preferably.

This function is activated with the vehicle moving at a certain speed; it is especially useful when the environment is dark or at night, and the passenger could be detected by the authority or the environment that he/she is not wearing a seat belt, and thus the external warning would be a reminder to the passenger to put on said safety belt, a system that would be easily verifiable, to prevent fraud, by starting the engine and putting on the seat belt to see its correct operation, or turn on the blinker and check to see that it is working properly because if the turn signal is disconnected, as a general rule the turn signal system functions at a greater frequency as shown in FIG. 33.

According to another embodiment the device is mounted from outside the mirror assembly or external mounting. It is an additional protruding device that does NOT require an installation opening, but in general a hole to pass the connecting cables. This example is shown in an additional device of the base of the mirror that is fixed to the door window (S1) FIGS. 36 and 37. Said additional device forms a subassembly (DOS) comprising at least: one luminous signal that emits light to at least the periphery and towards the rear (RS) and is partly visible by the driver (DW) as a warning operation (WL3) using the same light source for both warning functions (to the periphery and to the driver), and incorporates the laser emitter (LE1) that generates the projected laser line.

It consists of a structural part twinned at least in part with an external part of the mirror assembly (S1) to be perfectly integrated in the overall volume of the mirror or its associated part. In order to facilitate said external mounting, the device preferably has an additional fitting or adaptation part, usually to use the left or right side, and facilitates that it is tightly screwed, bonded, welded or glued to the mirror assembly, having at least one clip or sliding part which slides, fits or clips the device to hide the screws and to prevent theft or vandalism.

Anti-vandalism, especially for embodiments that could be externally removed forcing its fixation, the device, to prevent theft, locates the dissociated controller circuit (CC) outside the device to a place inaccessible from the outside; for example, on the same power line, in case of theft the external device is disabled because an essential part of its operation is in the vehicle. It is preferably located in the part under the mirror housing (H), (H2) or on the lower part and towards the back of the mirror assembly base that is fixed to the vehicle door (S1, S2) given that said structural part does not rotate in case of a folding mirror and is capable of including other luminous functions like a rear-facing light (RS), an advance warning of an open door, a complementary light emission in reverse gear (RLE) or simultaneous warning to the driver (DW), (WL3) in order to focus and help look in the mirror before opening the door. And preferably it activates when the internal handle is activated by the occupants of the vehicle before opening the doors to get out of the vehicle, and is also associated with the taillights of the vehicle by wireless communication whose emitter is in said signals and taillights (reverse light, turn light, stop light, fog light, or license plate light) as shown in FIGS. 36 and 37.

The embodiment as shown in FIG. 37 also includes a welcome light that illuminates the outside door handle (normally synchronized with interior ambient lights (IL) of the vehicle); ultraviolet light emitter (WEU) which generates a luminescent image on the body for the lateral dark side of the vehicle; and a temperature sensor (ST), useful for determining the temperature outside the vehicle with a shorter than usual cable for this type of sensor.

According to another embodiment as shown in FIGS. 41 and 42, the laser emitting device (LE1) is associated with a side position light device (SLL) comprising;
  LED emitters (L3) that generate a light with a focal axis of emission (SL), perpendicular to the vehicle axis (Ax).
  A catadioptric reflection surface (CT),
  A laser emitter (LES) which also has a laser emitter.
These two laser emitters (LE1) and (LES) generate the laser lines on the ground adjacent to a vehicle (LL1) and (LL2) that complement each other, (preferably used for vehicles over 6 meters in length) to make the dark side of the vehicle visible and in turn generate warnings to the passengers and the periphery, of the opening or closing of the doors when getting in and out of the vehicle.

Figure 21:
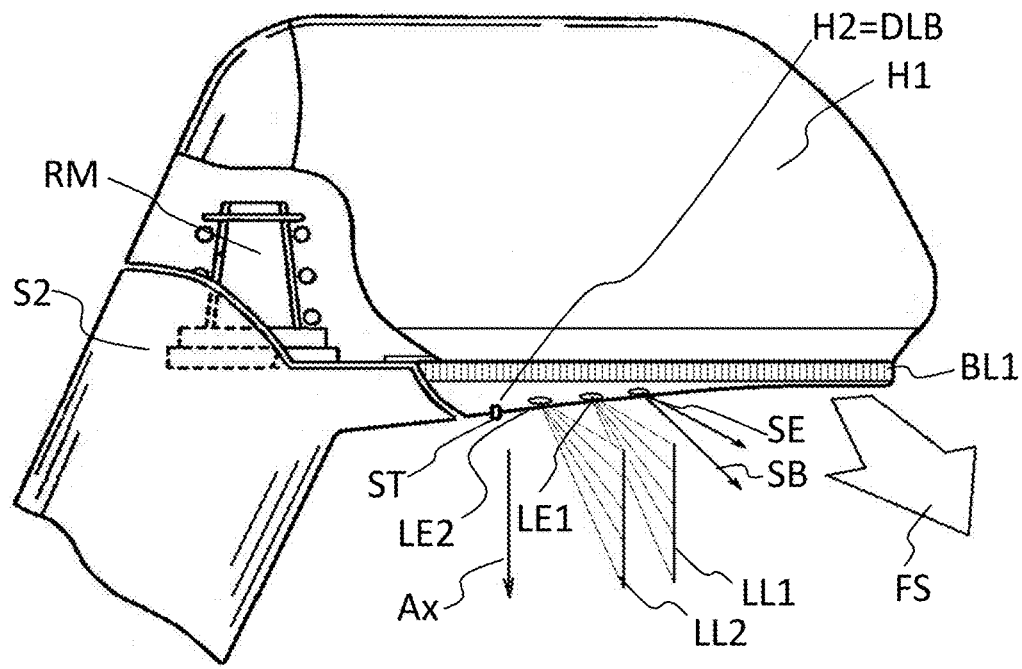
FIG. 21 is a front view of the mirror of FIG. 20.

For all the embodiments the device with laser diode emitter is an electronic element that can associate itself or share its interface with electronic elements. It is capable of including features that respond to a tracking chip, type GPS or radio frequency, to antennas, to emergency call systems in order to assist in locating the vehicle with is activation, or have an alternate power source from a solar photocell and/or an extra battery or a temperature sensor (ST) as shown in FIGS. 19, 20, 21. Or it is associated with a sensor or inductive film with a RFID (radio frequency identification) chip which provides a surface activation zone when approaching without the need for contact as shown in FIGS. 20, 23, 37, and which serves for the protruding position of the mirror to near a key or code with another chip so that it responds to an open door function, connecting of an alarm, or activating some function of recognition to proximity without contact.

For all embodiments the laser emitter device (LE1) is capable of incorporating an acoustic warning provided by an external or internal acoustic device (70 and 70*i*), FIG. 41, when appropriate, in order to expand the functional concept with a warning to other senses and create a conditioned behavior or to reduce stress.

This device is used independently from the turn signal or "blinker" (BLX, BL2) of the mirror, either in a version where the indicator is in a position below the level of the mirror (BL2) or behind the mirror with a signal output by the end (BLX), or for a mirror having no indicator. In this case, it is capable of functioning as turn signal functioning either periodically or at a repetitive sequence with the corresponding interface system of the turn signal of the vehicle. It is normally used associated when using the inner door handle (31) as advance warning of a door opening or warning of a door opening as shown in FIGS. 36 and 37.

For another embodiment the device forms a subassembly with the protruded part relative to the mirror housing assembly, with a design, shape and materials not limiting to (carbon, titanium, aluminum, or surface textures with decorations, figures or logos) studied to provide protection against dents and friction with the mirror assembly; and it also presents for all designs angles or external edges with a rounded radius of >1 mm to avoid accidents from snagging.

According to another embodiment, the device has an associated photo sensor, preferably located in the mirror assembly, and especially in a "blinker" subassembly in order to optimize the operation when the brightness of the environment requires an ambient light intensity.

For all the embodiments the laser device may have variations in design, overall electric power supply system of the vehicle, or an associated photovoltaic system with advantages applicable to all versions.

Dissipation temperature; the device associated with parts of the mirror is usually part of a chain of transmission of heat to dissipate the heat generated by the same and has the means to prevent condensation. (air input, valves, nanometric surface treatment in its optic means).

Power supply: the device is capable of having a mini battery that makes it autonomous, or its power supply is from a kinetic energy recovery system or from solar energy through an associated photovoltaic cell.

For another embodiment of the mirror assembly with laser emitter that is associated with another device that preferably emits light between the generated laser line and the body to produce an associated function, and has as an alternative an ultraviolet light emitter that activates a figure of luminescent material or paint located on the body and comprises:

An ultraviolet light emitter device (UV) that emits in one direction from a part of the mirror (RVM) or from the handle (HE) towards the body and partly downwards, so that said light beam reflects (UV) on the body (CAR), the door (D), or a depression (DD) adjacent to the handle at least partly downwards, and generates a process upon said material that produces an emission of visible light through luminescence, in order to produce a perception of brightness on the dark side of the side of the car; or facilitates locating the handles (HE) as a welcome when opening the doors of the vehicle from the outside.

Such luminescence occurs through a mechanism of three sequential steps, respectively called;
a)—absorption,
b)—non-radiative dissipation and,
c)—emission. Said emission may be of a wavelength or color different from the absorbed light. In this case non-visible UV light impinges and emits visible light depending on the material. It is not an optical phenomenon of reflection or diffraction. Said process is also closely related to the process of chemiluminescence:

In step a) the energy received in the absorption causes the electrons of the atoms of the luminescent material to get excited and jump from internal to external orbits;

In steps b and c) the electrons return to their original state and a photon of light is emitted.

The interval between the two steps may be short (less than one hundred thousandth of a second) or long (several hours). When the interval is short, the process is called luminescence or fluorescence and when long, phosphorescence. In both cases, the light produced is almost always of a lower energy, of a longer wavelength, of the light that is produced by excitation. For this embodiment non-visible or slightly visible UV light, which generates an emission of visible light is used.

Depending on the energy source it is possible to speak of various classes of luminescence selectable between photoluminescence, fluorescence, phosphorescence, thermoluminescence, chemiluminescence, triboluminescence, electroluminescence and radioluminescence.

The UV radiation used stimulates said material preferably producing a photoluminescence process: a luminescence in which the activation energy is of an electromagnetic origin (ultraviolet rays, X rays or cathode rays). In the case of photoluminescent material, the light is absorbed during a certain period of time and is emitted almost instantaneously.

According to an exemplary embodiment of an emitter device (EUV), the following is suggested:

It is a light emitter (UV) (with a wavelength between 405 nm and 15 nm), emitted from a part of the mirror assembly (MR1) or external door handle (HE) (which is a protruding body relative to the body or a depression thereof) towards a part of the body covered by a luminescent material (LU), preferably said part is the side panel or door or depression where the handle is located. The impact of said light (UV) on the luminescent material produces a luminous perception on the dark side of the vehicle, or a welcome orientation on the handles which are covered with luminescent material, or covered in part by the associated depression (DD).

Said material is based on inorganic pigments (type CICPs) based on bismuth vanadate, a basic reflecting element of light (UV) and can increase its effect with a white base and covered with a varnish as a protective cover. This material is reflective and excitable by said ultraviolet light (UV). Part of the elements or those associated to the body treated with luminescent material are not limited to and selectable from: an accessory, a device, the external door handle (HE), with an adhesive, or a brand or logo treated with said luminescent material reflective to light (UV). They can also contrast with adjacent areas not reflective to the light (UV) to define images, lines or logos preferably in the shape of an arrow or trademark to highlight the forward direction of the vehicle. An alternative to improve the definition of the illuminated image is to protect said luminescent material at least a part from the impact of ambient light preferably in a depression or cavity of said body as shown in FIGS. 26, 27, 28, 29, and 31.

For all embodiments requiring a warning light directed to the driver or passenger of a type (WL, "warning light") WL1, WL2, WL3, WL4, WL5, WL6, WL7 and said warning is located in the rearview mirror, its periphery or inside the vehicle in a place visible to said driver, passenger or whoever activates the various actions, among others; opening the door, changing lanes, turning the steering wheel without indicator warning, or by proximity of an object in the periphery, said warning is likely to have at least two points of associated light emitters close together that light up in an alternating sequential manner such that they respond to a controller that regulates the switching on and off to indicate the warning so that the action is proactive from anyone inside the vehicle or proactive from anyone or anything outside of the vehicle, representing incoming danger or that a voluntary action involving danger will be produced which is also likely to be associated with a sound characteristic of said action.

REFERENCE

AL; secondary emitter beam, equal in intensity to the focal axis (FA) by the cosine angle formed with the focal axis (FA) (Lambert Law for diffuse emission)
B1; support base of the capsule (Strem),
BL; "blinker", turn signal device, indicator, also used in second function, at a different on-off frequency as an early warning to indicate an open door, emitting a signal at least towards the rear (preferably by the far end of the body and arranged on a horizontal level below the glass (MR1).
BL1: blinker forming the inferior housing cover (H2) that emits a signal towards the front (FS).
BL2; blinker forming the inferior housing cover (H2) that emits a signal towards the rear (RS) and arranged on a horizontal level below the glass.
BLX; part of the blinker (BL) that emits towards the rear from the far end of the vehicle body.
BLV; internal volume of the turn signal device body
C; lateral overhead courtesy light emission from rear-view mirror.
C1; smaller laser diode capsule.
C2; bigger laser emitter device capsule, usually metal cylinder.
CAR; vehicle body.
CB; (PCB) printed circuit board generally with metal base for high-power LEDs to dissipate heat, generally used in a mini LED projector.
CC; circuit driver/controller
CD; inner cover, housing or container positioner of the laser device.
CE; emergency light command.
CF; node or microchip function controller of the CAN network of the vehicle.
CHL; laser diode chip.
CL; courtesy light that illuminates the side floor of the vehicle from the rear-view mirror.
CS; gearshift command.
CT; catadioptric reflective surface.
CTU; turn signal command.
D; door
D1; distance of the projected laser line towards the vehicle body.
DA; area of risk or danger
DI; steering position sensing/detector system.
DIL; internal warning light device located on the door panel or edge.
DLB; laser emitter subassembly associated with a blinker (BL, BL1, BL2).
DLP; laser emitter subassembly associated with a mini image projector (PR).
DLU; laser emitter subassembly associated with a (UV) light (EUV) emitter.
DLD; dual laser emitter subassembly.
DLB; multifunction laser line subassembly, plus image projector, plus blinker.
DM; trunk door open sensor.
DW; driver signal, blinker function test (BL) as turn signal, or as second function indicating where to look when operating the inner door handle before opening it.
DOS; laser emitter subassembly associated with a light, warning signal of an open door.
DP; projection on the ground of the open door.
DV; position of the driver's vision.
EC; electrical contacts. (electric contact.)
EC1; general electrical connector of assembly of the rear-view mirror to the vehicle.
ECH; metal base of the chip, electrode and heat sink.
F; fixing point of the rear-view mirror assembly to the vehicle body.
FA; focal axis of the emitted laser light.
FF; focal adjusted cover with internal thread that acts in (10) (focal fitting).
Fi; film with translucent image that generates a projected image.
FS; front indicator signal.
FR; frontal view point position.
GL; light guide, internal reflection of light of an elongated optic body in (BL1), (BL2).
H1; upper housing cover of the rear-view mirror assembly, usually painted.
H2; lower housing cover of the rear-view mirror assembly.
HE; outer door handle.
HEF; fixed part of the outer door handle normally includes locking mechanisms and electronics in response to the remote control opening.
HEM; moving part of the outer door handle normally having a traction movement that operates the locks.
IL: courtesy light or ambient lighting in the interior of the vehicle.
JU; P-N junction, active crystal layer of germanium or silicon.
L; Lambert emission light pattern, spherical distribution with a focal axis (FA) having the greatest emission intensity.
LA; alternative laser emitters located in the vehicle body applicable to alternative embodiments, front fenders, doors, door handles, front bumpers, lights.
LD; laser diode.
L1; LED
LL1; main generated projected laser line.
LL2; laser line 2, complementary, or second line of the same or different color.
LL3; laser line 3, complementary, or laser image, or group of associated lines.
LM; laser light dot matrix.
LLF; laser line produced by an optic FAN angle opening.
LE; laser emitter
LEH; laser emitter from the outer side door handle (HE).
LE1; laser emitter 1, main.

LE2; laser emitter 2, complementary, emits the same or different color and shape of laser light.
LE3, LE4, LE5; alternative laser emitter located on the body of the door towards the rear.
LER; laser emitter with position adjustment mechanism emission.
LES; laser emitter integrated in a side position light of the vehicle.
LO; consistent laser light output
LR; generated laser beam.
LRF; FAN angle of a laser beam (LR) generated by basic optics when projected is a line of light (LL1).
LR1; laser beam projection from one end after passing through the optic FAN.
LR2; laser beam projection from the other end after passing through the optic FAN.
LU; luminescent material, image or layer reacting to ultraviolet light.
MC; metal electrode layer
N; active semiconductor substrate, ex. Gallium-Al
OD; opening of the door
OP1; multiple traverted optic, low-volume, generator of a projected laser line.
OP2; multiple combined traverted optic, generator of crossed laser lines.
OP3 and OP4; combined optics of nanometric surface treatment generators of lines, dot matrix, shapes or figures of projected laser light.
OCL; optic light condensers for a mini projector.
OPR; optical generators of a projected image
OE; opening in the housing for the output of light in the laser module assembly (LE1).
OP; traverted optic, Powell type lens, base and cover (FF).
P; active semiconductor substrate ex. Indium.
PL; image projected light.
PR: icon or courtesy light mini projector
RE; reflective top coat
RES; semi-reflective top coat with a light output activated, amplified and stimulated by radiation between the layers.
RL; reverse side light emitted from the rear-view mirror towards the rear and down illuminating the side.
RLE; reverse light emitter from the rear-view mirror, especially the frame (FR)
RS; turn signal emitted towards the rear.
RV; view point position from the rear-side of the vehicle
S1; rear-view mirror base to vehicle window.
S2; rear-view mirror base to vehicle door
SE; sensor
SB; thrubeam sensor
SG1; nanometric etched surface generating consistent lines of laser light.
SG2; nanometric etched surface generating consistent dot matrix of laser light.
SL; side position light emission perpendicular to the axis of the vehicle (Ax).
SLL; laser emitter associated to a side position light, (side light).
SP; photo sensor.
ST; temperature sensor.
SV; viewpoint position from the side of the vehicle.
SW; small window in rear-view mirror frame, light output as a test function of blinker (BL), as a turn signal, or when the blinker is operating at a higher frequency than the indicator, it serves as an advance open door warning light when touching the inner door handle before operating the latches (30) opening said door; it helps to look in the mirror.
UV; emitted ultraviolet light.
WL1; driver warning light from the rear-view mirror glass.
WL2; driver warning light from an extended field of view mirror or its periphery.
WL3; driver warning light from a door open indicator device (DOS) preferably located in the base of the mirror (S1, S2).
WL4; driver warning light located inside the vehicle near the window of the side door.
WL5; driver or passenger warning light located inside the vehicle on the door panel visible by the driver or passenger near that door.
WL6; driver warning light from a part of the housing (H) of the rear-view assembly (RVM) near the vehicle body.
WL7; driver or passenger warning light from the inner side door handle assembly (31).
WE; welcome light illuminating from the rear-view mirror part of the body especially the door and its outer door handle.
WEU; ultraviolet welcome light illuminating from the rear-view mirror part of the body especially the door and its door handle having a luminescent part.
WEUH; ultraviolet welcome light located on the outer door handle (HE).
10; fine pitch thread focal length adjustment.
11; a guide or way of positioning relative to the axis of circulation of the vehicle (Ax) and housing device projection of a line of projected laser light (LL1).
12; optical compression spring.
20; set screw.
21; compression spring adjustment.
22; axis of rotation.
23; calibration position.
24; laser line displacement closer or farther away from the vehicle body.
30; latches and locks to unlock doors.
31; inner door handle.
32; open door sensor
33; occupied seat sensor.
34; seatbelt sensor
35; speedometer
36; inner door panel lining (D).
40; fixing screws.
41; fixing turrets.
70; external sound emitter.
70*i*; internal sound emitter.

The invention claimed is:

1. Multifunctional assembly, for a motor vehicle located on the side door having an outer surface structure supporting at least one external rearview assembly and an external opening handle assembly for the opening of said door,
said external rearview assembly including a housing with an opening towards the rear in relation to the axis of movement of the vehicle which houses one viewing element, which is at least a mirror, a camera, or combination thereof and a base fixing it to the outer surface of said vehicle, and
said external opening handle assembly including an external handle with a fixed part having closing mechanisms of said door and a movable traction part for opening said door, wherein at least one of said external rearview assembly and external opening handle assembly includes:
a laser light emitter having at least one diode laser light source, which emits directly and from a fixed and unchanging service position with respect to the assembly, a beam of light Laser at least in a downwards direction, an output aperture of the emitted laser light, occupied by optical means configured for splitting the laser beam into several beams and generating at least a first laser light line on the floor adjacent the vehicle to produce a luminous mark wherein said first line of laser light (LL1) is substantially oriented parallel to the axis of movement of the vehicle (Ax) marking the ground and indicating to the periphery the circumstantial existence of an area of conflict and exposure to danger (DA), said area is equivalent to a side passage that extends between said line of laser light and the vehicle body and includes an approximate length extending between the projection of the mirror downwards and the rear bumper, said area corresponds to a similar area occupied when the doors (OD) of the vehicle are open;

a receptacle, housing, or container assembly positioner (CD) which is an independent module or is integrated by being fixed through welding, screws or clips to a part of the structure or the subassembly of the mirror that contains it, and provides a position to direct in a combinable manner, and at least in part, the projection of said laser light beams from top to bottom, to the side and to the rear—wherein said receptacle, housing or container assembly positioner provides orientation to at least said line of laser light substantially parallel to axis of movement of the vehicle.

2. Multifunctional assembly according to claim 1, wherein the laser light emitter device (LE1) comprises of at least: a capsule (C2), a laser diode (LD), ca circuit controller interface (CC), a laser diode emitter (LD), a laser beam emitted from any wavelength between 15 and 1100 nanometers, optic means (OP), (OP1), (OP2), (OP3), (OP4), a cover (FF) with a system for adjusting the focal length of the laser projection (LL1) (LL2), (LL3) (LM), and a way or guide (11) to facilitate the mounting position.

3. Multifunctional assembly according to claim 1, wherein that the optic means (OP), (OP1), (OP2), (OP3), (OP4) that split the emitted laser beam generate figures and shapes of laser light selected from the group consisting of: a regular or irregular line, continuous or discontinuous lines, parallel lines, intersecting lines, curved lines, a dot matrix, figures, and icons.

4. Multifunctional assembly according to claim 1, wherein the laser emitter device is located in the part comprising an outer lower surface of the mirror assembly which has an opening far laser light (OE) comprising: a lower housing cover (H2), or a functional lower housing cover subassembly with incorporated lights and signals (DLB), or a base that connects it to the body (S1, S2).

5. Multifunctional assembly according to claim 1, wherein said laser emitting device functions independently to produce safety and comfort functions wherein said laser emitter device functions in association with other devices as a reciprocal or added complement to produce security and comfort features, to enhance existing features that produce said associated devices, or to produce at the least a second function thereof.

6. Multifunctional assembly according to claim 5, wherein some associated devices generate an action winch is at least the emission of; a light, a warning light, a light signal, a luminous projected figure, icon or logo, the activation of a luminescent material, a sound signal.

7. Multifunctional assembly according to claim 6, wherein the associated devices that generate an action are located within the mirror assembly and are selected among the following devices; turn signal, other laser emitter, courtesy light, welcome light, reverse side light, mini projector of figures, blind spot detector, turn signal function test warning light that uses the same light source as the turn signal, turn signal function test warning light, ultraviolet light emitter, side parking lights, fog light, warning to focus attention on the mirror subassembly, ambient lighting inside the vehicle, exterior open door warning, interior open door warning shown in the inner door frame or door panel, stop light, emergency light, free (unoccupied) taxi signal.

8. Multifunctional assembly according to claim 7, wherein the associated device is a turn signal (BL) emitting at least one signal towards the rear (RS) in relation to the vehicle from the far end of the body (BLX) and has part of the volume of its body within the volume of the mirror assembly (RVM) and at the same time behind the mirror (MR1).

9. Multifunctional assembly according to claim 7, wherein the associated device is a turn signal (BL1), (BL2) having a light output towards the rear (RS) and a part of its volume (BLV) is below the level of a horizontal plane (H0), lower than the level of the mirror (MR1).

10. Multifunctional assembly according to claim 7, wherein the associated device is a warning light or a control indicator that emits a light, warning or signal from a part of the mirror assembly towards the eyes of the driver (DW) (SW) (WL1) (WL2) to the following selection among: a peripheral light (WL2) of wide-angle mirror (MR2), a blind spot warning light detecting a presence, a detection warning light emitted from below the mirror (WL1), a control light of the indicator signal (BL), (BLX) that uses the same light source as said turn signal and is preferably a small window (SW) in the frame (ER) of the housing (H) of the mirror assembly or (WL4) driver warning light located inside the vehicle near the window of the side door, (WL5) driver or passenger warning light located inside the vehicle on the door panel visible by the driver or passenger near that door, or (WL7) driver or passenger warning light from the inner side door handle assembly (31).

11. Multifunctional assembly according to claim 10, characterized in that any type of action requiring a warning light for the driver or passengers of the warning light type (WL1, WL2, WL3, WL4, WL5, WL6, WL7) and that said warning is located in the rear view mirror, its periphery or inside the passenger compartment of the vehicle in a place visible by said driver, passenger or actor of various actions, among others; When opening the door, or changing lanes, or turning the steering wheel without warning of the turn signal, or by approaching an intruder from the periphery, said warning is capable of having at least two associated emitter light emitted near each other, which Are switched alternately and sequentially such that they respond to a controller that regulates their on and off to indicate the warning so that the action is proactive to the actor or is proactive to the intruder, representing a danger or is about to occur Voluntary action involving a hazard and capable of being associated with a sound characteristic of said action.

12. Multifunctional assembly according to claim 7, wherein the associated device is a second laser emitter (LE2) generating a second line, figure or icon of laser light (LL2), (LL3), (LM) of the same or different color of light, that defines a distance (D2) to the vehicle which involves another level of risk or response to another sensor, different from the distance (D1) of the first projected laser line (LL1).

13. Multifunctional assembly according to claim 7, wherein the associated device is a courtesy light (C), or (PR) which emits a zenithal light (CL) from the mirror towards the ground adjacent to the vehicle and is activated in a detained vehicle when opening or closing the doors, with a remote control.

14. Multifunctional assembly according to claim 7, wherein the associated device is a mini LED projector (PR) generating a projected figure (PL) from a film (Fi), as a complement and reinforcement to the visual warning.

15. Multifunctional assembly according to claim 7, wherein the associated device is a welcome light (WL) illuminating at least the door handles or doors of the vehicle when unlocking the doors.

16. Multifunctional assembly according to claim 7, wherein the associated device is a reverse side light (RL) that emits a short range light towards the rear to the rear wheel of the vehicle when put in the reverse (CS).

17. Multifunctional assembly according to claim 7, wherein the laser emitter device (LE1) is a combined subassembly (DBL), (DLD), (DLU), (DLP) without limitation comprising at least; one associated action and/or activation device, a positioning container (CD), an external structural part of the mirror assembly (RVM).

18. Multifunctional assembly according to claim 7, wherein the associated device is an ultraviolet light emitter (EUV) (UV) which emits light in a direction from the mirror towards the body, so that said light beam (UV) reflects upon the body at least in part downward.

19. Multifunctional assembly according to claim 18, wherein the beam of light (UV) strikes upon a luminescent material (LU) excitable and reflective to the ultraviolet light (UV) that covers a part of the side of the body and produces a perception of light on the dark lateral side of the vehicle; or facilitates the location of the handles as a welcome when externally opening the vehicle doors.

20. Multifunctional assembly according to claim 7, wherein the laser emitting device (LE1) is associated with a side position light device (SLL) comprising;
   LED emitters (L3) that generate a light with a focal axis of emission (SL), perpendicular to the axis of the vehicle (Ax),
   a catadioptric reflective surface (CT),
   a laser emitter (LES) transmitting a laser line (LL2) on the ground to the side of the vehicle, said laser emitters (LE1) and (LES) complement each other by combining the function of making the dark side of the vehicle visible and generating warnings to passengers and the periphery regarding the opening and closing of doors or when getting in and out oldie vehicle.

21. Multifunctional assembly according to claim 7, characterized in that the associated device is a mini projector (PR) with a construction (C) emits only one light, as a courtesy light (CL) which is activated With a remote control, and interacts in a similar way with the laser line emitter (LE1) generating a complementary illuminated area as courtesy light (CL) between the projected laser line (LL1) on the ground and the vehicle.

22. Multifunctional assembly according to claim 5, wherein some associated devices generate the activation of laser emitter functions and associated action devices, selectable and combinable among; sensors, detectors, switches, radars, controllers, nodes, timers, alarms, gear shifter systems, lane change or change of direction systems, multimedia devices, augmented reality devices (complementary goggles used by passengers of the vehicle or internal projection screens in a vehicle), telephones, radio, GPS type locators or radio frequency locators, computers, speedometers, emergency call devices, accelerometers or vehicle in motion detectors, network of computerized commands type CAN bus or similar, devices to access or to open doors, internal and external, hood or trunk by key, keys/codes, capacitance, or radio frequency recognition of type (RFID, radio frequency identification), of an image, codes, by approximation, by contact, approximation or presence detectors, including those that are foot-operated, induction zones, condensed antennas, temperature sensors, a clock taximeter, seat occupancy detection system, seat belt use system, photo sensor, photovoltaic cell.

23. Multifunctional assembly according to claim 1, wherein said action and activation associated devices coordinate and combine the functions by at least an operation circuit controller (CF).

24. Multifunctional assembly according to claim 1, wherein the laser emitting device is included, housed, integrated or embedded in the internal volume of the mirror assembly.

25. Multifunctional assembly according to claim 1, wherein the laser emitter device is additional, adhered, twinned or associated as an external volume to the volume of the mirror assembly.

26. Multifunctional assembly according to claim 25, wherein the laser emitter device (LE1) is a subassembly (DOS) comprising at least: a light signal that emits light at least to the periphery towards the rear (RS) and at the same time is visible by the driver (DW) as an operation warning (WL3) using the same light source for both warning functions (to the periphery and to the driver), and incorporates the laser emitter (LE1) that generates a projected laser line, and is preferably activated when the inner handle is actuated by the occupants of the vehicle before opening the doors to get out and is associated with the tail lights of the vehicle through wireless communication whose emitter is in the said rear signals (reverse, turn or stop).

27. Multifunctional assembly according to claim 1, wherein the laser emitting device forms a subassembly with a protruded part in relation to the housing of the mirror assembly with a design, shape, materials configured to provide protection against shock and friction of the mirror assembly.

28. Multifunctional assembly according to claim 1, wherein the laser emitter device has an adjustment mechanism for the position and orientation of the emission that allows the laser line (LL1) generated on the ground to zoom in or out (24), relative to the body using at least: an axis (22) in the bigger capsule of the emitter (LE1) and a set screw (20).

29. Multifuctional assembly according to claim 1, wherein a group of associated devices follow an order of coordinated activation to warn the periphery and passengers of the vehicle that the doors will open, to where said doors will open, and to help and remember the vehicle occupants to look in the mirror before opening the doors, and by an operation controller (CF) which produces the following activation sequence: 1, 2, 3, 4, 5, 6, including at least:
   1—internal handle with a detector switch sensor (31),
   2—a laser emitter (LE1) that generates a laser line (LL1),
   3—a turn signal (BL) that activates at a different frequency than the turn signal,
   4—an operation control light directed toward the driver's or passengers' eyes (SW), (WL1) (WL2), (WL4), (WL5), (WL7) which preferably uses the same light source as the tarn signal and is a part thereof, 5—internal sound device (70i), 6—a courtesy light (CL), other laser emitter (LE2), or a mini projector (PR).

30. Multifunctional assembly according to claim 1, wherein a warning externally warns if a passenger is NOT wearing a seat belt at a certain speed by a controller operation (CF), which produces and combines the following sequence of activation: 1, 2, 3, 4, 5, 6, 7 including at least:

1—a buckle detection system buckle (34) which indicates it a seat belt is worn or not, 2—a seat occupancy sensor (33) corresponding to that seatbelt, 3—a side laser emitter on the ground adjacent to the vehicle (LE1), (LE2), (LE3), (LM) related to the passenger side of the vehicle without a safety belt, 4—a speedometer (35) to determine at what speed this warning is applied, 5—a warning for the driver (SW) (WL1), (WL2) (WL4), (WL5), (WL7) with the function test function indicator light, preferably using the same light source as the indicator by small window (SW) in the frame of the mirror (FR), 6—a turn signal device or blinker (BL), (BLX), (BL1), (BL2) related to the passenger side without a seatbelt, and said function would activate frequency different from the turn signal, preferably as a fixed light, 7—an internal sound device (70i).

31. Multifunctional assembly according to claim 1, wherein the assembly with respect to the vehicle for said laser emitting device (LE1), is an operation equivalent to mounting the same mirror assembly (RVM) without the incorporation of said laser emitter, said assembly requires: similar fixing operation (F) and similar operation to connect the main electrical connector (EC1) to the vehicle network.

32. Multifunctional assembly according to claim 1, characterized in that, for any action comprising opening the side door from the interior of the vehicle, it employs two actions to gain a time interval:

a first action required prior to actuating the handle and the latches of said door which in turn connects the warnings, a second action opening said side door;

wherein said first action is selectable between actuating, performing a repeated movement, a handle or cover overlapped to the handle, a pre-access device or enablement to the handle, a detector sensor pre-switch on either side of the passenger compartment, previous action on the handle of the locks.

33. Multifunctional assembly according to claim 1 said laser diode emitter emits at least one beam with a wavelength between 380 and 680 nanometers of color of visible light (and even of color of invisible infrared (IR) or ultraviolet (UV) for sensor or luminous activation functions).

34. Multifunctional assembly according to claim 1 said laser diode emiter use a type Powell optic composed of a series of prisms with at least one prism projecting at least one line on the ground near the vehicle.

* * * * *